United States Patent
Kinamon et al.

(10) Patent No.: US 9,608,709 B1
(45) Date of Patent: Mar. 28, 2017

(54) METHODS AND SYSTEMS FOR BEAMFORMING AND ANTENNA SYNTHESIS

(71) Applicant: GoNet Systems, Ltd., Tel Aviv (IL)

(72) Inventors: Roy Kinamon, Tel Aviv (IL); Gal Zuckerman, Holon (IL); Moshe Salhov, Herzeliya (IL); Oz Liv, Tel Aviv (IL)

(73) Assignee: GoNet Systems, Ltd., Tel Aviv (IL)

( * ) Notice: Subject to any disclaimer, the term of this patent is extended or adjusted under 35 U.S.C. 154(b) by 325 days.

(21) Appl. No.: 14/167,697

(22) Filed: Jan. 29, 2014

Related U.S. Application Data

(60) Provisional application No. 61/893,182, filed on Oct. 19, 2013.

(51) Int. Cl.
*H04B 7/06* (2006.01)
*H01Q 3/26* (2006.01)
*H04B 7/00* (2006.01)
*H01Q 3/00* (2006.01)

(52) U.S. Cl.
CPC ............ *H04B 7/06* (2013.01); *H01Q 3/2682* (2013.01)

(58) Field of Classification Search
CPC .... H04B 7/02; H04B 7/04; H04B 7/06; H04L 49/10; H04L 49/104; H04L 49/105; H04L 49/106; H04W 16/24; H04W 16/28; H01Q 1/12; H01Q 1/22; H01Q 1/24; H01Q 1/241; H01Q 1/246; H01Q 3/22; H01Q 3/24; H01Q 3/26; H01Q 3/2682; H01Q 3/28; H01Q 3/30; H01Q 21/06; H01Q 21/22

USPC .......................................... 342/350, 367–377
See application file for complete search history.

(56) References Cited

U.S. PATENT DOCUMENTS

| | | | | |
|---|---|---|---|---|
| 3,400,405 | A * | 9/1968 | Patterson, Jr. | H01Q 3/2682 333/116 |
| 5,084,708 | A * | 1/1992 | Champeau | H01Q 3/2682 342/375 |
| 5,179,386 | A * | 1/1993 | Rudish | H01Q 3/22 342/371 |
| 5,294,939 | A * | 3/1994 | Sanford | H01Q 3/24 343/836 |
| 5,325,101 | A * | 6/1994 | Rudish | H01Q 3/22 342/372 |
| 5,410,320 | A * | 4/1995 | Rudish | H01Q 3/22 342/368 |
| 5,966,094 | A * | 10/1999 | Ward | H01Q 1/246 342/373 |
| 6,512,481 | B1 * | 1/2003 | Velazquez | H04W 16/28 342/367 |
| 6,728,554 | B1 * | 4/2004 | Wegner | H01Q 1/246 342/373 |
| 7,456,787 | B2 * | 11/2008 | Manasson | H01Q 21/22 342/372 |
| 7,643,794 | B2 * | 1/2010 | Ofek | H01Q 1/246 370/334 |
| 7,953,372 | B2 * | 5/2011 | Ofek | H01Q 1/246 455/63.4 |

(Continued)

*Primary Examiner* — Bernarr Gregory
(74) *Attorney, Agent, or Firm* — Intrinsic Law Corp.; Ibrahim M. Hallaj

(57) ABSTRACT

System and methods for (i) covering wirelessly a large angular span using combinations of directional antennas, (ii) dynamic synthesis of antenna radiation patterns, and (iii) antenna configuration selection and beamforming.

17 Claims, 72 Drawing Sheets

(56) References Cited

U.S. PATENT DOCUMENTS

| | | | |
|---|---|---|---|
| 8,456,360 B2 * | 6/2013 | Manasson | H01Q 21/22 |
| | | | 342/372 |
| 8,610,625 B2 * | 12/2013 | Le Grange | H01Q 3/22 |
| | | | 342/373 |
| 2009/0232063 A1 | 9/2009 | Cordeiro et al. | |
| 2011/0175780 A1 | 7/2011 | Gatti et al. | |
| 2012/0040653 A1 | 2/2012 | Mendis | |
| 2014/0029461 A1 | 1/2014 | Kinamon et al. | |
| 2014/0029599 A1 | 1/2014 | Kinamon et al. | |
| 2014/0369321 A1 | 12/2014 | Tan et al. | |

* cited by examiner

METHODS AND SYSTEMS FOR BEAMFORMING AND ANTENNA SYNTHESIS

RELATED APPLICATIONS

The present application is related to and claims priority under 35 USC §120 to U.S. Provisional Application No. 61/893,182 filed on Oct. 19, 2013, which is hereby incorporated by reference.

TECHNICAL FIELD

The present application relates to the field of wireless communication. More specifically, it relates to wireless communication systems and methods in a beamforming device.

BACKGROUND

Wireless communication systems typically employ high gain antennas to improve reception range and/or capacity of wireless transmissions. Beamforming is a process of generating directionally-preferential beams of a field such as an electromagnetic field in a space. Beamforming can employ phased arrays and other techniques and use superposition of energy fields of a known wavelength.

SUMMARY

One embodiment is a wireless communication system operative to cover a large angular span using combinations of directional antennas, which includes: (i) a plurality of directional antennas each having an associated radiation pattern, placed side-by-side forming a series of directional antennas covering a large angular span, such that each of the associated radiation patterns points to a direction that is unique and offset relative to the other associated radiation patterns, and such that each of the associated radiation patterns partially overlaps with at least one other of the radiation patterns, wherein the wireless communication system is configured to select, out of the plurality of directional antennas, any sequence of at least two successive ones of the directional antennas, (ii) a first radio-frequency transmitter operative to output a first radio-frequency signal, and (iii) a configurable radio-frequency switching fabric operative to split and direct the first radio-frequency signal into combinations of the directional antennas, configured to split and direct the first radio-frequency signal into the at least two directional antennas selected, and consequently configured to generate an enhanced transmission radiation pattern having an enhanced gain and directed in a direction covered mutually by the at least two directional antennas selected and radiation patterns thereof.

One embodiment is a wireless communication system operative to dynamically synthesize antenna radiation patterns, which includes: (i) a plurality of directional antennas each placed in a unique spatial position and each having an associated radiation pattern that at least partially overlap with at least one of the other radiation patterns, wherein the wireless communication system is configured to select, out of the plurality of directional antennas, any sequence of between two and four successive ones of the directional antennas, (ii) a first radio-frequency transmitter operative to output a first radio-frequency signal, (iii) a bank of radio-frequency delay components, each operative to delay the first radio-frequency signal by a predetermined phase, and (iv) a configurable radio-frequency switching fabric coupled to said bank of radio-frequency delay components and operative to split and direct said first radio-frequency signal into combinations of said directional antennas via combinations of said plurality of radio-frequency delay components. The wireless communication system is further configured to match, for each of the directional antennas selected, a specific one of the plurality of radio-frequency delay components such as to achieve phase coherency; and the configurable radio-frequency switching fabric is configured to split and direct the first radio-frequency signal into the directional antenna selected, respectively via the radio-frequency delay components matched, and consequently configured to generate an enhanced transmission radiation pattern having an enhanced gain and directed in a resulting direction, while maintaining, toward the resulting direction, phase coherency among the directional antenna selected, as a result of the matching.

One embodiment is a method for dynamically synthesizing antenna radiation patterns, which includes: selecting, by a wireless communication system, out of a plurality of directional antennas each having an associated radiation pattern that points to a unique direction and that partially overlaps with at least one of the other radiation patterns, a sequence of at least two successive ones of the directional antennas, according to a direction requirement, such that each radiation pattern associated with the at least two selected directional antennas has a component aligned with a direction associated with the direction requirement; matching, by the wireless communication system, at least one of the selected directional antennas with a radio-frequency delay component, according to the direction requirement; and generating, by the wireless communication system, an enhanced radiation pattern having an enhanced gain relative to the radiation patterns, and substantially aligned with the direction associated with the direction requirement, by combining the at least two directional antennas via the radio-frequency delay components, thereby achieving phase coherency among the at least two directional antennas in association with the direction requirement.

IN THE DRAWINGS

The embodiments are herein described, by way of example only, with reference to the accompanying drawings. No attempt is made to show structural details of the embodiments in more detail than is necessary for a fundamental understanding of the embodiments. In the drawings.

DETAILED DESCRIPTION

Figure 1A:
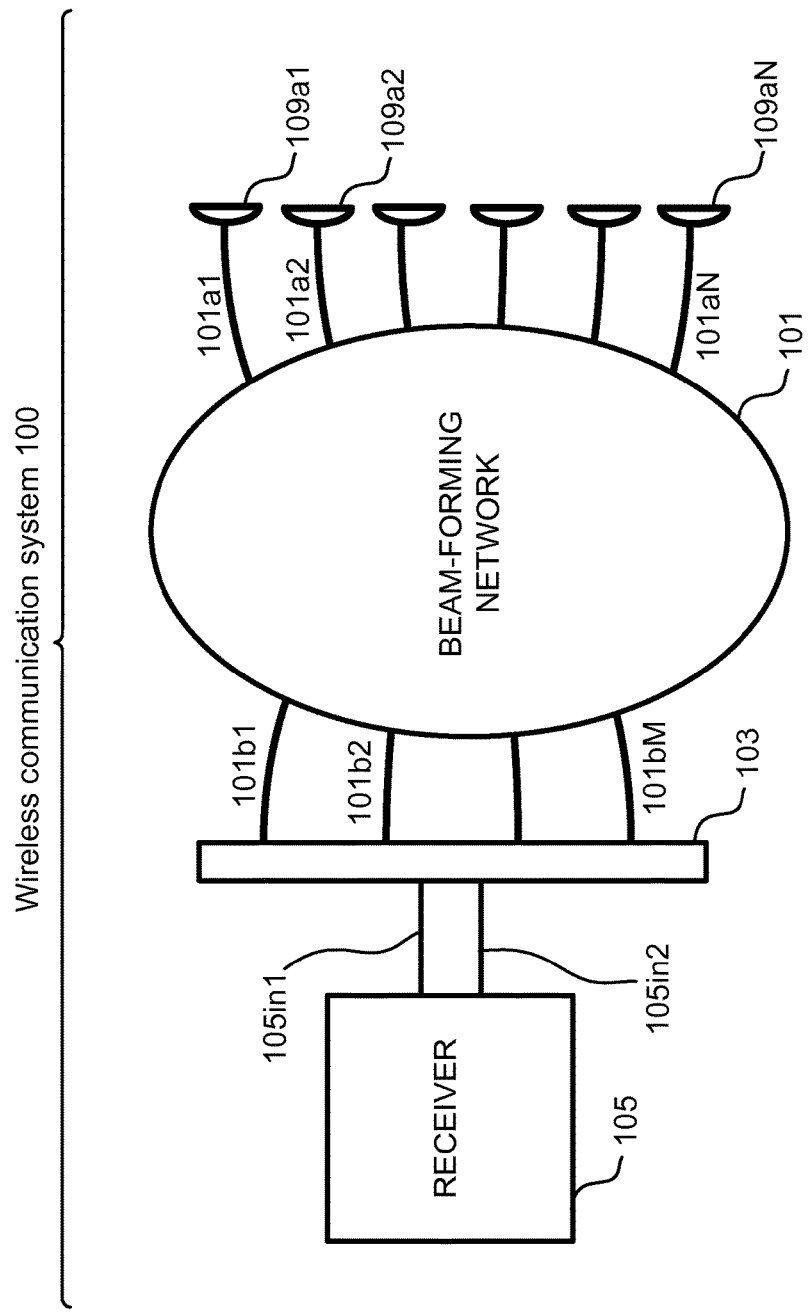
FIG. 1A illustrates one embodiment of a wireless communication system including a receiver and a beam-forming network.
Figure 1B:
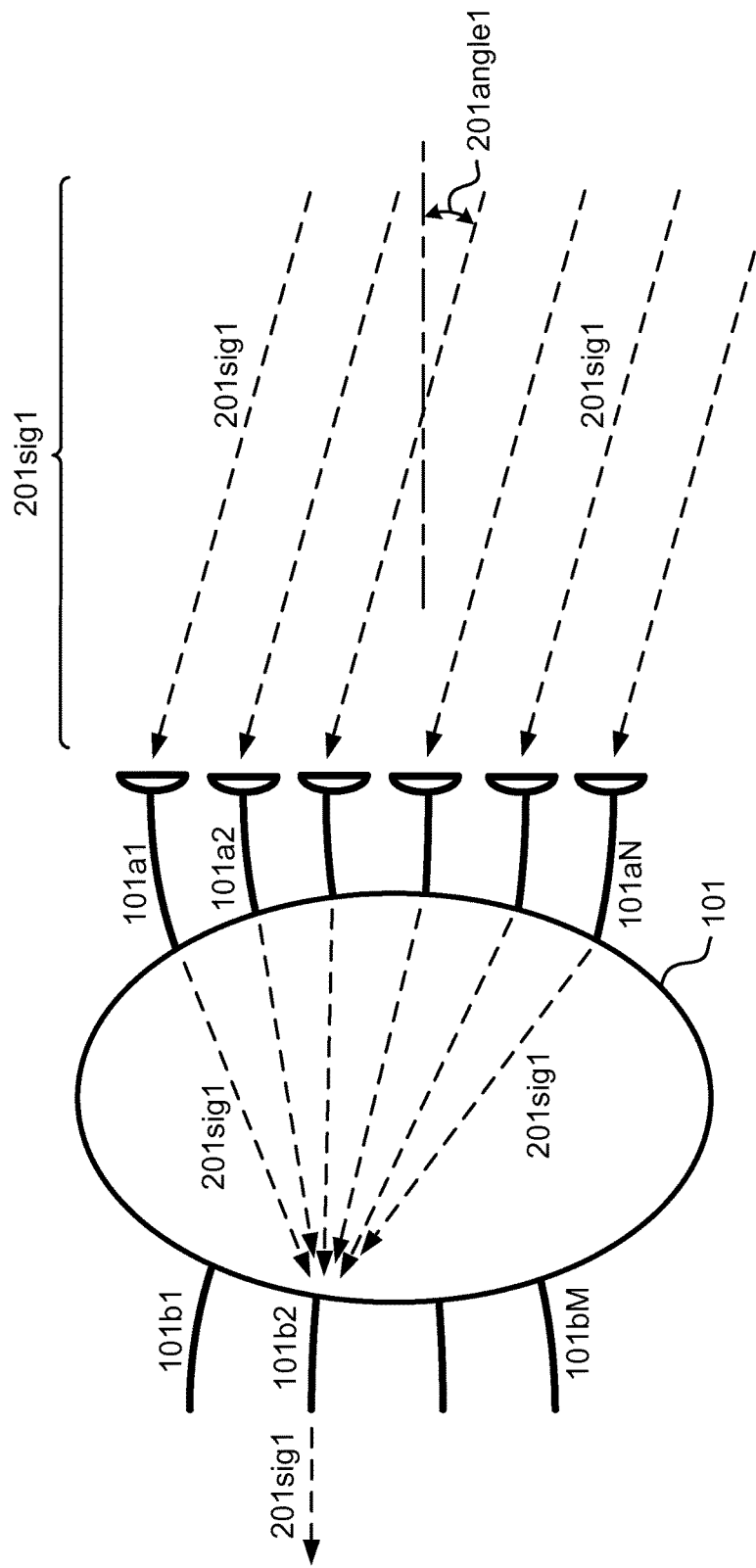
FIG. 1B illustrates one embodiment of a beam-forming network directing a first signal toward one beam-port.
Figure 1C:
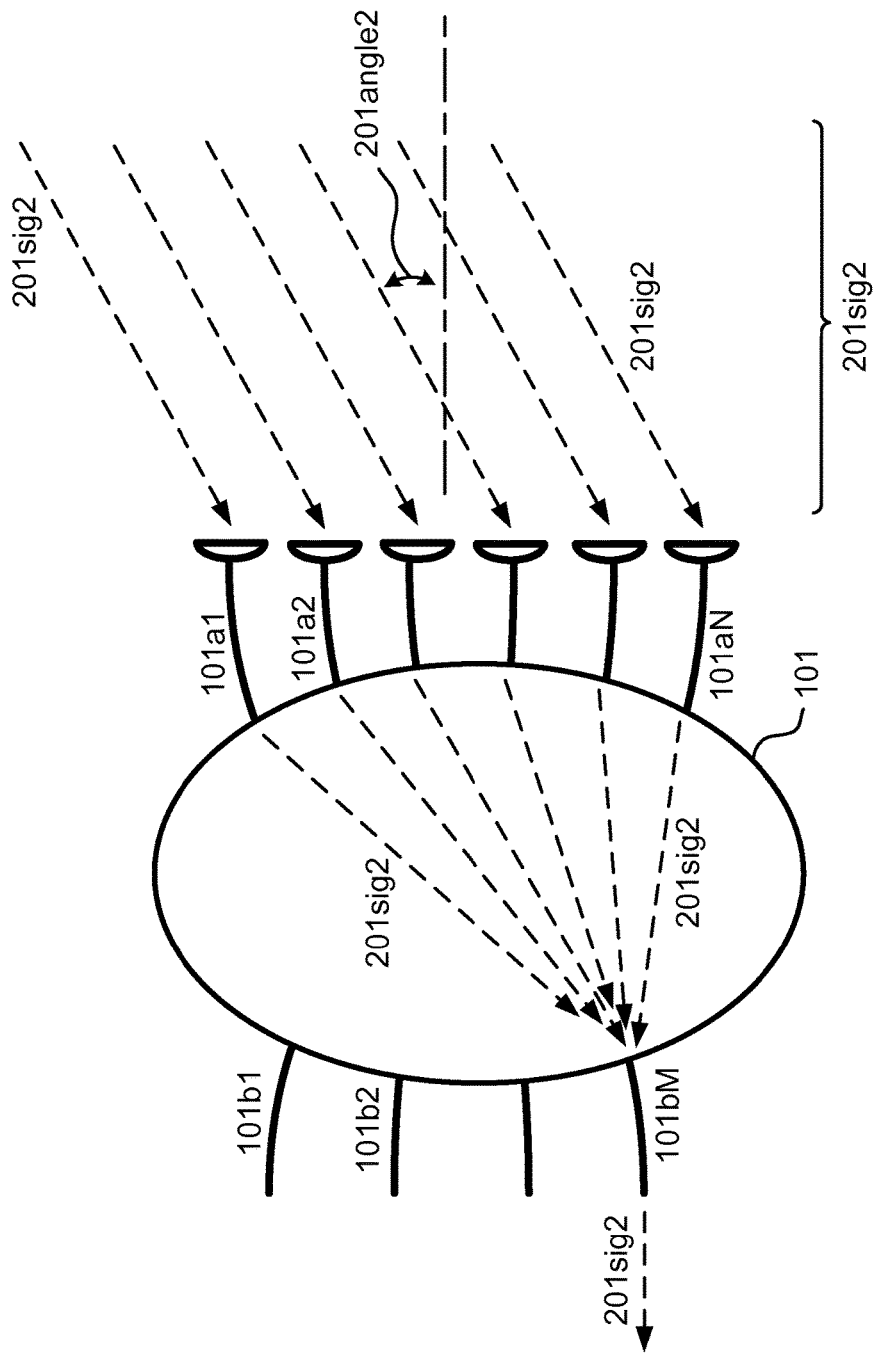
FIG. 1C illustrates one embodiment of a beam-forming network directing a second signal toward another beam-port.
Figure 1D:
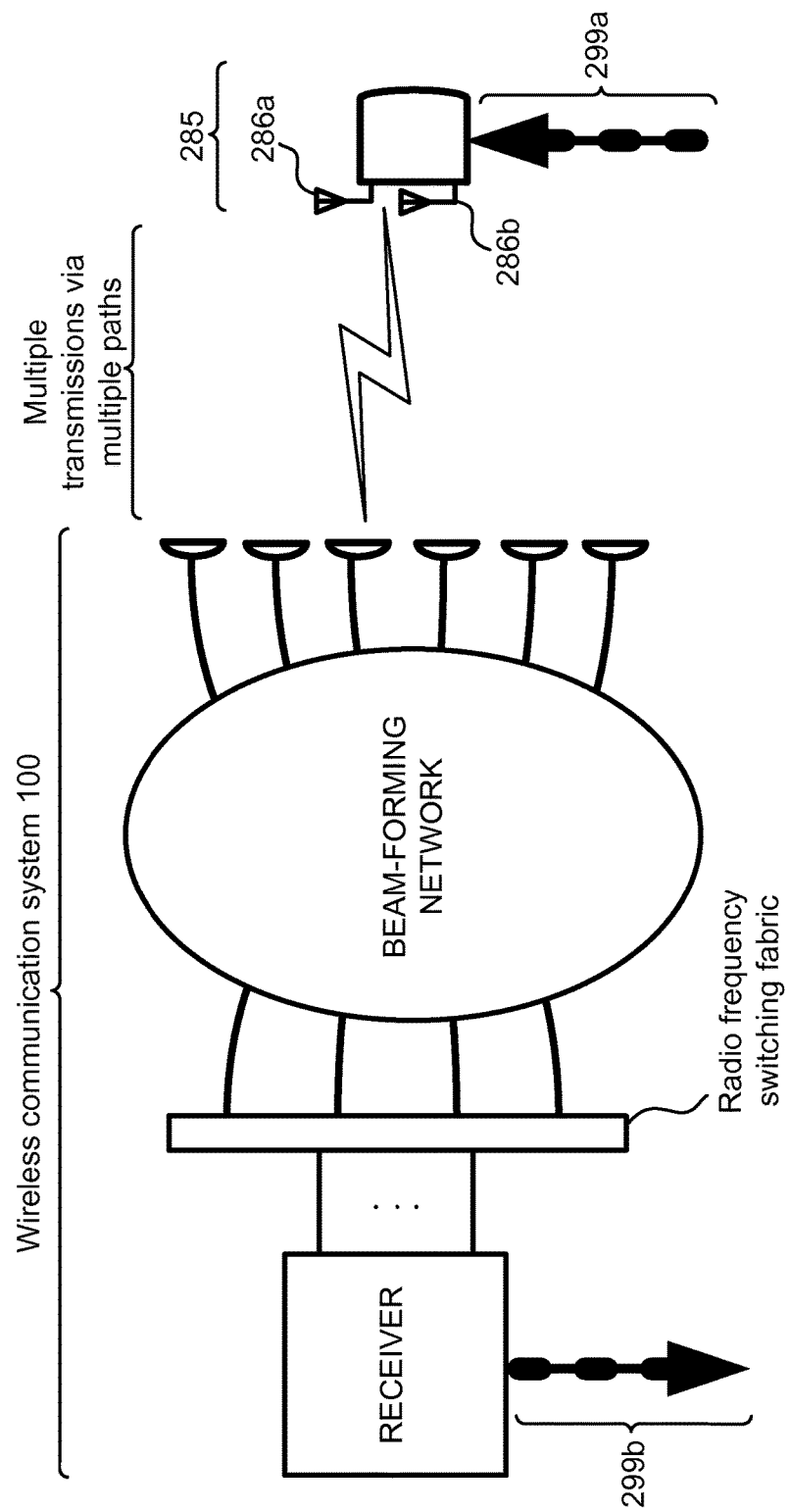
FIG. 1D illustrates one embodiment of a wireless communication system and a remote transceiver.
Figure 1E:
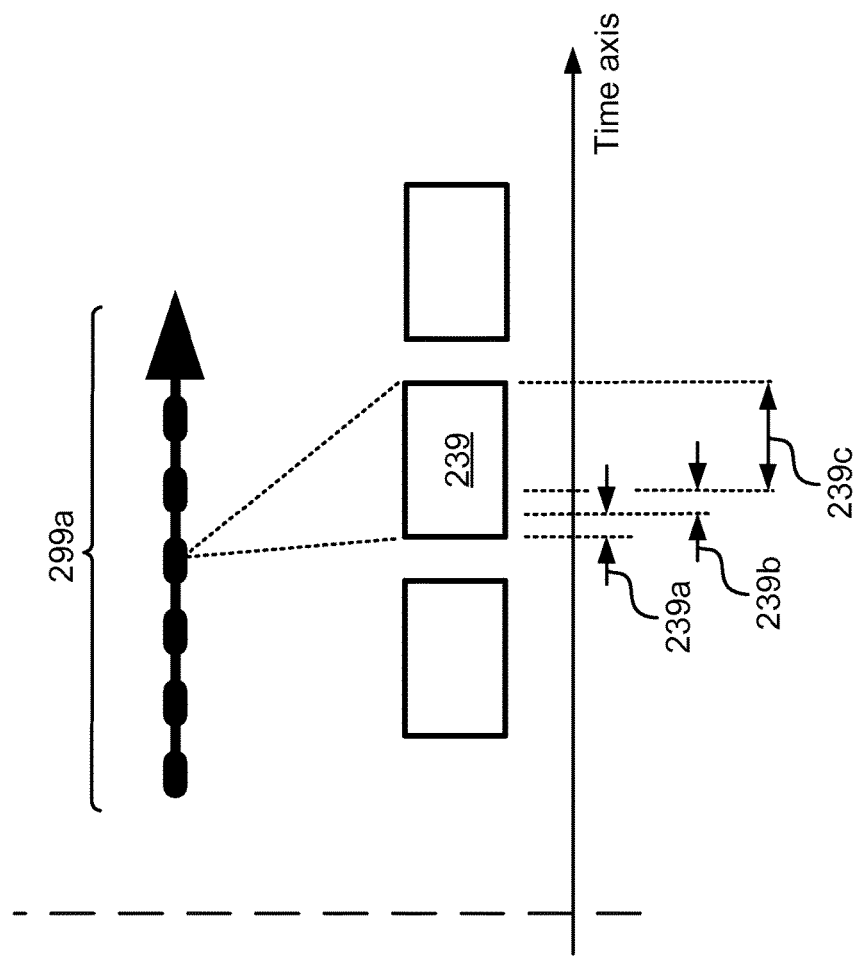
FIG. 1E illustrates one embodiment of a wireless data packet.
Figure 2:
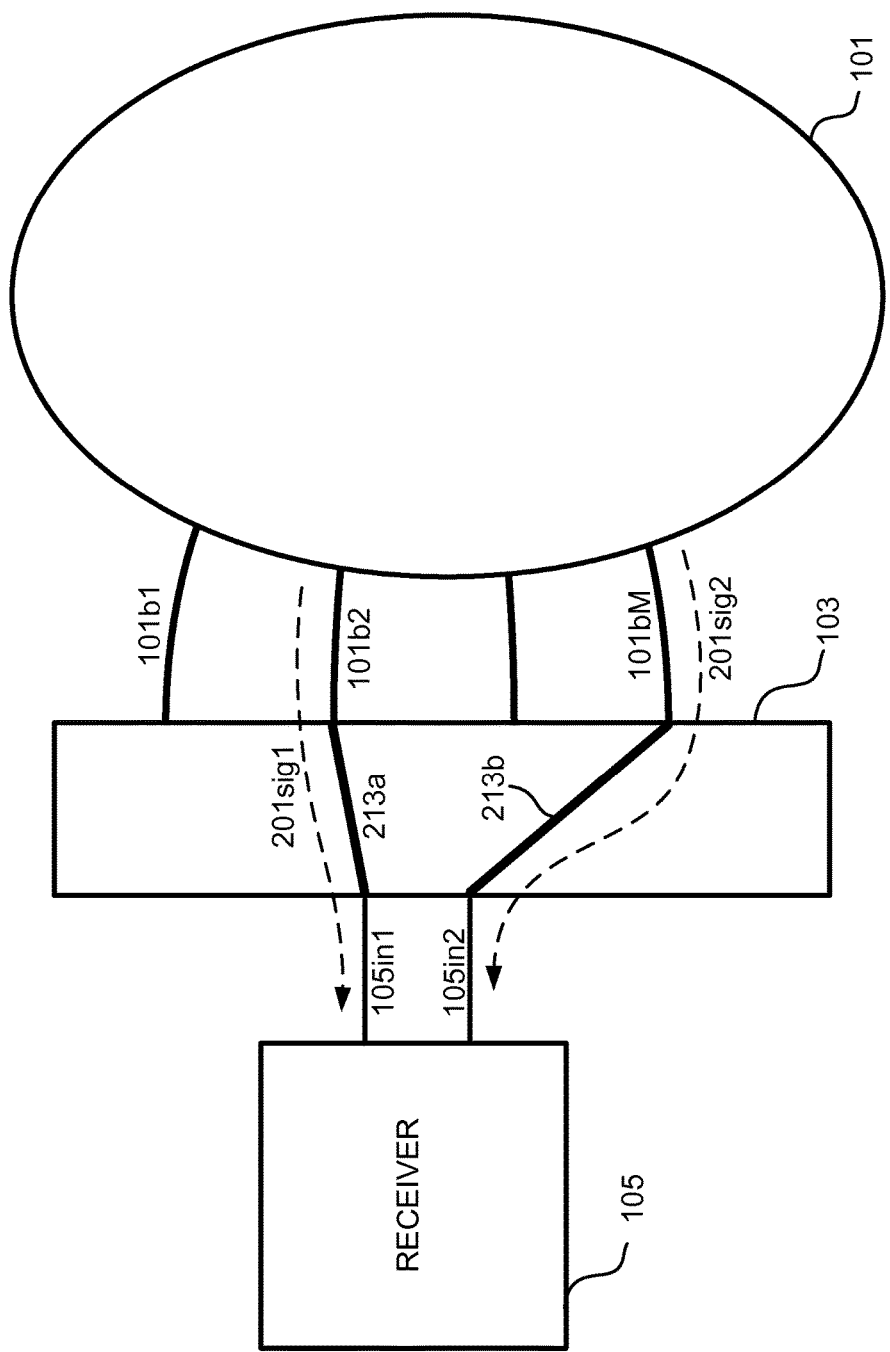
FIG. 2 illustrates one embodiment of switching signals by a radio-frequency switching fabric.

FIG. 1A, FIG. 1B, FIG. 1C, FIG. 1D, FIG. 1E, and FIG. 2 illustrate embodiments of receiving spatially multiplexed wireless signals via a beam-forming network. A wireless communication system 100 includes a beam-forming network 101, which includes a plurality of beam-ports 101$b$1, 101$b$2, and 101$b$M. Wireless communication system 100 detects a first 201angle1 and a second 201angle2 directions through which a first wireless signal 201sig1 and a second wireless signal 201sig2 arrive at said wireless communication system 100 respectively, said first and second wireless signals are a mixture of a first and a second spatially multiplexed wireless signals generated by a remote transceiver 285 from a single data stream 299$a$ using a first 286$a$ and a second 286$b$ remote antennas respectively.

Wireless communication system 100 then: (i) connects 213$a$ a first 101$b$2 of said beam-ports, that is associated with first direction 201angle1, to a first input 105in1 of a receiver 105 belonging to wireless communication system 100, and (ii) connects 213$b$ a second 101$b$M of said beam-ports, that is associated with second direction 201angle2, to a second input 105in2 of receiver 105. Receiver 105 then decodes the first and second wireless signals 201sig1, 201sig2, received via said first and second inputs into said single data stream 299$b$.

In one embodiment, said detection is done utilizing at most a first 4 microsecond 239$a$ of a wireless data packet 239 belonging to said data stream, arriving at wireless communication system 100. In one embodiment, said connection is done at most 2 microseconds 239$b$ after said detection. In one embodiment, said detection and said connection are done fast enough, thereby allowing receiver 105 enough time 239$c$ to decode wireless data packet 239. In one embodiment, said first 4 microseconds of wireless data packet 239 contains preamble information, thereby said connection may occur within said 4 microseconds without losing any data belonging to said single data stream.

In one embodiment, wireless data packet 239 and said spatially multiplexed wireless signals at least partially conform to IEEE-802.11n. In one embodiment, said first and second spatially multiplexed wireless signals are used by the IEEE-802.11n standard to boost transmission rates of single data stream 299$a$. In one embodiment, said spatially multiplexed wireless signals are transported using a frequency range of between 2.4 Ghz and 2.5 Ghz, and beam-forming network 101 operates directly in said frequency range. In one embodiment, said spatially multiplexed wireless signals are transported using a frequency range of between 4.8 Ghz and 5.8 Ghz, and beam-forming network 101 operates directly in said frequency range. In one embodiment, wireless data packet 239 and said spatially multiplexed wireless signals at least partially conform to IEEE-802.11ac. In one embodiment, wireless data packet 239 and said spatially multiplexed wireless signals at least partially conform to IEEE-802.11. In one embodiment, said at most first 4 microseconds of wireless data packet 239 contains preamble information, thereby said connection may occur after said detection without losing any data belonging to single data stream 299$a$.

In one embodiment, beam-forming network 101 is a rotman-lens. In one embodiment, beam-forming network 101 is a butler-matrix. In one embodiment, beam-forming network 101 is a blass-matrix. In one embodiment, beam-forming network 101 is a fixed or passive beam-forming network. In one embodiment, beam-forming network 101 includes a plurality of array-ports 101$a$1, 101$a$2, 101$a$N. In one embodiment, said rotman-lens or butler-matrix concentrates radio-frequency energy arriving at said plurality of array ports into substantially one of said plurality of beam-ports which is determined substantially by an angle of arrival of said radio-frequency energy into said plurality of array ports, thereby said rotman-lens or butler-matrix facilitates detection of said first and second directions through which said first and second wireless signals arrive at wireless communication system 100.

Figure 3:
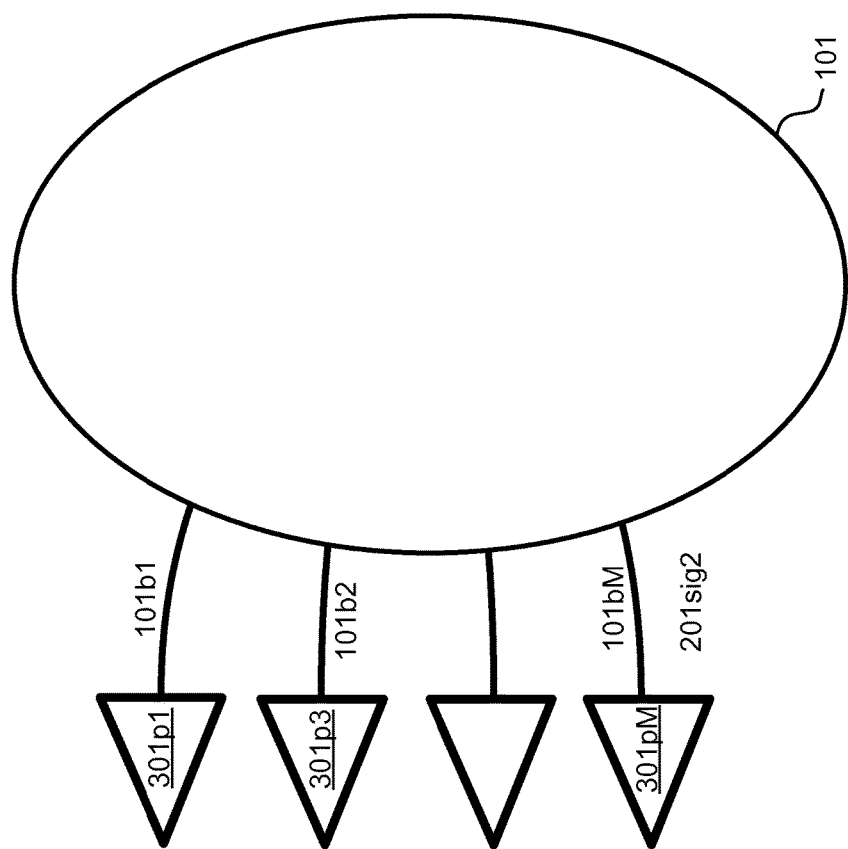
FIG. 3 illustrates one embodiment of power detectors.
Figure 4:
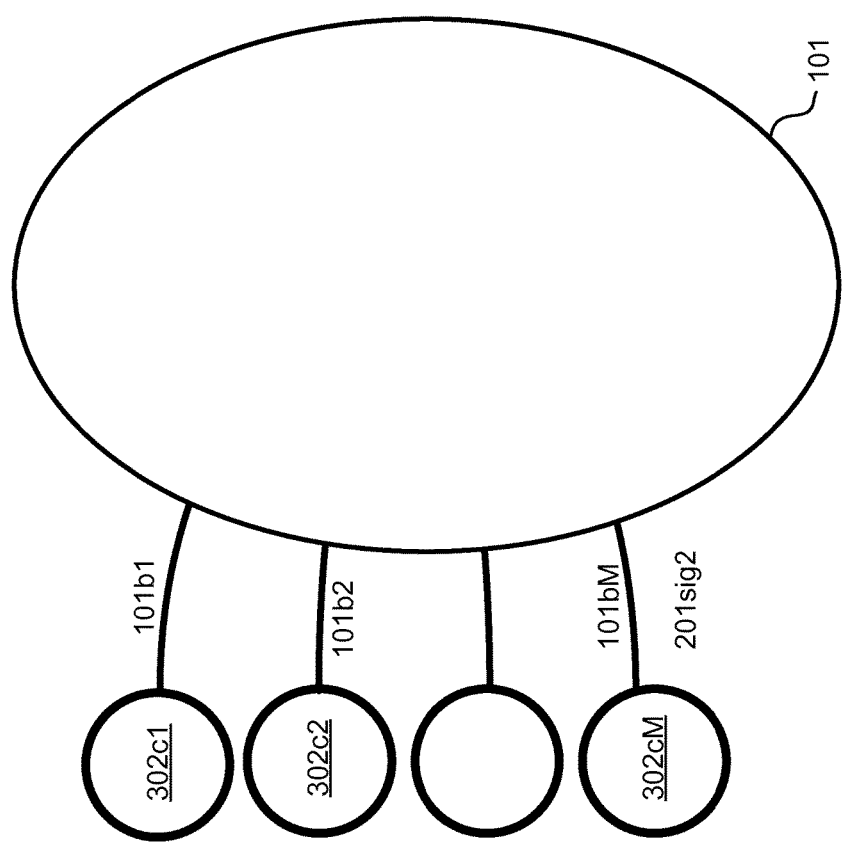
FIG. 4 illustrates one embodiment of correlates.

FIG. 3 and FIG. 4 illustrate embodiments of power detectors and correlators. In one embodiment, said detection of first direction 201angle1 and second direction 201angle2 is done as follows: a plurality of power detectors 301$p$1, 301$p$2, 301$p$M measure a plurality of output power levels of at least some of said plurality of beam-ports respectively. Power detectors 301$p$1, 301$p$2, 301$p$M are connected to beam-ports 101$b$1, 101$b$2, 101$b$M respectively. Wireless communication system 100 then identifies said first 101$b$2 and second 101$b$M beam-ports having strongest of said plurality of output power levels, thereby detecting said first and second directions 201angle1, 201angle2, associated with said first and a second wireless signals 201sig1, 201sig2 respectively. In one embodiment, said identification of said first 101b2 and second 101bM beam-ports may include: (i) sensing 302c2 by wireless communication system 100 a first signature belonging to said first spatially multiplexed wireless signal, said first signature present at said first beam-port 101b1, thereby associating said first beam-port with said first spatially multiplexed wireless signal, and (ii) sensing 302cM, by wireless communication system 100, a second signature belonging to said second spatially multiplexed wireless signal, said second signature present at second beam-port 101bM, thereby associating said second beam-port with said second spatially multiplexed wireless signal.

In one embodiment, said detection of first and second directions 201angle1, 201angle2, in done as follows: wireless communication system 100 measures a plurality of output power levels of at least some of said plurality of beam-ports using power detectors 301p1, 301p2, 301pM connected to beam-ports 101b1, 101b2, 101bM respectively. Then, wireless communication system 100 identifies, according to said measurements, a set of beam-ports having strongest of said plurality of output power levels. Wireless communication system 100 then searches 302 c1, 302c2, and 302cM among said set of beam-ports for a first and a second signatures belonging to said first and second spatially multiplexed wireless signal respectively. Wireless communication system 100 then identifies at least said first signature as being present at said first beam-port 101b2, and at least said second signature as being present at said second beam-port 101bM, thereby associating said first and second spatially multiplexed wireless signals with said first and second beam-ports, thereby achieving said detection.

In one embodiment, said detection of first and second directions 201angle1, 201angle2, in done as follows: wireless communication system 100 searches 302 c1, 302c2, 302cM among said plurality of beam-ports for a first and a second signatures belonging to said first and second spatially multiplexed wireless signals respectively. wireless communication system 100 then identifies at least said first signature as being present at said first beam-port 101b2, and at least said second signature as being present at said second beam-port 101bM, thereby associating said first and second spatially multiplexed wireless signals with said first and second spatially multiplexed wireless signals with said first and second directions 201angle1, 201angle2, thereby achieving said detection.

In one embodiment, said detection, connection, and decoding, involves a third wireless signal which is a mixture of said first spatially multiplexed wireless signal, said second spatially multiplexed wireless signal, and a third spatially multiplexed wireless signal. In one embodiment, said detection, connection, and decoding, involves a third and a fourth wireless signals which are a mixture of said first spatially multiplexed wireless signal, said second spatially multiplexed wireless signal, a third spatially multiplexed wireless signal, and a fourth spatially multiplexed wireless signal.

Figure 5A:
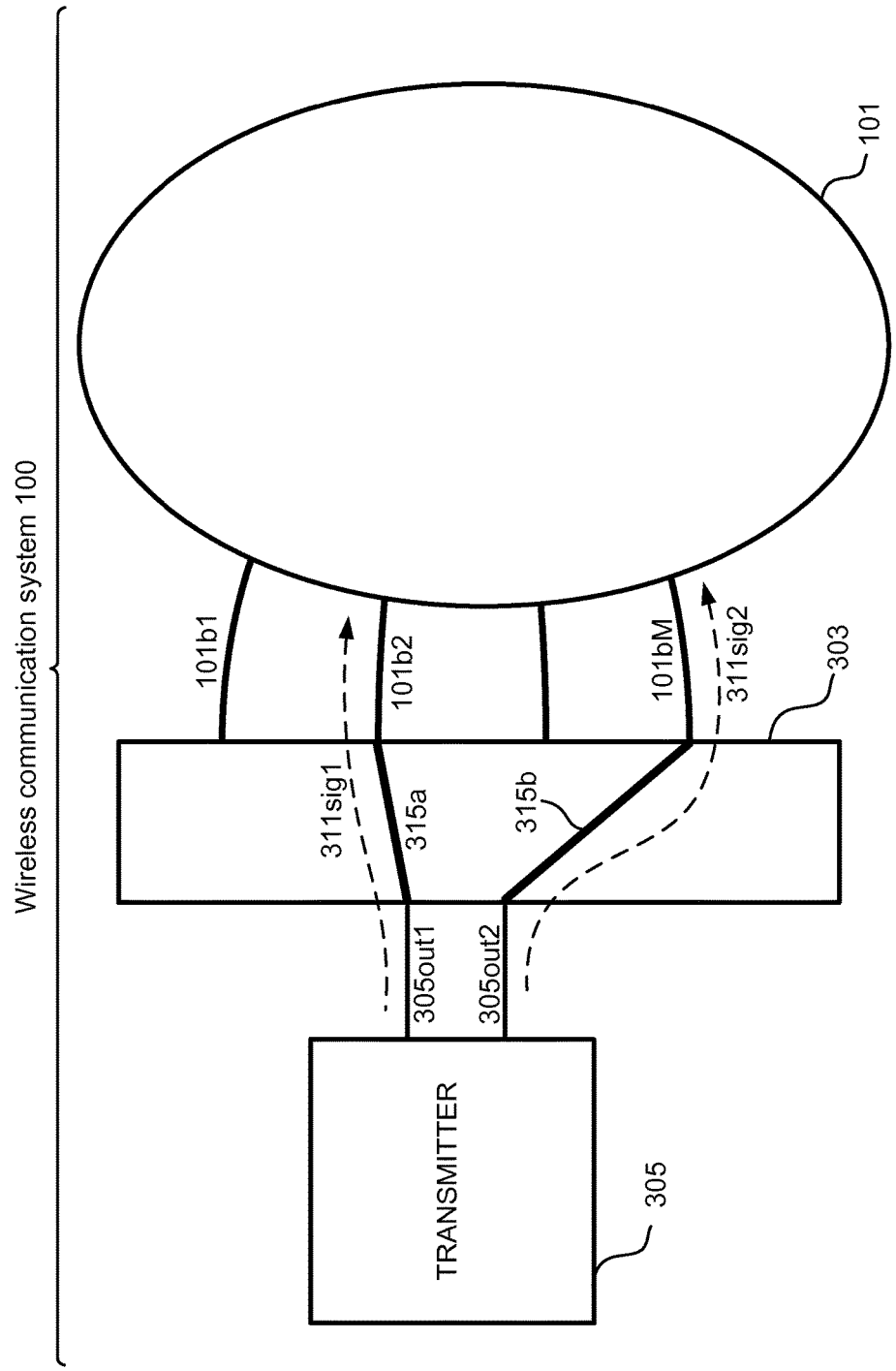
FIG. 5A illustrates one embodiment of a transmitter transmitting via a beam-forming network.
Figure 5B:
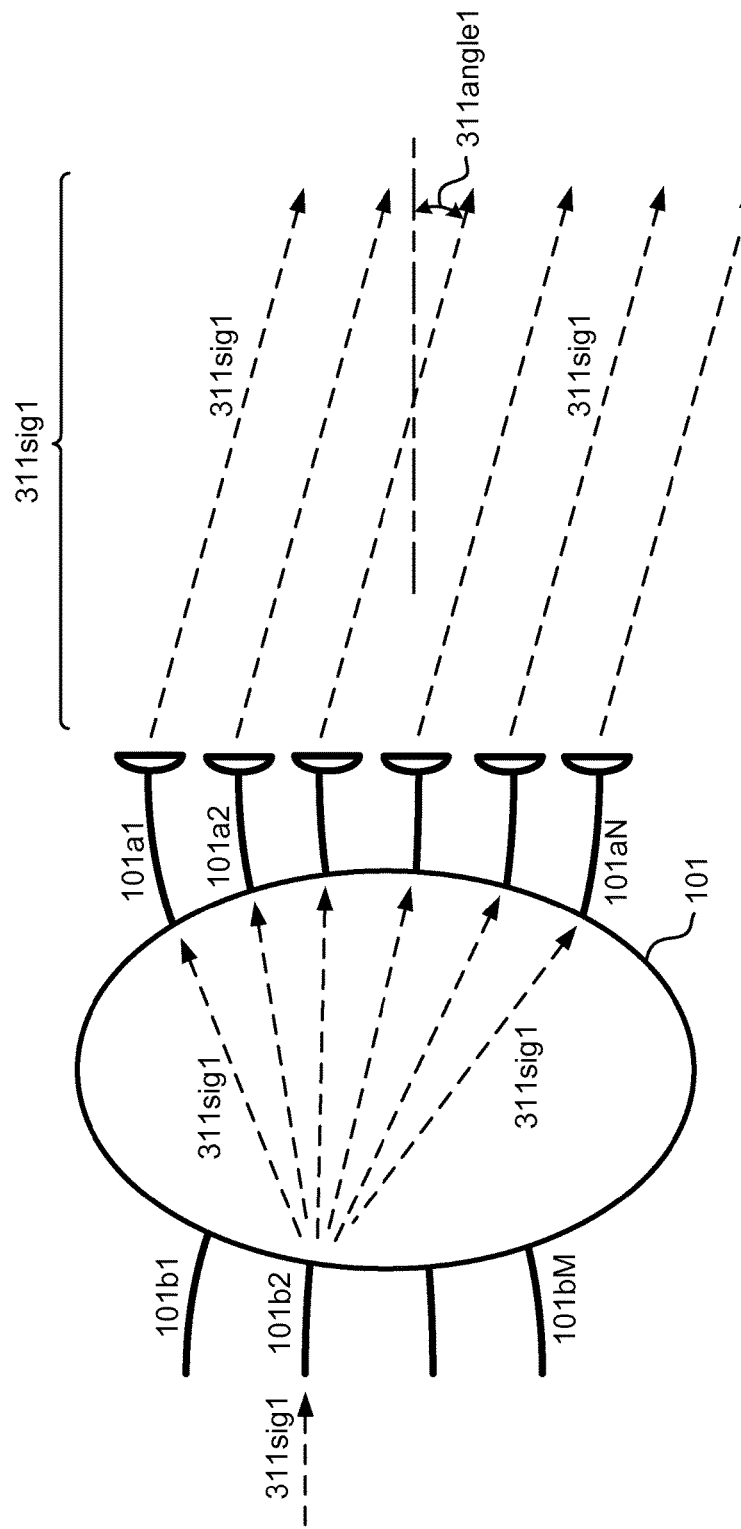
FIG. 5B illustrates one embodiment of directing a first signal via a beam-forming network.
Figure 5C:
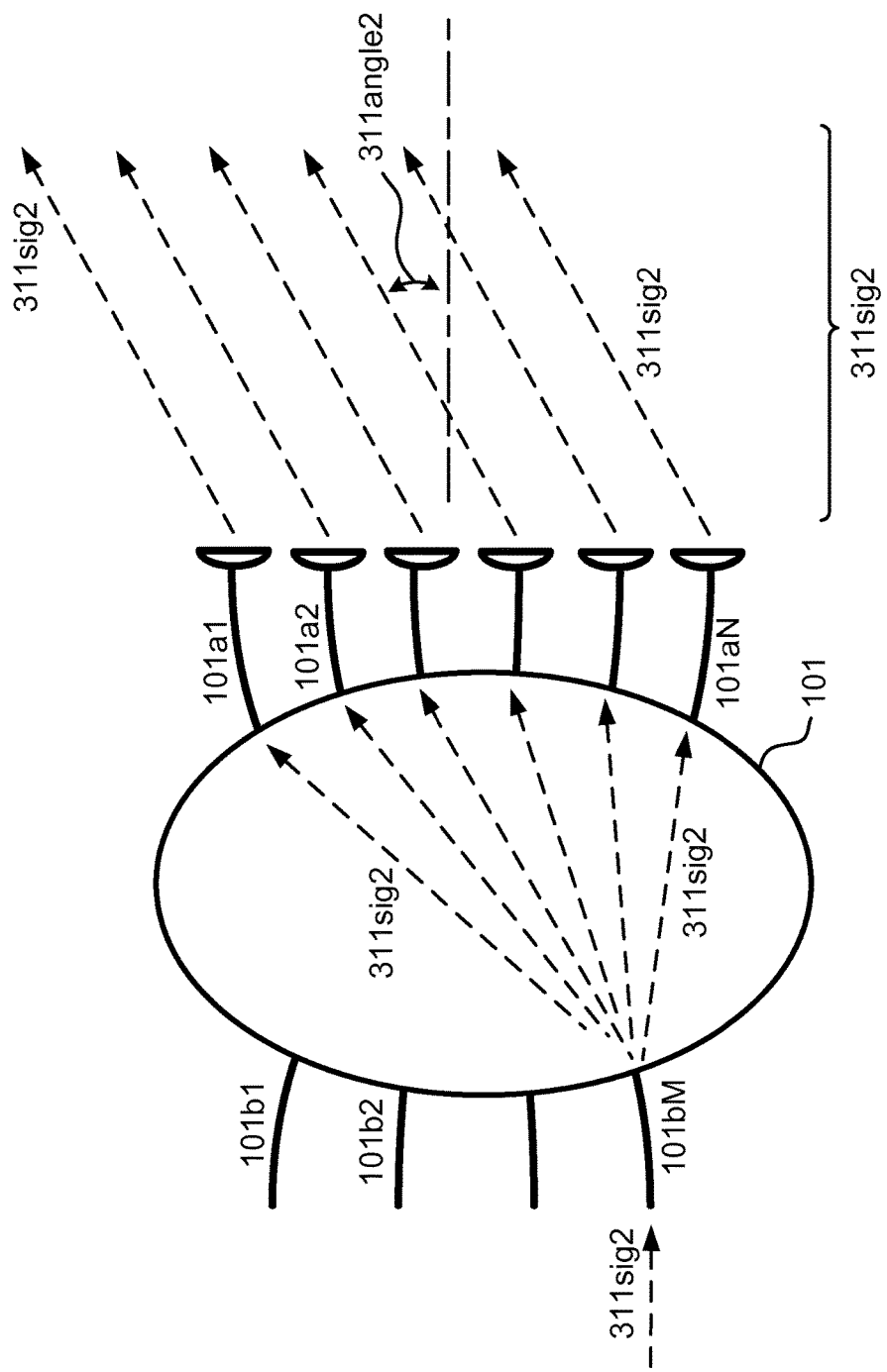
FIG. 5C illustrates one embodiment of directing a second signal via a beam-forming network.

FIG. 5A, FIG. 5B, and FIG. 5C illustrate embodiments of transmitting via a beam-forming network. In one embodiment, wireless communication system 100 uses a radio frequency switching fabric 303 to: (i) connect 315a a first output 305out1 of a transmitter 305 to said first beam port 101b2, and (ii) connect 315b a second output 305out2 of said transmitter to said second beam port 101bM. Wireless communication system 100 then transmits using said transmitter: (i) a first wireless transmit signal 311sig1 via said first output, and (ii) a second wireless transmit signal 311sig2 via said second output, thereby: (i) directing 311angle1 said first wireless transmit signal 311sig1 toward remote transceiver 285, and (ii) directing 311angle2 said second wireless transmit signal 311sig2 toward remote transceiver 285. In one embodiment, said first and second wireless transmit signals are two spatially multiplexed signals intended for decoding by said remote transceiver into a single data stream. In one embodiment, said first and second wireless transmit signals are two cyclic-delay-diversity signals intended for decoding by said remote transceiver.

In one embodiment, wireless communication system 100 together with remote transceiver 285 constitutes a multiple-input-multiple-output communication system.

In one embodiment, a reception range of spatially multiplexed wireless signals is boosted using a rotman-lens or butler-matrix. A rotman-lens or butler-matrix 101, comprising a plurality of beam-ports 101b1, 101b2, 101bM, concentrates a first wireless signal 201sig1 arriving at a plurality of array ports 101a1, 101a2, 101aN belonging to said rotman-lens or butler-matrix, substantially into one 101b2 of said plurality of beam-ports, said one of beam-ports is determined substantially by an angle of arrival 201angle1 of said first wireless signal into said plurality of array ports. Rotman-lens or butler-matrix 101 concentrates a second wireless signal 201sig2 arriving at said plurality of array ports, substantially into another 101bM of said plurality of beam-ports, said another beam-ports is determined substantially by an angle of arrival 201angle2 of said second wireless signal into said plurality of array ports. The first 201sig1 and second 201sig2 wireless signals are a mixture of a first and a second spatially multiplexed wireless signals generated by a remote transceiver 285 from a single data stream 299a using a first 286a and a second 286b remote antennas respectively. Wireless communication system 100 detects presence of said first and second wireless signals 201sig1, 201sig2 at said one and another 101b2, 101bM of beam-ports respectively, out of a possibility of presence at other beam-ports of said plurality of beam-ports. Wireless communication system 100 connects 213a, 213b: (i) said one beam-port 101b2 to a first input 105in1 of a receiver 105 belonging to said wireless communication system, and (ii) said another beam-port 101bM to a second input 105in2 of said receiver. Receiver 105 then decodes said first wireless signal 201sig1 arriving via said first input 105in1, together with said second wireless signal 201sig2 arriving via said second input 105in2, into said single data stream 299b.

In one embodiment, said detection is done as follows: (i) measuring a plurality of output power levels of at least some of said plurality of beam-ports 101b1, 101b2, 101bM respectively, by using a plurality of power detectors 301p1, 301p2, 301pM connected to said plurality of beam-ports respectively, said plurality of power detectors belonging to wireless communication system 100, and (ii) identifying, by wireless communication system 100, said one beam-port 101b2 and said another beam-port 101bM as having strongest of said plurality of output power levels.

In one embodiment, said detection is done as follows: (i) searching 302c1, 302c2, 302cM, by wireless communication system 100, among said plurality of beam-ports 101b1, 101b2, 101bM, for a first and a second signatures belonging to said first and second spatially multiplexed wireless signal respectively, (ii) identifying at least said first signature as being present at said one beam-port 101b2, and at least said second signature as being present at said another beam-port 101bM, thereby detecting said one and another of beam-ports 101b2, 101bM out of said plurality of beam-ports.

In one embodiment, wireless communication system 100 receives from a remote transceiver 285, via a plurality of antennas 109a1, 109a2, 109aN connected to said plurality of array-ports 101a1, 101a2, 101aN respectively, said first and second wireless signals 201sig1, 201sig2, thereby facilitating a substantial array gain associated with said plurality of antennas.

In one embodiment, a wireless communication system 100 boosts reception range of wireless signals using a rotman-lens or butler-matrix. A rotman-lens or butler-matrix 101, comprising a plurality of beam-ports 101b1, 101b2, 101bM, is operative to: (i) focus a first wireless signal 201sig1 arriving at a plurality of array ports 101a1, 101a2, 101aN belonging to said rotman-lens or butler-matrix, substantially into one of said plurality of beam-ports 101b2, said one of beam-ports is determined substantially by an angle of arrival 201angle1 of said first wireless signal into said plurality of array ports, and (ii) focus a second wireless signal 201sig2 arriving at said plurality of array ports, substantially into another of said plurality of beam-ports 101bM, said another beam-ports is determined substantially by an angle of arrival 201angle2 of said second wireless signal into said plurality of array ports. A wireless communication system 100, to which said rotman-lens or butler-matrix 101 belongs, detects presence of said first 201sig1 and second 201sig2 wireless signals at said one 101b2 and another 101bM of beam-ports respectively. A radio-frequency switching fabric 103: (i) connects 213a said one beam-port 101b2 to a first input 105in1 of a receiver 105 belonging to wireless communication system 100, and (ii) connects 213b said another beam-port 101bM to a second input 105in2 of said receiver.

In one embodiment, said first and second wireless signals 201sig1, 201sig2 are a mixture of a first and a second spatially multiplexed wireless signals generated by a remote transceiver 285 from a single data stream 299a using a first 286a and a second 286b remote antennas respectively, and said receiver 105 is operative to decode said first wireless signal 201sig1 arriving via said first input 105in1, together with said second wireless signal 201sig2 arriving via said second input 105in2, into said single data stream 299b.

In one embodiment, a plurality of power detectors 301p1, 301p2, and 301pM is connected to said plurality of beam-ports 101b1, 101b2, 101bM respectively. Said power detectors measure a plurality of output power levels of at least some of said plurality of beam-ports respectively. Wireless communication system 100 identifies said one beam-port 101b2 and said another beam-port 101bM as having strongest of said plurality of output power levels.

In one embodiment, at least one correlator 302c1, 302c2, 302cM, belonging to said wireless communication system 100, is operative to: (i) search, among said plurality of beam-ports 101b1, 101b2, 101bM, for a first and a second signatures belonging to said first and second spatially multiplexed wireless signal respectively, and (ii) identify at least said first signature as being present at said one beam-port 101b2, and at least said second signature as being present at said another beam-port 101bM, thereby detecting said one and another of beam-ports, out of said plurality of beam-ports.

In one embodiment, a plurality of antennas 109a1, 109a2, 109aN connects to said plurality of array-ports 101a1, 101a2, 101aN respectively. Antennas 109a1, 109a2, 109aN receive from a remote transceiver said first and second wireless signals 201sig1, 201sig2, thereby facilitating a substantial array gain associated with said plurality of antennas. In one embodiment said plurality of antennas produce a gain in excess of 10 dBi. In one embodiment, said plurality of antennas produce a gain in excess of 14 dBi. In one embodiment, said pluralities of antennas produce a gain in excess of 18 dBi. In one embodiment, there are 4 of said plurality of antennas present. In one embodiment, there are 4 of said plurality of array-ports, and 8 of said plurality of beam-ports present. In one embodiment, there are 6 of said plurality of antennas present. In one embodiment, there are 6 of said plurality of array-ports, and 8 of said plurality of beam-ports present. In one embodiment, there are 6 of said plurality of array-ports, and 16 of said plurality of beam-ports present. In one embodiment, there are 8 of said plurality of antennas present. In one embodiment, said rotman-lens or butler-matrix 101 and radio-frequency switching fabric 103 operate at a frequency range of between 2.4 Ghz and 2.5 Ghz. In one embodiment, said rotman-lens or butler-matrix 101 and radio-frequency switching fabric 103 operate at a frequency range of between 4.8 Ghz and 5.8 Ghz.

Figure 6:
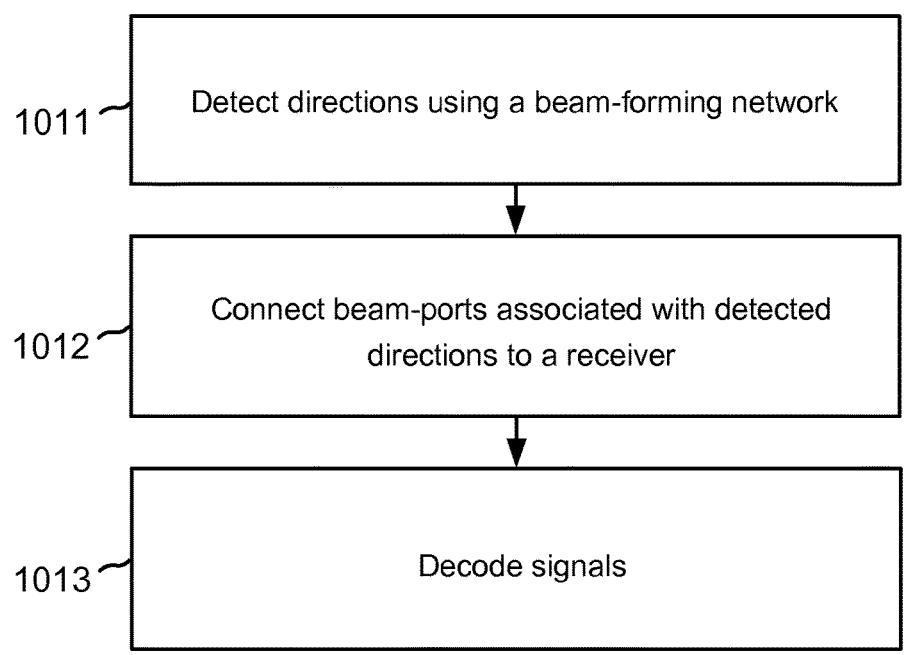
FIG. 6 is one embodiment of a flow diagram for receiving signals.

FIG. 6 is a flow diagram illustrating one embodiment of receiving spatially multiplexed wireless signals via a beam-forming network. In step 1011: detecting, using a beam-forming network 101 comprising a plurality of beam-ports 101b1, 101b2, 101bM and belonging to a wireless communication system 100, a first 201angle1 and a second 201angle2 directions through which a first 201sig1 and a second 201sig2 wireless signals arrive at said wireless communication system respectively, said first and second wireless signals are a mixture of a first and a second spatially multiplexed wireless signals generated by a remote transceiver 285 from a single data stream 299a using a first 286a and a second 286b remote antennas respectively. In step 1012: connecting 213a, 213b, by said wireless communication system 100: (i) a first 101b2 of said beam-ports, that is associated with said first direction, to a first input 105in1 of a receiver 105 belonging to wireless communication system 100, and (ii) a second 101bM of said beam-ports, that is associated with said second direction, to a second input 105in2 of said receiver. In step 1013: decoding, by said receiver, the first and second wireless signals 201sig1, 201sig2 received via said first and second inputs 105in1, 105in2, into said single data stream 299b.

Figure 7:
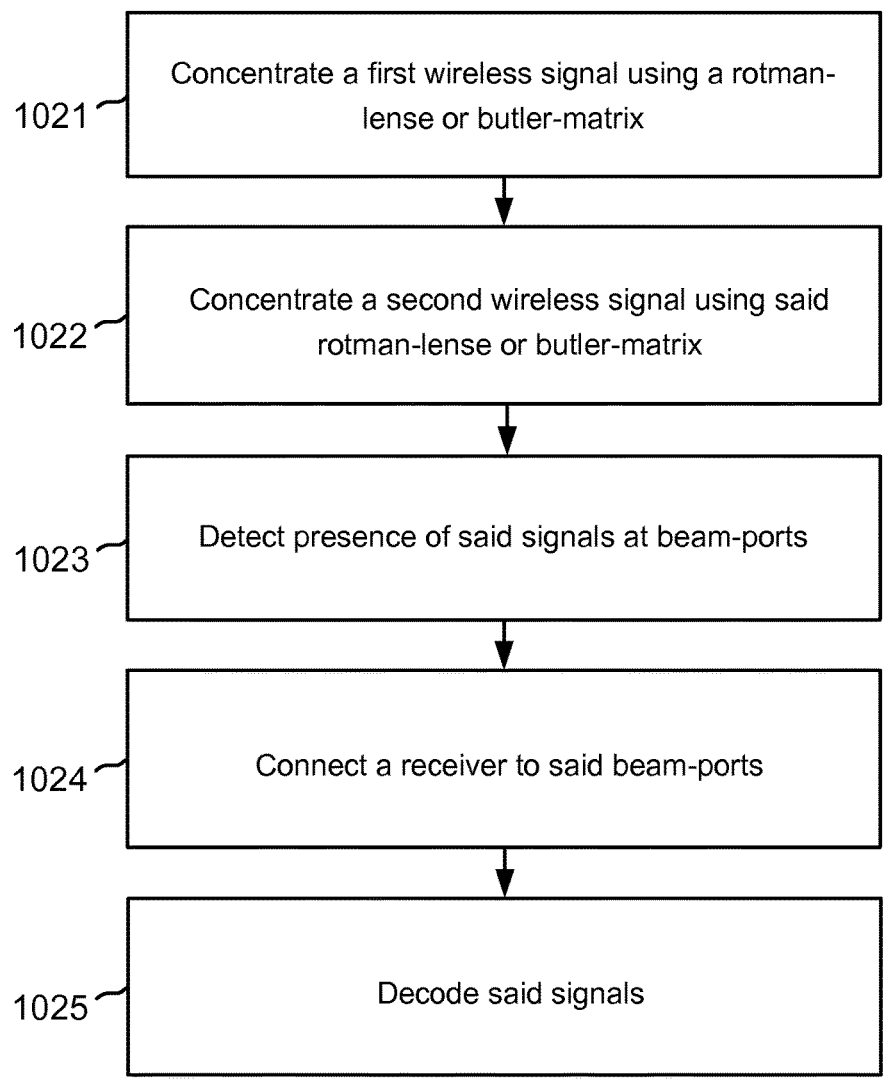
FIG. 7 is one embodiment of a flow diagram for receiving signals.

FIG. 7 is a flow diagram illustrating one embodiment of boosting reception range of spatially multiplexed wireless signals using a rotman-lens or butler-matrix. In step 1021: concentrating, by a rotman-lens or butler-matrix 101 comprising a plurality of beam-ports 101b1, 101b2, 101bM a first wireless signal 201sig1 arriving at a plurality of array ports 101a1, 101a2, 101aN belonging to said rotman-lens or butler-matrix, substantially into one 101b2 of said plurality of beam-ports, said one of beam-ports is determined substantially by an angle of arrival 201angle1 of said first wireless signal into said plurality of array ports. In step 1022: concentrating, by said rotman-lens or butler-matrix, a second wireless signal 201sig2 arriving at said plurality of array ports, substantially into another 101bM of said plurality of beam-ports, said another beam-ports is determined substantially by an angle of arrival 201angle2 of said second wireless signal into said plurality of array ports, wherein said first and second wireless signals are a mixture of a first and a second spatially multiplexed wireless signals generated by a remote transceiver 285 from a single data stream 299a using a first 286a and a second 286b remote antennas respectively. In step 1023: detecting, by a wireless communication system 100 to which said rotman-lens or butler-matrix belongs, presence of said first and second wireless signals 201sig1, 201sig2 at said one and another of beam-ports 101b2, 101bM respectively, out of a possibility of presence at other beam-ports of said plurality of beam-ports. In step 1024: connecting 213a, 213b by wireless communication system 100: (i) said one beam-port 101b2 to a first input 105in1 of a receiver 105 belonging to said wireless communication system, and (ii) said another beam-port 101bM to a second input 105in2 of said receiver. In step 1025: decoding, by said receiver 105, said first wireless signal 201sig1 arriving via said first input 105in1, together with said second wireless signal 201sig2 arriving via said second input 105in2, into said single data stream 299b.

Figure 8A:
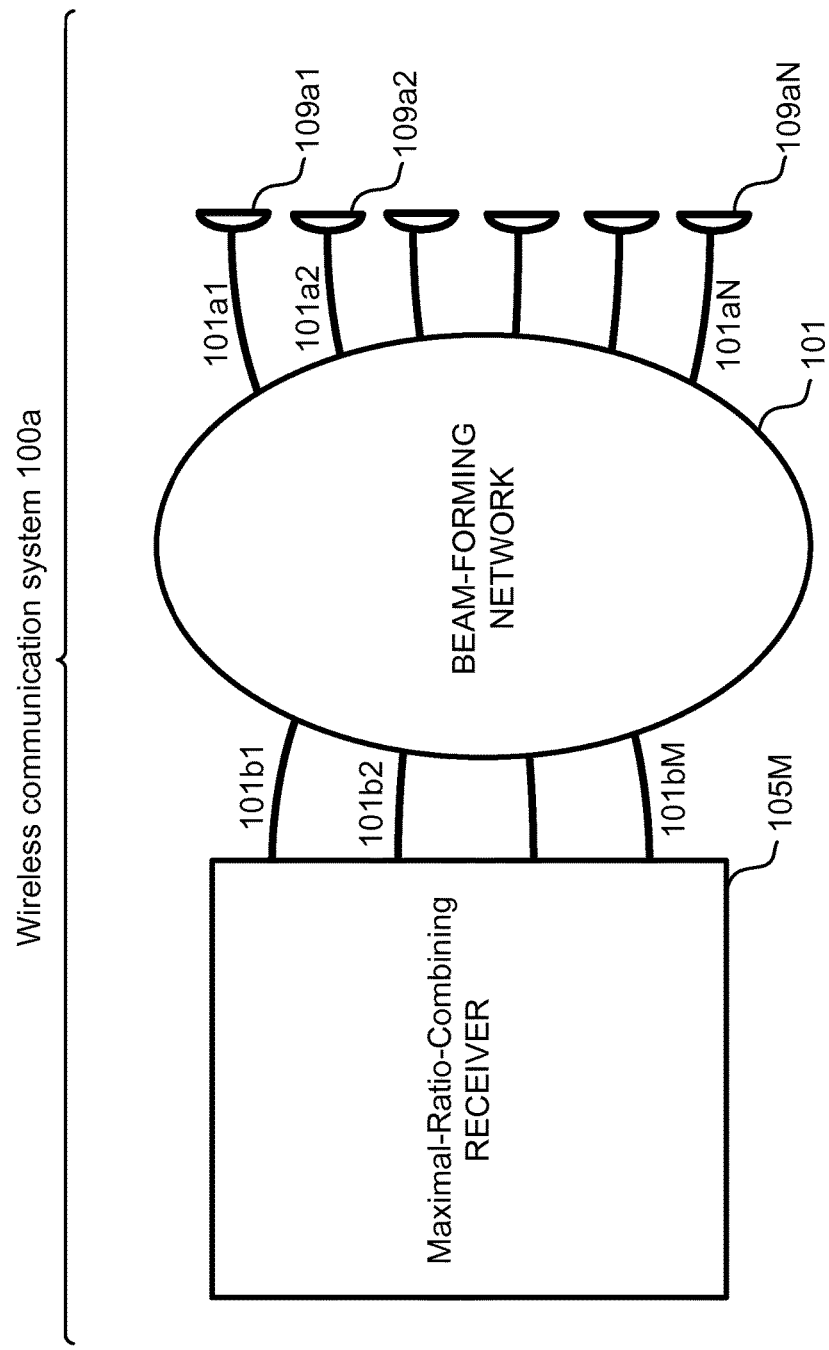
FIG. 8A illustrates one embodiment of a wireless communication system including a receiver and a beam-forming network.
Figure 8B:
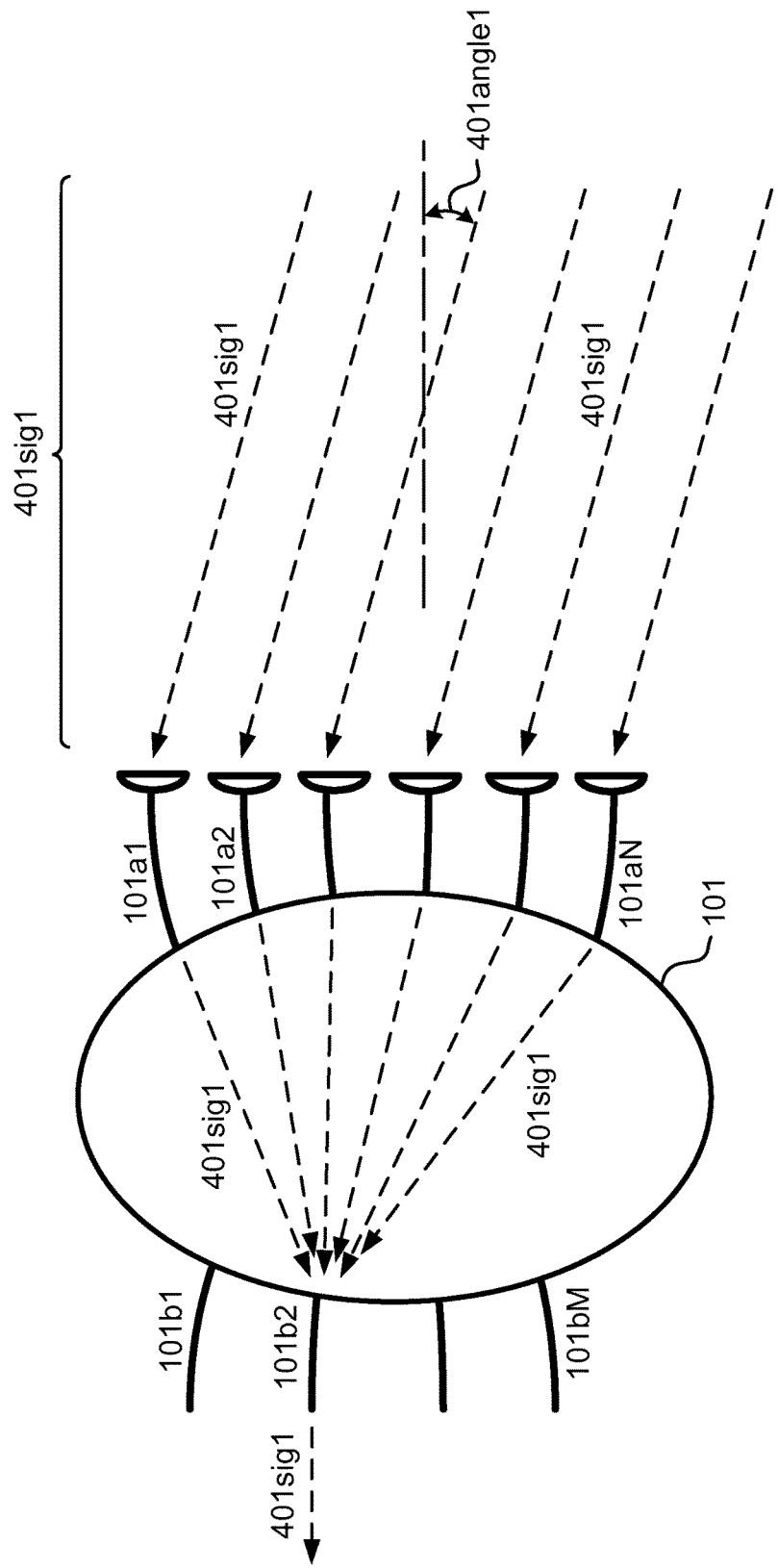
FIG. 8B illustrates one embodiment of a beam-forming network directing a first signal toward one beam-port.
Figure 8C:
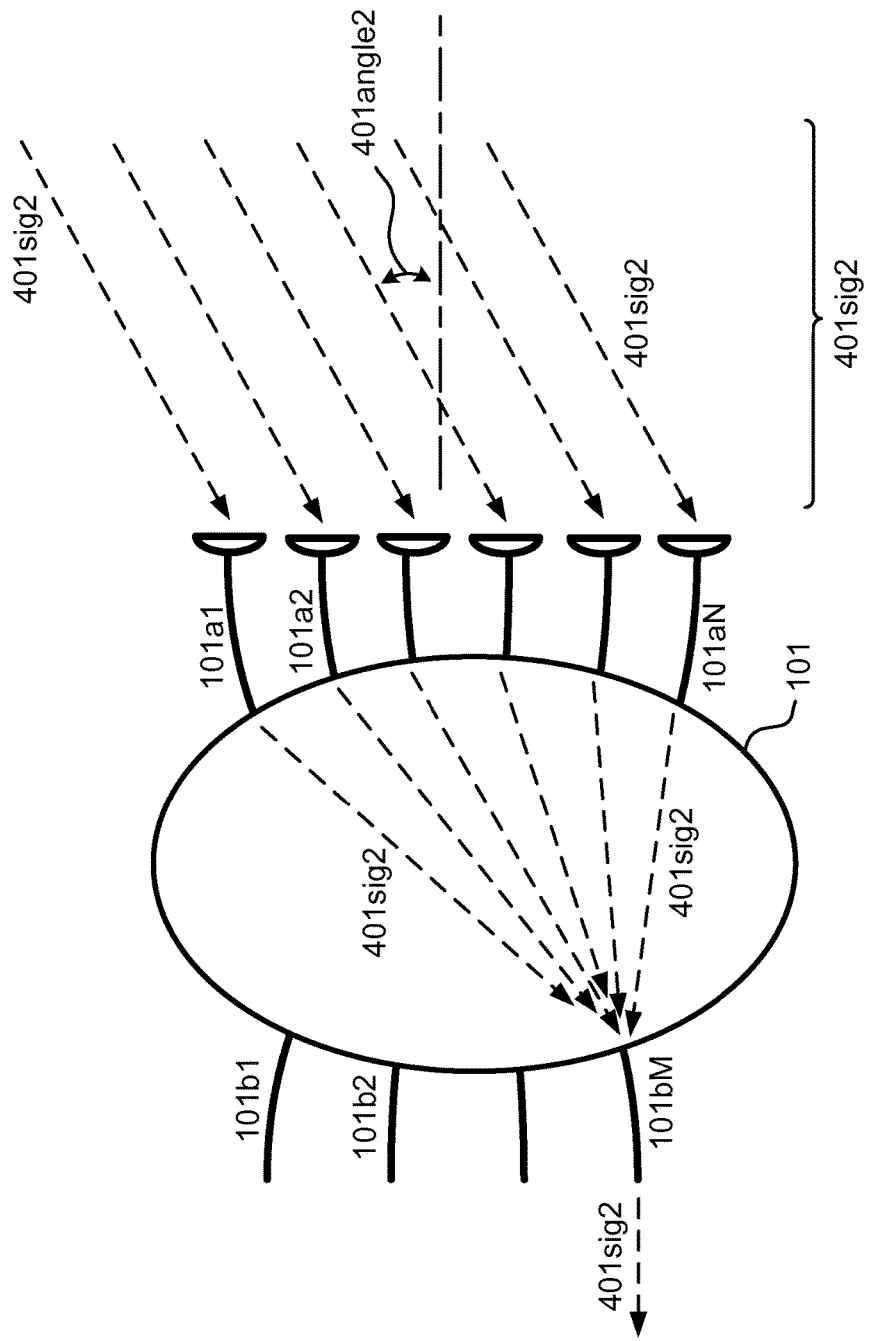
FIG. 8C illustrates one embodiment of a beam-forming network directing a second signal toward another beam-port.

FIG. 8A, FIG. 8B, FIG. 8C illustrate one embodiment for receiving multiple signals using maximal-ratio-combining and a beam-forming network. A beam-forming network 101 comprising a plurality of beam-ports 101b1, 101b2, 101bM concentrates: (i) a first wireless signal 401sig1 arriving at a plurality of array ports 101a1, 101a2, 101aN belonging to said beam-forming network, substantially into one 101b2 of said plurality of beam-ports, and (ii) a second wireless signal 401sig2 arriving at said plurality of array ports, substantially into another 101bM of said plurality of beam-ports, said second wireless signal is a multi-path version of said first wireless signal. A receiver 105M combines said first and second wireless signals, which arrive at said receiver via said one and another of beam-ports respectively, into a third resulting signal, using maximal-ratio-combining, thereby optimizing quality of said third resulting signal. In one embodiment, said one of beam-ports 101b2 is determined substantially by an angle of arrival 401angle1 of said first wireless signal 401sig1 into said plurality of array ports, and said another beam-ports 101bM is determined substantially by an angle of arrival 401angle2 of said second wireless signal 401sig2 into said plurality of array ports.

In one embodiment, said beam-forming network 101 is selected from a group consisting of: (i) a rotman-lens, (ii) a butler-matrix, (iii) a blass-matrix, and (iv) a fixed or passive beam-forming network.

In one embodiment, said first wireless signals 401sig1 is an orthogonal-frequency-division-multiplexing signal or an orthogonal-frequency-division-multiple-access signal, having a plurality of sub-carriers. In one embodiment, said maximal-ratio-combining is done at a level of said plurality of sub-carriers. In one embodiment, said first wireless signals 401sig1 is a direct-sequence-spread-spectrum signal or cck modulated signal.

In one embodiment, wireless communication system 100a to which said beam-forming network 101 and receiver 105M belong, uses information from said maximal-ratio-combining to generate a first and a second transmit signals which are coherent, and transmits said first and a second transmit signals via said one 101b2 and another 101bM of said beam-ports respectively.

In one embodiment, a wireless communication system 100a boosts reception range of wireless signals using a rotman-lens or butler-matrix as follows: a rotman-lens or butler-matrix 101 comprising a plurality of beam-ports 101b1, 101b2, 101bM is operative to: (i) focus a first wireless signal 401sig1 arriving at a plurality of array ports 101a1, 101a2, 101aN belonging to said rotman-lens or butler-matrix, substantially into one 101b2 of said plurality of beam-ports, said one of beam-ports is determined substantially by an angle of arrival 401angle1 of said first wireless signal into said plurality of array ports, and (ii) focus a second wireless signal 401sig2 that is a multi-path version of said first wireless signal, arriving at said plurality of array ports, substantially into another 101bM of said plurality of beam-ports, said another beam-port is determined substantially by an angle of arrival 401angle2 of said second wireless signal into said plurality of array ports; and a receiver 105M, is operative to combine said first and second wireless signals 401sig1, 401sig2, which arrive at said receiver via said one and another of beam-ports respectively, into a third resulting signal, using maximal-ratio-combining, thereby optimizing quality of said third resulting signal.

In one embodiment, said first wireless signal 401sig1 is an orthogonal-frequency-division-multiplexing signal or an orthogonal-frequency-division-multiple-access signal, having a plurality of sub-carriers. In one embodiment, said maximal-ratio-combining is done at a level of said plurality of sub-carriers. In one embodiment, said first wireless signals are a direct-sequence-spread-spectrum signal or CCK modulated signal. In one embodiment, said first and second wireless signals 401sig1, 401sig2 conform at least partially to IEEE-802.11n or IEEE-802.11 ac. In one embodiment, said wireless signals 401sig1, 401sig2 are transported using a frequency range of between 2.4 Ghz and 2.5 Ghz, and said rotman-lens or butler-matrix 101 is configured to operate directly in said frequency range. In one embodiment, said wireless signals 401sig1, 401sig2 are transported using a frequency range of between 4.8 Ghz and 5.8 Ghz, and said rotman-lens or butler-matrix is configured to operate directly in said frequency range.

In one embodiment, a plurality of antennas 109a1, 109a2, 109aN connected to said plurality of array-ports 101a1, 101a2, 101aN respectively, receive from a remote transceiver said first and second wireless signals 401sig1, 401sig2, thereby facilitating a substantial array gain associated with said plurality of antennas. In one embodiment said plurality of antennas produce a gain in excess of 10 dBi. In one embodiment, said plurality of antennas produce a gain in excess of 14 dBi. In one embodiment, said pluralities of antennas produce a gain in excess of 18 dBi. In one embodiment, there are 4 of said plurality of antennas present. In one embodiment, there are 4 of said plurality of array-ports, and 8 of said plurality of beam-ports present. In one embodiment, there are 6 of said plurality of antennas present. In one embodiment, there are 6 of said plurality of array-ports, and 8 of said plurality of beam-ports present. In one embodiment, there are 6 of said plurality of array-ports, and 16 of said plurality of beam-ports present. In one embodiment, there are 8 of said plurality of antennas present.

Figure 9:
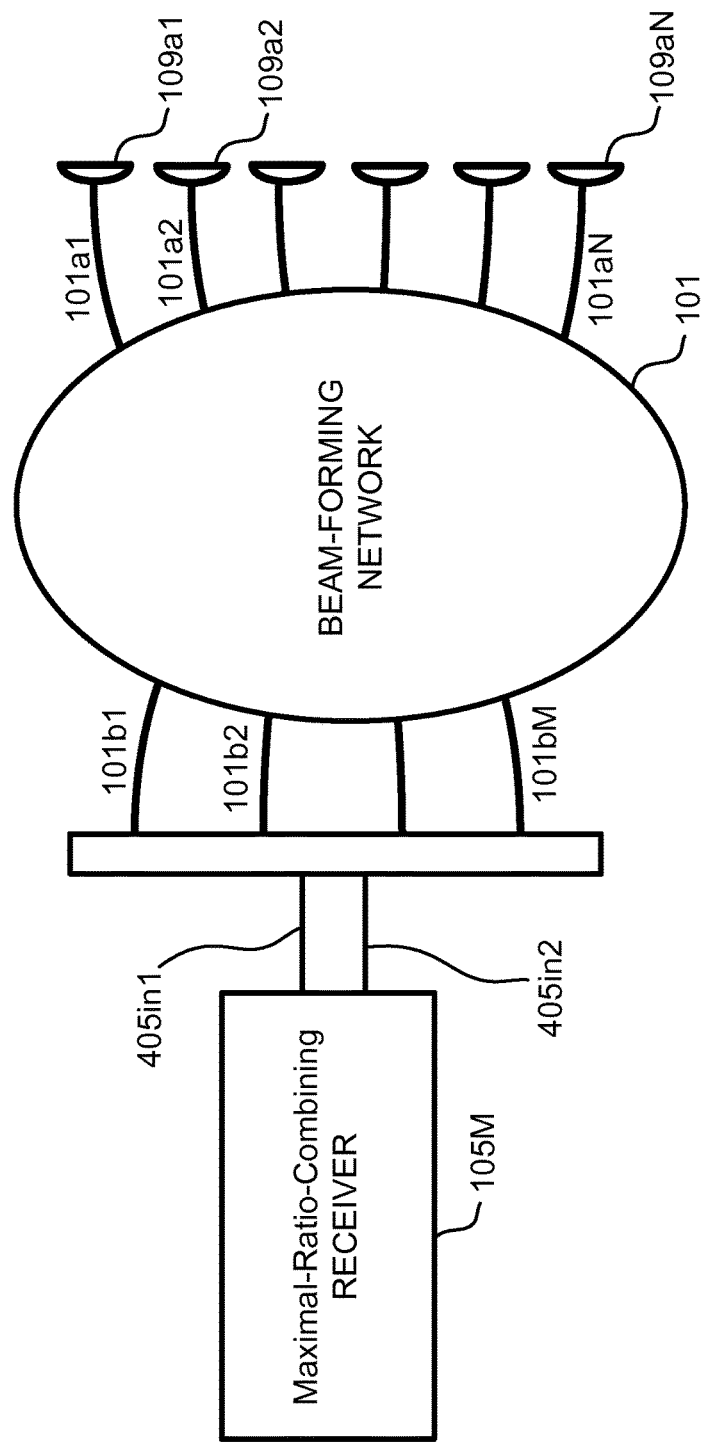
FIG. 9 illustrates one embodiment of a wireless communication system including a receiver and a beam-forming network.

FIG. 9 illustrates one embodiment for receiving multipath wireless signals via a beam-forming network. A beam-forming network 101 comprising a plurality of beam-ports 101b1, 101b2, 101bM and belonging to a wireless communication system, detects a first and a second directions 401angle1, 401angle2 through which a first and a second wireless signals 401sig1, 401sig2 arrive at said wireless communication system respectively, said second wireless signal 401sig2 is a multi-path version of said first wireless signal 401sig1. Said wireless communication connects: (i) a first of said beam-port 101b2, that is associated with said first direction 401angle1, to a first input 405in1 of a receiver 105M belonging to said wireless communication system, and (ii) a second 101bM of said beam-port, that is associated with said second direction 401angle2, to a second input 405in1 of said receiver. Receiver 105M decodes, using maximal-ratio-combining, the first and second wireless signals 401sig1, 401sig2 received via said first and second inputs.

In one embodiment, said detection of said first and second directions 401angle1, 401angle2 is done as follows: measuring a plurality of output power levels of at least some of said plurality of beam-ports respectively, by using a plurality of power detectors connected to said plurality of beam-ports respectively, said plurality of power detectors belonging to said wireless communication system; and identifying, by said wireless communication system, said first and second beam-ports having strongest of said plurality of output power levels, thereby detecting said first and second directions associated with said first and a second wireless signals respectively. In one embodiment, said detection of said first and second directions may include: searching, by said wireless communication system, among said plurality of beam-ports, for a signature belonging to said first wireless signal; and identifying said first signature as being present at said first and second beam-ports, thereby associating said first and second wireless signals with said first and second beam-ports, thereby associating said first and second wireless signals with said first and second directions, thereby achieving said detection.

Figure 10:
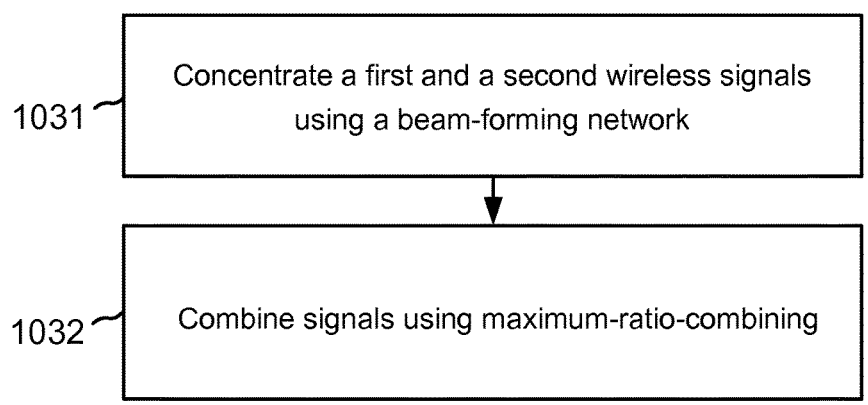
FIG. 10 is one embodiment of a flow diagram for receiving signals.

FIG. 10 is a flow diagram illustrating one embodiment of receiving multiple signals using maximal-ratio-combining and a beam-forming network. In step 1031: concentrating by a beam-forming network 101 comprising a plurality of beam-ports 101b1, 101b2, 101bM: (i) a first wireless signal 401sig1 arriving at a plurality of array ports 101a1, 101a2, 101aN belonging to said beam-forming network, substantially into one 101b2, of said plurality of beam-ports, and (ii) a second wireless signal 401sig2 arriving at said plurality of array ports, substantially into another 101bM of said plurality of beam-ports, said second wireless signal is a multi-path version of said first wireless signal. In step 1032: combining, by a receiver 105M, said first and second wireless signals, which arrive at said receiver via said one and another of beam-ports respectively, into a third resulting signal, using maximal-ratio-combining, thereby optimizing quality of said third resulting signal.

Figure 11:
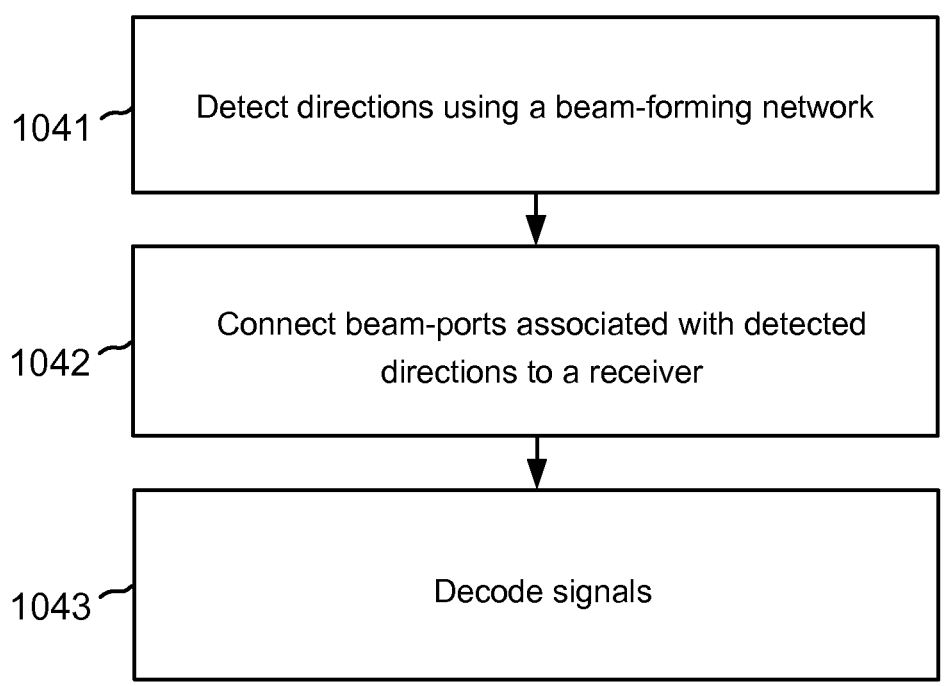
FIG. 11 is one embodiment of a flow diagram for receiving signals.

FIG. 11 is a flow diagram illustrating one embodiment of receiving multi-path wireless signals via a beam-forming network. In step 1041: detecting, using a beam-forming network 101 comprising a plurality of beam-ports 101b1, 101b2, 101bM and belonging to a wireless communication system, a first and a second directions 401angle1, 401angle2 through which a first and a second wireless signals 401sig1, 401sig2 arrive at said wireless communication system respectively, said second wireless signal is a multi-path version of said first wireless signal. In step 1042: connecting, by said wireless communication system: (i) a first of said beam-port 101b2 that is associated with said first direction, to a first input 405in1 of a receiver 101M belonging to said wireless communication system, and (ii) a second 101bM of said beam-port, that is associated with said second direction, to a second input 405in1 of said receiver. In step 1043: decoding using maximal-ratio-combining, by said receiver, the first and second wireless signals received via said first and second inputs.

In one embodiment, a method for selecting receiving directions for wireless data packets, in which each direction is selected separately and dynamically for each wireless data packet, comprises: detecting, using a beam-forming network 101 comprising a plurality of beam-ports 101b1, 101b2, 101bM and belonging to a wireless communication system 100, a direction 201angle1 through which a beginning 239a of a wireless data packet 239 arrives at said wireless communication system; connecting, by said wireless communication system, one of said beam-port 101b2 that is associated with said direction 201angle1, to a receiver 105 belonging to said wireless communication system; and receiving, by said receiver, at least a majority 239c of said wireless data packet via said beam-port.

In one embodiment, said detection is done during a first 4 microsecond 239a of said wireless data packet 239, arriving at wireless communication system 100. In one embodiment, said connection is done at most 2 microseconds 239b after said detection. In one embodiment, said detection and said connection are done fast enough, thereby allowing receiver 105 enough time 239c to decode wireless data packet 239. In one embodiment, said first 4 microseconds of wireless data packet 239 contains preamble information, thereby said connection may occur within said 4 microseconds without losing any data belonging to said single data stream. In one embodiment, said beam-forming network 101 is selected from a group consisting of: (i) a rotman-lens, (ii) a butler-matrix, (iii) a blass-matrix, and (iv) a fixed or passive beam-forming network.

Figure 12A:
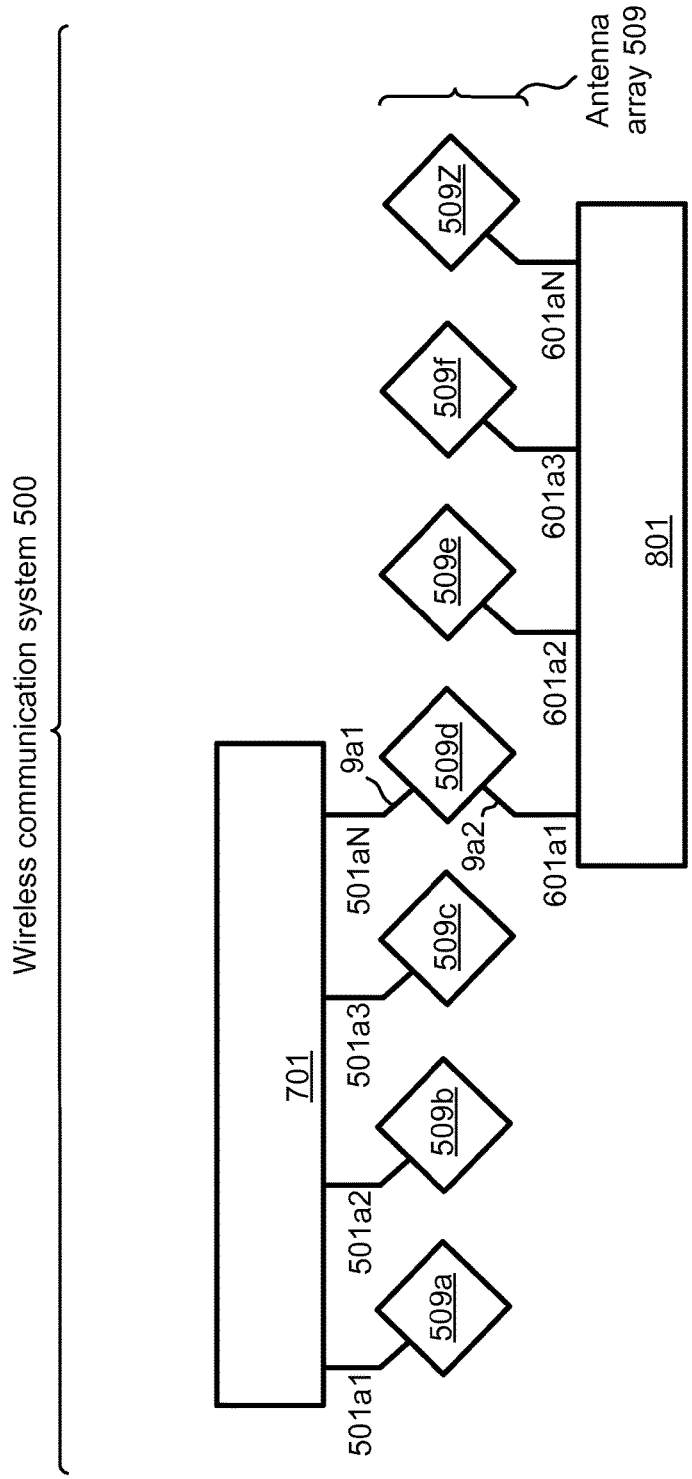
FIG. 12A illustrates one embodiment of a wireless communication system capable of generating a plurality of beams via an antenna array using combined capabilities of at least two beam-forming networks.

FIG. 12A illustrates one embodiment of a wireless communication system 500 capable of generating a plurality of beams via an antenna array 509 using combined capabilities of at least two beam-forming networks. Wireless communication system 500 includes: (i) an antenna array 509 having at least two antennas 509a, 509b, 509c, 509d, 509e, 509f, and 509Z, out of which at least one antenna is a cross-polarized antenna 509d having a first-polarity 9a1 and a second-polarity 9a2 inputs; 7 antennas are illustrated as a non-limited example, and (ii) at least a first 701 and a second 801 beam-forming networks, each having at least two array ports: array ports 501a1, 501a2, 501a3, 501aN belonging to the first beam-forming network 701, and array ports 601a1, 601a2, 601a3, 601aN belonging to the second beam-forming network 801, each of said at least two array ports connected to one of said at least two antennas: array port 501a1 connected to antenna 509a, array port 501a2 connected to antenna 509b, array port 501a3 connected to antenna 509c, array port 501aN connected to antenna 509d, array port 601a1 connected to antenna 509d, array port 601a2 connected to antenna 509e, array port 601a3 connected to antenna 509f, and array port 601aN connected to antenna 509Z; four array ports per each beam-forming network are illustrated as a non-limiting example. At least one of said array ports 501aN belonging to the first beam-forming network 701 is connected to the at least one cross-polarized antenna 509d via the first-polarity input 9a1, and at least one of said array ports 601a1 belonging to the second beam-forming network 801 is connected to the at least one cross-polarized antenna 509d via the second-polarity input 9a2. One cross-polarized antenna 509d is depicted in a non-limiting fashion, but more than one cross-polarized antenna are possible, thereby allowing more than one antenna to connect with both the first and the second beam-forming networks via first and second polarity inputs respectively.

Figure 12B:
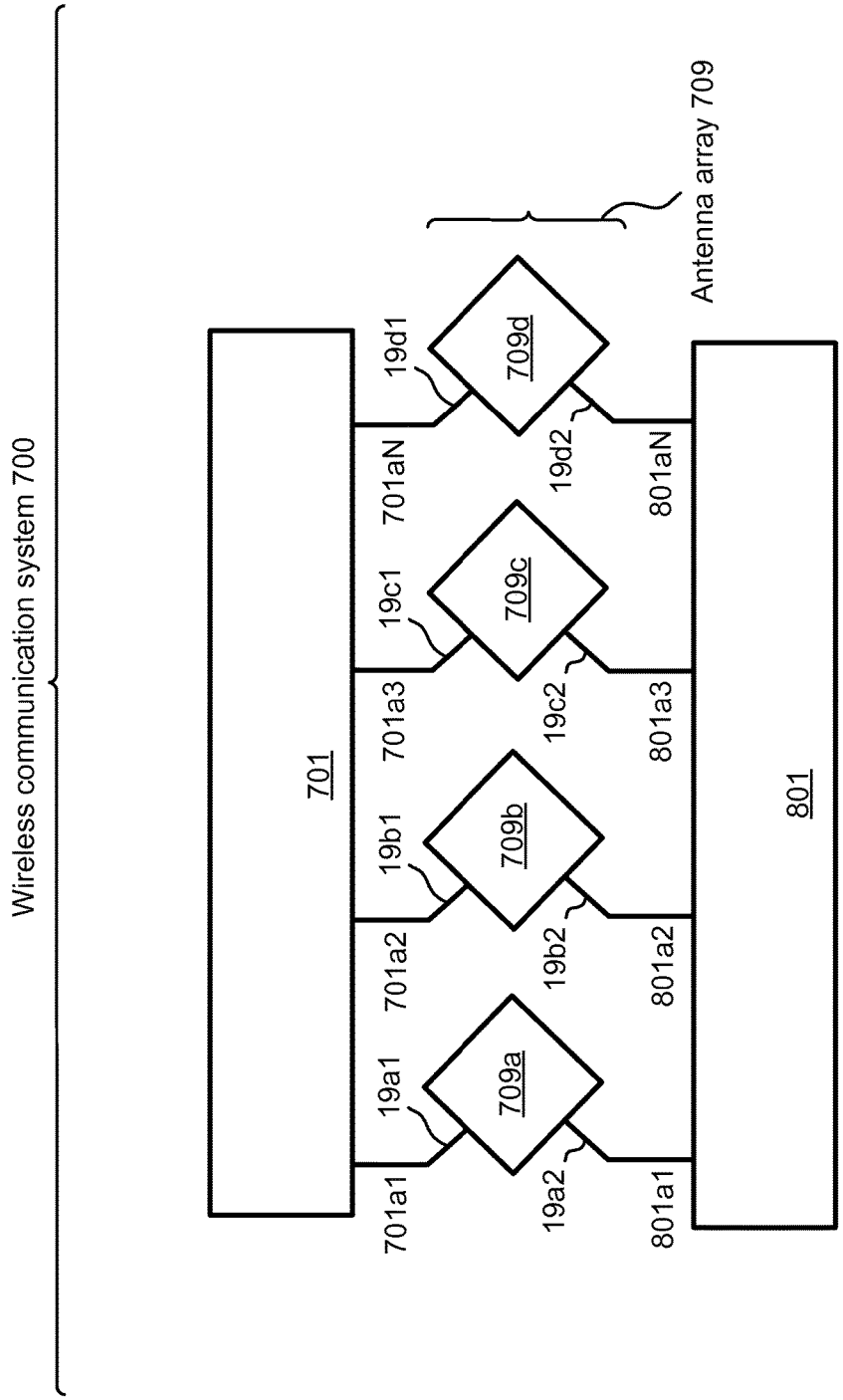
FIG. 12B illustrates one embodiment of a wireless communication system capable of generating a plurality of beams via an antenna array using combined capabilities of at least two beam-forming networks.

FIG. 12B illustrates one embodiment of a wireless communication system 700 capable of generating a plurality of beams via an antenna array 709 using combined capabilities of at least two beam-forming networks. Wireless communication system 700 includes: (i) an antenna array 709 having at least two antennas 709a, 709b, 709c, 509d, wherein each of the antennas are cross-polarized, and each having a first-polarity and a second-polarity inputs: antenna 709a having a first-polarity input 19a1 and a second-polarity input 19a2, antenna 709b having a first-polarity input 19b1 and a second-polarity input 19b2, antenna 709c having a first-polarity input 19c1 and a second-polarity input 19c2, and antenna 709d having a first-polarity input 19d1 and a second-polarity input 19d2; 4 antennas are illustrated as a non-limited example, and (ii) at least a first 701 and a second 801 beam-forming networks, each having at least two array ports: array ports 701*a*1, 701*a*2, 701*a*3, 701*a*N belonging to the first beam-forming network 701, and array ports 801*a*1, 801*a*2, 801*a*3, 801*a*N belonging to the second beam-forming network 801. The at least two array ports 701*a*1, 701*a*2, 701*a*3, 701*a*N belonging to said first beam-forming network 701 are connected to the at least two cross-polarized antennas 709*a*, 709*b*, 709*c*, 709*d*, respectively, via the first-polarity input 19*a*1, 19*b*1, 19*c*1, 19*d*1 of each of the at least two cross-polarized antennas, respectively. The at least two array ports 801*a*1, 801*a*2, 801*a*3, 801*a*N belonging to the second beam-forming network 801 are connected to the at least two cross-polarized antennas 709*a*, 709*b*, 709*c*, 709*d*, respectively, via the second-polarity input 19*a*2, 19*b*2, 19*c*2, 19*d*2 of each of the at least two cross-polarized antennas, respectively, such that each of the at least two antennas 709*a*, 709*b*, 709*c*, 709*d* is connected to both the first 701 and the second 801 beam-forming networks.

Figure 12C:
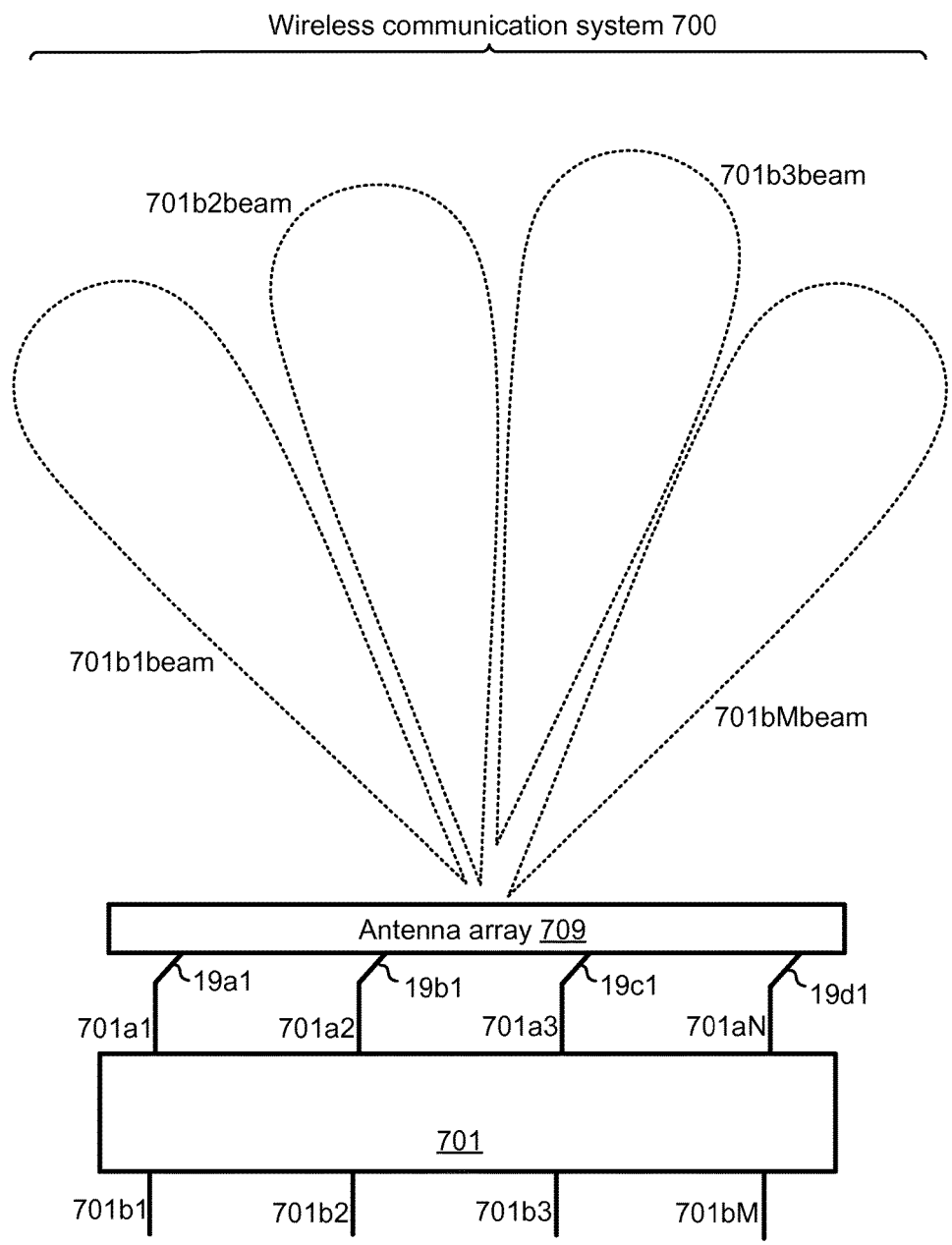
FIG. 12C and FIG. 12D illustrate one embodiment of a plurality of beams generated by injecting radio-frequency signals to beam ports of a plurality of beam-forming networks.
Figure 12D:
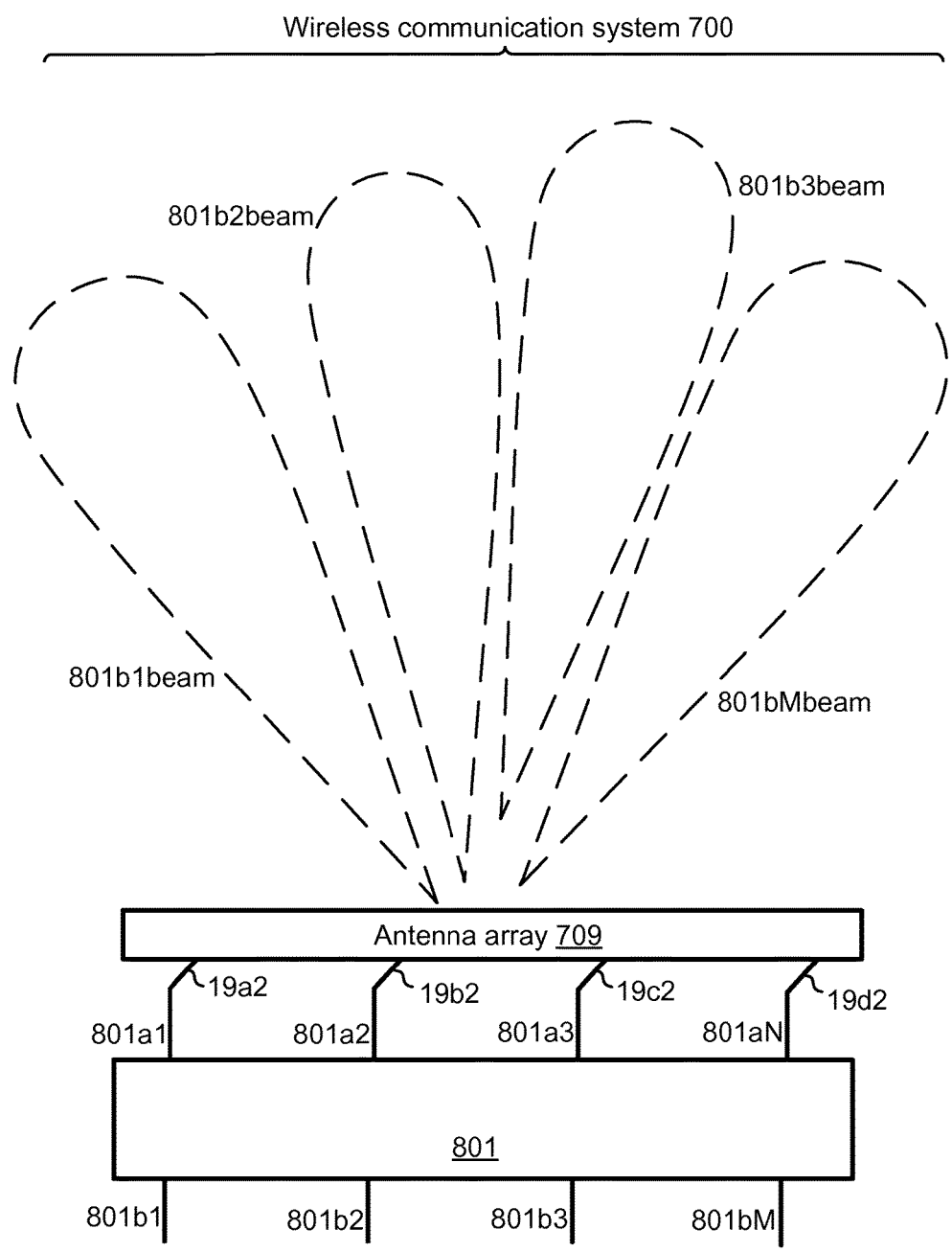

FIG. 12C and FIG. 12D illustrate one embodiment of a plurality of beams generated by injecting radio-frequency signals to beam ports of a plurality of beam-forming networks. wireless communication system 700 further includes: (i) at least a first 701*b*1 and a second 701*b*M beam-ports belonging to the first beam-forming network 701; four beam ports 701*b*1, 701*b*2, 701*b*3, 701*b*M are illustrated as a non-limiting example, and (ii) at least a first 801*b*1 and a second 801*b*M beam-ports belonging to the second beam-forming network 801; four beam ports 801*b*1, 801*b*2, 801*b*3, 801*b*M are illustrated as a non-limiting example. Wireless communication system 700: (i) generates a first 701*b*1beam and a second 701*b*Mbeam first-polarity-beams having a first and a second directions, respectively, by injection a first and a second radio-frequency signals, respectively, into the first 701*b*1 and the second 701*b*M beam-ports belonging to the first beam-forming network 701, respectively, and (ii) generates a first 801*b*1beam and a second 801*b*Mbeam second-polarity-beams having a first and a second directions, respectively, by injection a first and a second radio-frequency signals, respectively, into the first 801*b*1 and the second 801*b*M beam-ports belonging to the second beam-forming network 801, respectively. It is noted that a single antenna array 709 may be used to generate all of the different beams 701*b*1beam, 701*b*Mbeam, 801*b*1beam, 801*b*Mbeam, despite the fact that two different beam-forming networks 701, 801 are in use, each responsible to only some of the beams.

In one embodiment, at least one of the first 701 and second 801 beam-forming networks is a rotman-lens. In one embodiment, at least one of the first 701 and second 801 beam-forming networks is a butler-matrix. In one embodiment, at least one of the first 701 and second 801 beam-forming networks is a blass-matrix. In one embodiment, at least one of the first 701 and second 801 beam-forming networks is a passive beam-forming network.

Figure 12E:
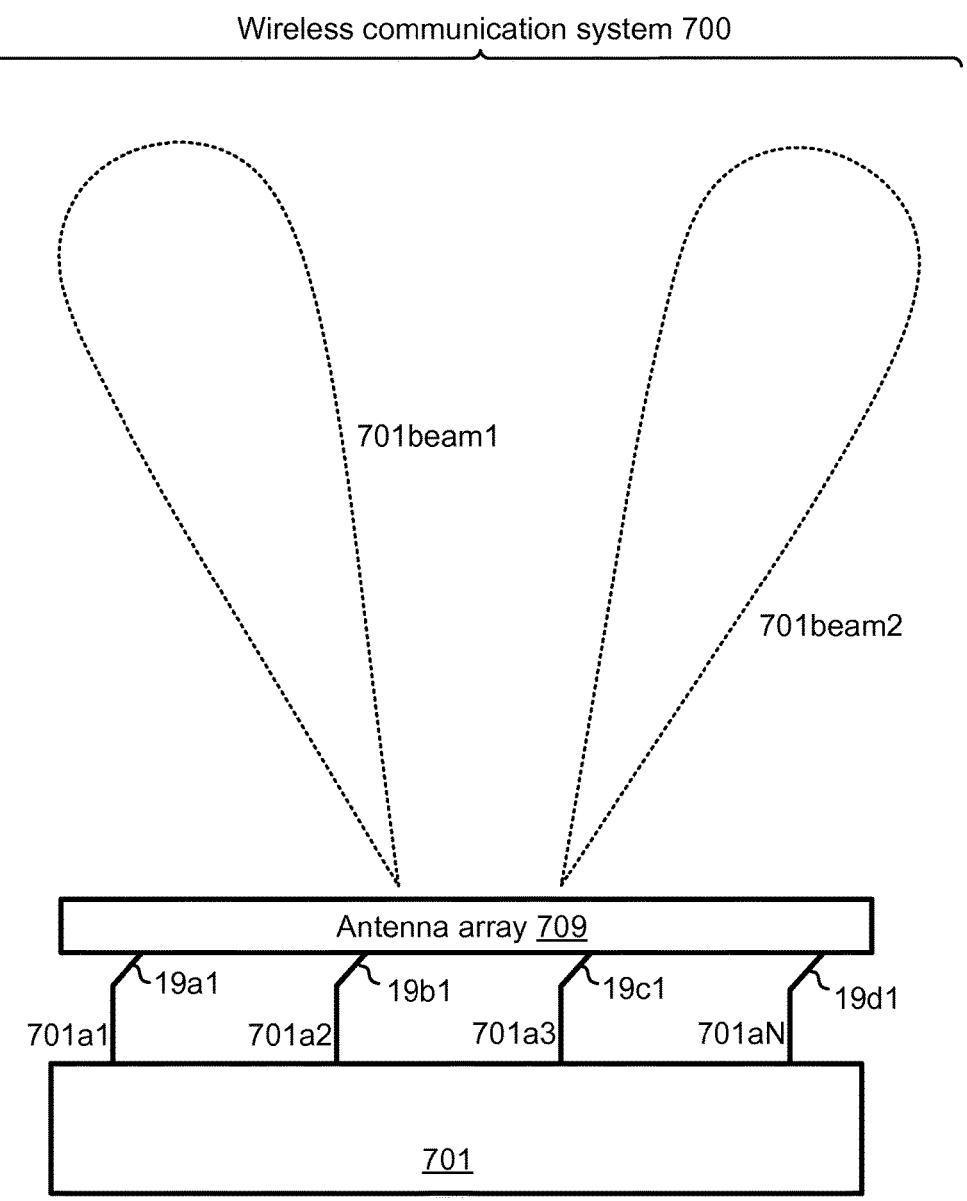
FIG. 12E and FIG. 12F illustrate one embodiment of a plurality of beams generated by a plurality of beam-forming networks.
Figure 12F:
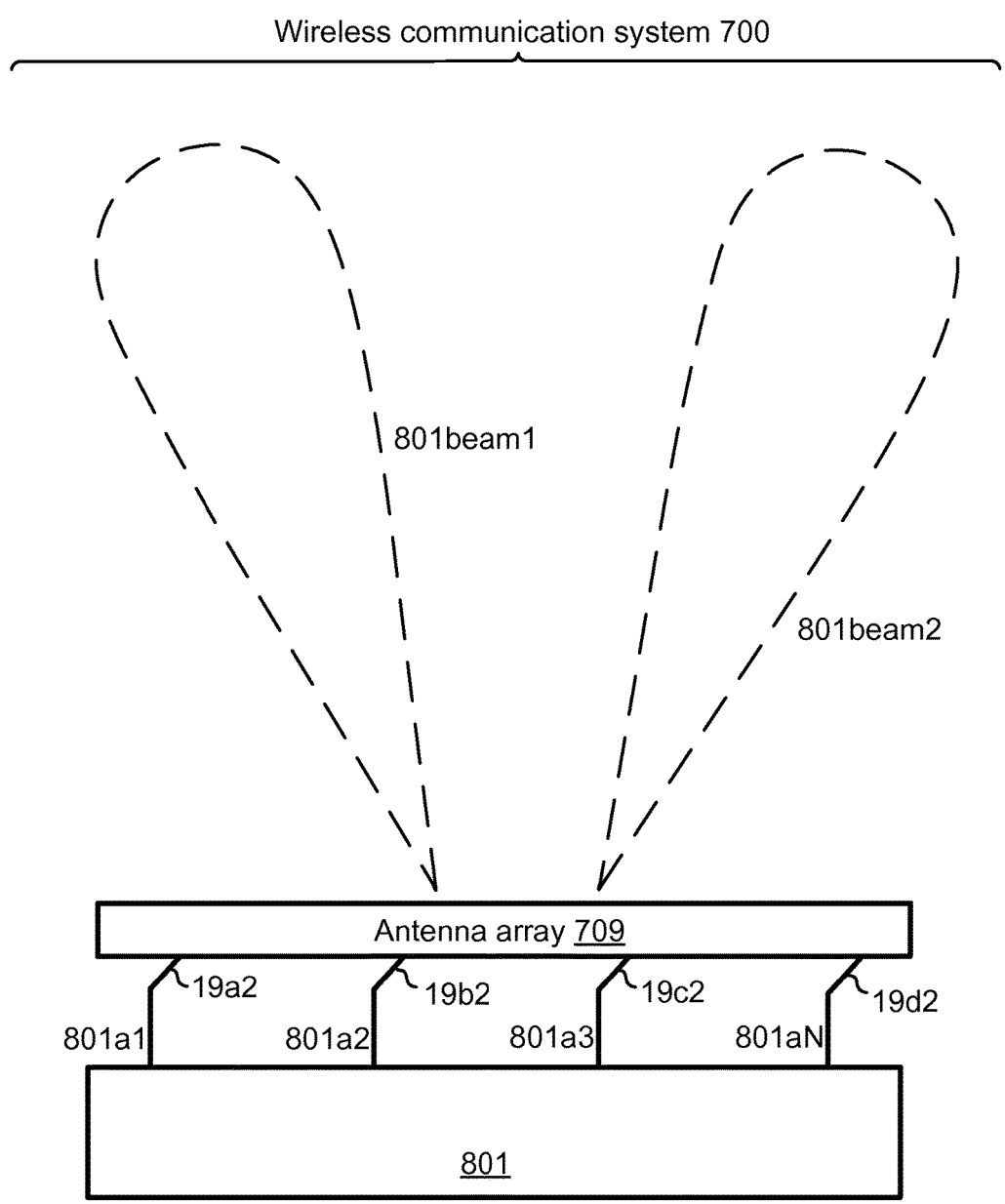
Figure 12G:
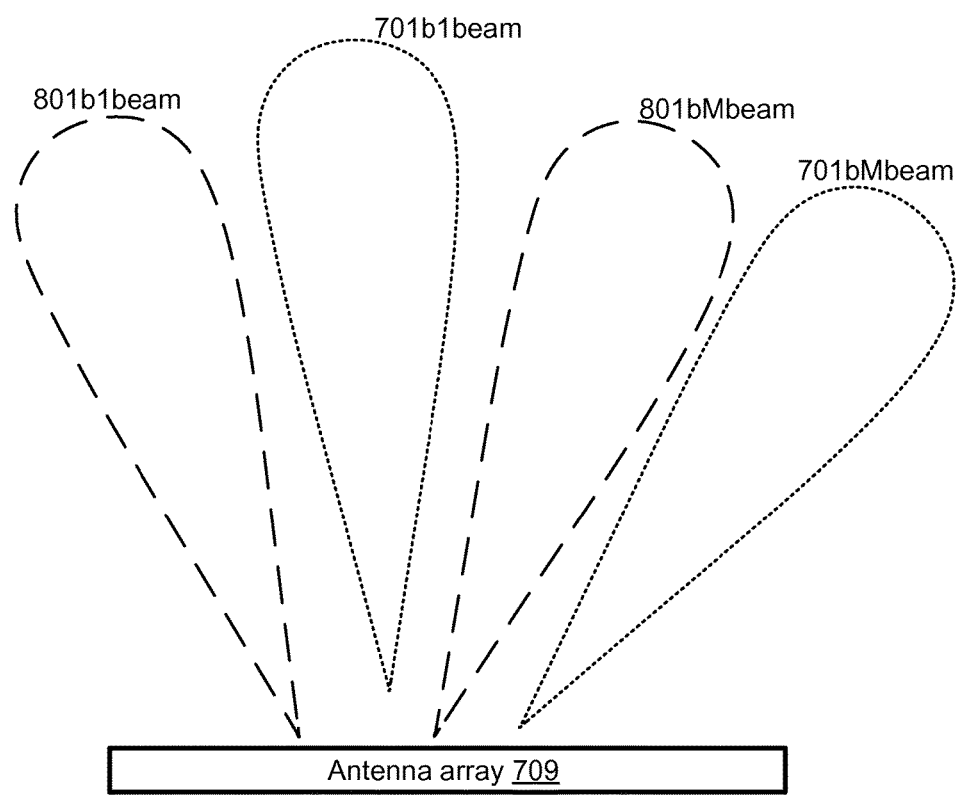
FIG. 12G illustrates one embodiment beam directions.

FIG. 12G illustrates one embodiment beam directions. The first and second directions of the first 701*b*1beam and second 701*b*Mbeam first-polarity-beams are different than the first and second directions of the first 801*b*1beam and a second 801*b*Mbeam second-polarity-beams. It is noted that all directions of all beams may be different and unique. It is noted that the first polarity beams 701*b*1beam, 701*b*Mbeam may be interleaved with the second polarity beams 801*b*1beam, 801*b*Mbeam, thereby creating a dense beam coverage of a certain sector.

In one embodiment, the first 701 and second 801 beam-forming networks are a first and second butler-matrixes respectively. In one embodiment, the directions of beams 701*b*1beam and 701*b*Mbeam associated with the first butler-matrix are made different than the directions of beams 801*b*1beam and 801*b*Mbeam associated with the second butler-matrix, by intentionally introducing radio-frequency phase shifts between (i) the at least two array ports 701*a*1, 701*a*2, 701*a*3, 701*a*N belonging to the first butler-matrix and (ii) the at least two antennas 709*a*, 709*b*, 709*c*, 709*d*, respectively. According to one non-limiting example, the first and second butler-matrices are of the same order. According to one non-limiting example, the first and second butler-matrices are identical. In one embodiment, the radio-frequency phase shifts are progressively linear with array port number: as a non-limiting example, the phase shift between array port 701*a*N and antenna 709*d* is made higher by X degrees than the phase shift between array port 701*a*3 and antenna 709*c*, which is made higher by additional X degrees than the phase shift between array port 701*a*2 and antenna 709*b*, which is made higher by additional X degrees than the phase shift between array port 701*a*1 and antenna 709*a*, which may be zero. In one embodiment, the radio-frequency phase shifts are static. According to one non-limiting example, the phase shifts are made by using microstrip delay lines.

In one embodiment, the first and second radio-frequency signals at least partially conform to IEEE-802.11. In one embodiment, the first and second radio-frequency signals at least partially conform to IEEE-802.11n. In one embodiment the first and second radio frequency signals at least partially conform to IEEE-802.11 ac. In one embodiment the first and second radio-frequency signals are within a frequency range of between 2.4 Ghz and 2.5 Ghz, and the first and second beam-forming networks 701, 801 operate directly in said frequency range. In one embodiment the first and second radio-frequency signals are within a frequency range of between 4.8 Ghz and 5.8 Ghz, and the first and second beam-forming networks 701, 801 operate directly in said frequency range.

Figure 13:
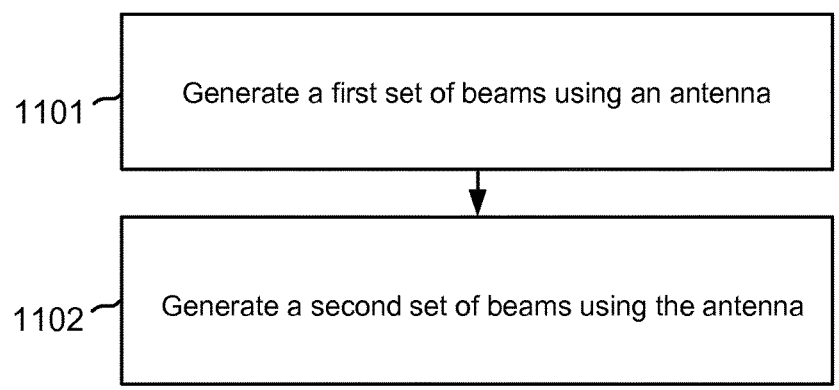
FIG. 13 illustrates one embodiment of a method for increasing beam count by combining two beam-forming networks.

FIG. 12E and FIG. 12F illustrate one embodiment of a plurality of beams generated by a plurality of beam-forming networks. Wireless communication system 700 generates a first 701beam1 FIG. 12E and a second 701beam2 first-polarity-beams having a first and a second directions, respectively, by applying appropriate radio-frequency signals by the first beam-forming network 701 via the first-polarity input 19*a*1 to 19*d*1 of each of the at least two cross-polarized antennas of antenna array 709. Wireless communication system 700 further generates a first 801beam1 and a second 801beam2 second-polarity-beams having a first and a second directions, respectively, by applying appropriate radio-frequency signals by the second beam-forming network 801 via the second-polarity input 19*a*2 to 19*d*2 of each of said at least two cross-polarized antennas of antenna array 709. In one embodiment at least one of the first 701 and second 801 beam-forming networks is a digital-signal-processing based beam-forming network. In one embodiment at least one of the first 701 and second 801 beam-forming networks is an active-antenna-switching based beam-forming network. In one embodiment at least one of the first 701 and second 801 beam-forming networks is a maximal-ratio-combining network. FIG. 13 illustrates one embodiment of a method for increasing beam count by combining two beam-forming networks. In step 1101, generating a first set of beams 701*b*1beam, 701*b*Mbeam having a first beam polarity using a first beam-forming network 701 connected to a cross-polarized phased-array antenna 709 via a set of first-polarity inputs 19*a*1, 19*b*1, 19*c*1, 19*d*1. In step 1102, generating a second set of beams 801*b*1beam, 801*b*Mbeam having a second beam polarity using a second beam-forming network 801 connected to the cross-polarized phased-array antenna 709 via a set of second-polarity inputs 19*a*2, 19*b*2, 19*c*2, 19*d*2. In one embodiment, each one of the first 701 and second 801 beam-forming networks may be: (i) a rotman-lens, (ii) a butler-matrix, (iii) a blass-matrix, or (iv) a fixed or passive beam-forming network.

In one embodiment, the first 701 and second 801 beam-forming networks are first and second butler-matrixes respectively. In one embodiment, the cross-polarized phased-array antenna 709 includes N cross-polarized antennas 709*a*, 709*b*, 709*c*, 709*d* each having a first polarity and a second polarity inputs, such that the set of first-polarity inputs includes N 19*a*1, 19*b*1, 19*c*1, 19*d*1 inputs and said set of second-polarity inputs comprises N inputs 19*a*2, 19*b*2, 19*c*2, 19*d*2 as well. The first butler-matrix 701 is of order N, comprising N array ports 701*a*1, 701*a*2, 701*a*3, 701*a*N connected to said first-polarity inputs 19*a*1, 19*b*1, 19*c*1, 19*d*1 respectively. The second butler-matrix 801 is of order N, comprising N array ports 801*a*1, 801*a*2, 801*a*3, 801*a*N connected to said second-polarity inputs 19*a*2, 19*b*2, 19*c*2, 19*d*2 respectively, and therefore: (i) the first set of beams 701*b*1beam, 701*b*2beam, 701*b*3beam, 701*b*Mbeam comprises N beams directed into N different directions respectively, (ii) the second set of beams 801*b*1beam, 801*b*2beam, 801*b*3beam, 801*b*Mbeam comprises N beams directed into N different directions respectively, thereby generating a total of 2 times N beams 701*b*1beam, 701*b*2beam, 701*b*3beam, 701*b*Mbeam, 801*b*1beam, 801*b*2beam, 801*b*3beam, 801*b*Mbeam, that may be directed into as many as 2 times N directions. It is noted that FIG. 12C and FIG. 12D illustrate a non-limiting example of N=4. In one embodiment, radio-frequency phase shifts are introduced, each progressively linear with array port number, between (i) said N array ports 701*a*1, 701*a*2, 701*a*3, 701*a*N belonging to the first butler-matrix 701 and (ii) said N cross-polarized antennas 709*a*, 709*b*, 709*c*, 709*d*, respectively, thereby generating the 2 times N beams into unique 2 times N directions.

Figure 14A:
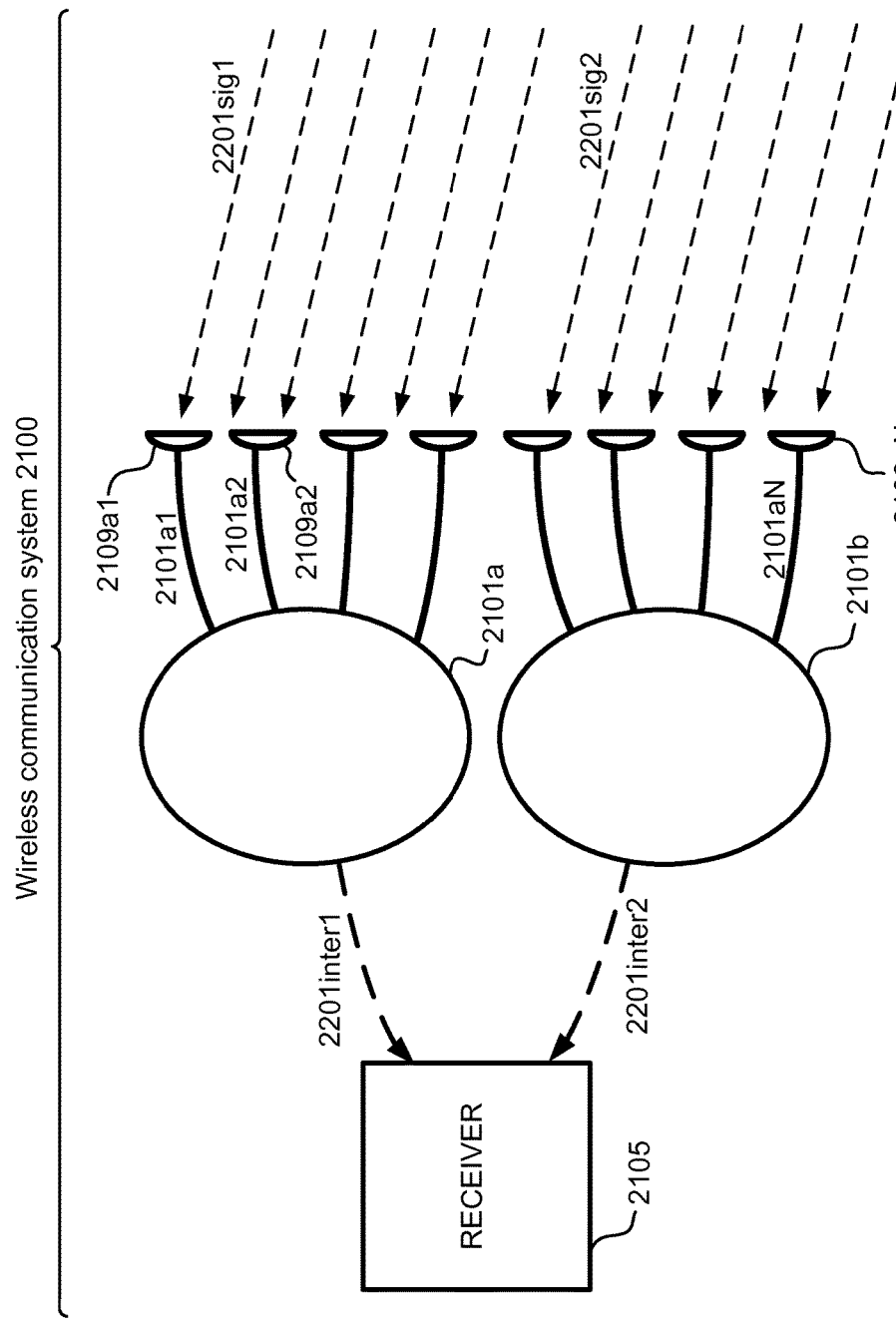
FIG. 14A illustrates one embodiment of a wireless communication system capable of combining signals from several beam-forming networks.
Figure 14B:
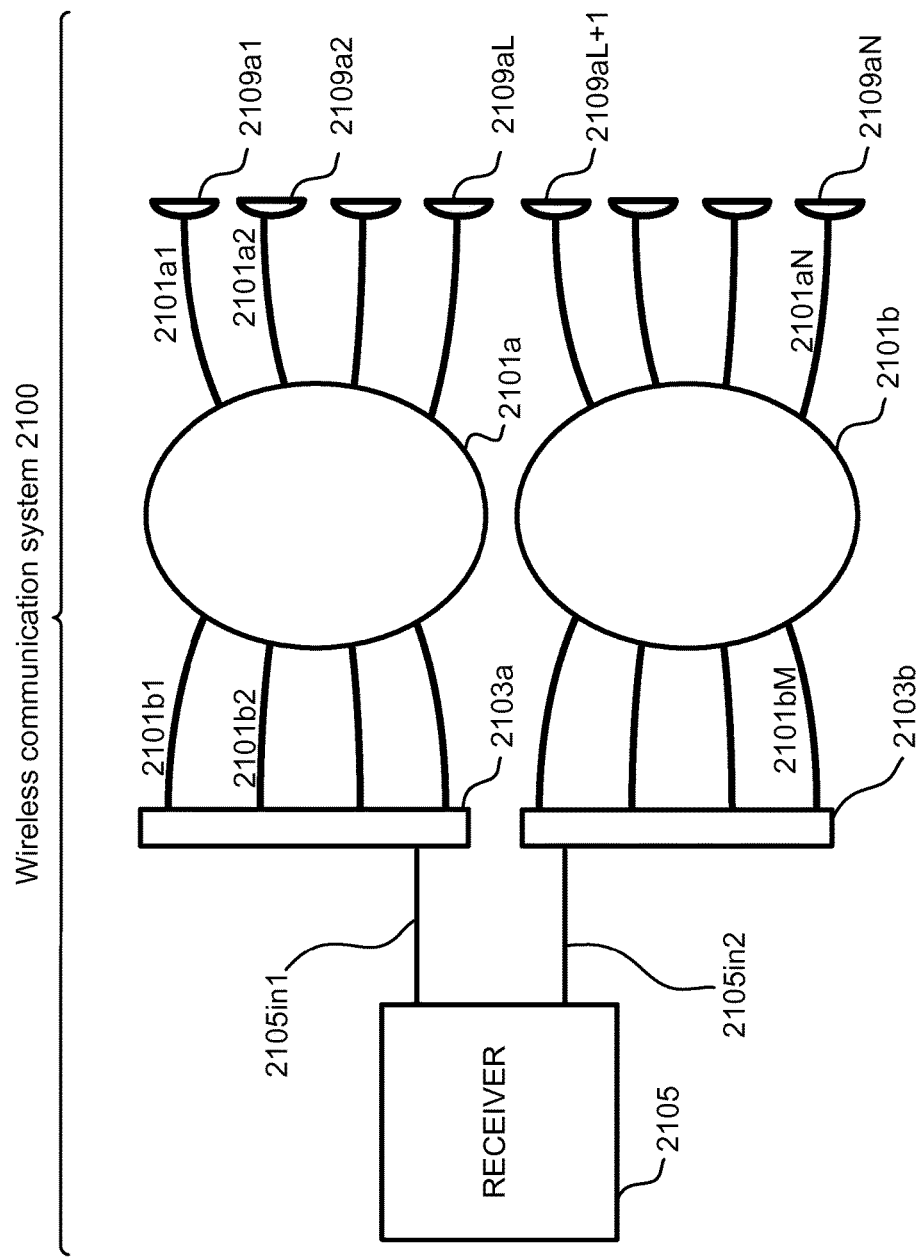
FIG. 14B illustrates one embodiment of a wireless communication system capable of combining signals from several beam-forming networks using radio-frequency switching fabrics.

FIG. 14A and FIG. 14B illustrate some embodiments of a wireless communication system 2100 capable of combining signals from several beam-forming networks. In one embodiment, wireless communication system 2100 includes: (i) a plurality of antennas 2109*a*1, 2109*a*2 to 2109*a*N; 8 antennas are illustrated in a non-limiting fashion, and (ii) at least a first 2101*a* and a second 2101*b* beam-forming networks connected via array ports 2101*a*1, 2101*a*2 to 2101*a*N to said plurality of antennas 2109*a*1, 2109*a*2 to 2109*a*N respectively. Two beam-forming networks are illustrated in a no-limiting fashion, but three, four, or even more beam-forming networks are possible. The first beam-forming network 2101*a* is illustrated as having four array ports connected to four corresponding antennas in a non-limiting fashion. The second beam-forming network 2101*b* is illustrated as having four array ports connected to four corresponding antennas in a non-limiting fashion. The first 2101*a* and second 2101*b* beam-forming networks combine coherently, respectively, a first 2201sig1 and a second 2201sig2 wireless signals arriving at the antennas, into a first 2201inter1 and a second 2201inter2 intermediate signals respectively as follows: The first wireless signal 2201sig1: (i) arrives at the antennas connected to the first beam-forming network 2101*a*, then (ii) reaches the first beam-forming network 2101*a* through the array ports connecting the first beam-forming network 2101*a* to the antennas, and then (iii) concentrated into intermediate signal 2201inter1 by the first beam-forming network 2101*a*. Similarly, the second wireless signal 2201sig2: (i) arrives at the antennas connected to the second beam-forming network 2101*b*, then (ii) reaches the second beam-forming network 2101*b* through the array ports connecting the second beam-forming network 2101*b* to the antennas, and then (iii) concentrated into intermediate signal 2201inter2 by the second beam-forming network 2101*b*. Wireless communication system 2100 further includes a receiver 2105 connected to the first 2101*a* and second 2101*b* beam-forming networks. The receiver 2105 processes the first 2201inter1 and second 2201inter2 intermediate signals into a single data stream. In one embodiment, the antennas 2109*a*1, 2109*a*2 to 2109*a*N are arranged as at least a first 2109*a*1, 2109*a*2 to 2109*a*L and a second 2109*a*L+1 to 2109*a*N antenna arrays. The first 2101*a* and second 2101*b* beam-forming networks are connected via the plurality of array ports to the first and second antenna arrays respectively. The first 2101*a* and second 2101*b* beam-forming networks combine coherently the first and second wireless signals arriving at said first and second antenna arrays respectively, into the first and second intermediate signals respectively.

In one embodiment, the receiver 2105 is connected to the first 2101*a* and the second 2101*b* beam-forming networks via a plurality of beam-ports 2101*b*1, 2101*b*2 to 2101*b*M belonging to said first and second beam-forming networks. In one embodiment, wireless communication system 2100 further includes: (i) a first radio-frequency switching fabric 2103*a*, capable of routing one of the beam-ports belonging to the first beam-forming network 2101*a* to a first input 2105in1 of the receiver 2105 according to a detection criterion in accordance with some embodiments. The first input 2105in1 admits the first intermediate signal 2201inter1 into the receiver 2105, and a second radio-frequency switching fabric 2103*b*, capable of routing one of the beam-ports belonging to the second beam-forming network 2101*b* to a second input 2105in2 of the receiver 2105 according to a detection criterion in accordance with some embodiments. The second input 2105in2 admits the second intermediate signal 2201inter2 into the receiver 2105.

In one embodiment, the processing of the first 2201inter1 and second 2201inter2 intermediate signals includes combining of the first and the second intermediate signals using maximal-ratio-combining techniques, thereby achieving a reception gain which is a combination of gains achieved by (i) said first and second beam-forming networks and (ii) said maximal-ratio-combining techniques. In one embodiment, the first 2201sig1 and the second 2201sig2 wireless signals are a mixture of a first and a second spatially multiplexed wireless signals generated by a remote transceiver from a single data stream, and the processing of the first 2201inter1 and the second 2201inter2 intermediate signals includes decoding the first and the second wireless signals into the single data stream, thereby achieving said decoding together with a reception gain including gains of the first 2101*a* and the second 2101*b* beam-forming networks. In one embodiment, the first and second spatially multiplexed wireless signals are used by the IEEE-802.11n standard to boost transmission rates of said single data stream.

In one embodiment, the first 2201sig1 and the second 2201sig2 wireless signals at least partially conform to IEEE-802.11. In one embodiment, the first 2201sig1 and the second 2201sig2 wireless signals at least partially conform to IEEE-802.11n. In one embodiment, the first 2201sig1 and the second 2201sig2 wireless signals at least partially conform to IEEE-802.11ac. In one embodiment, the first 2201sig1 and the second 2201sig2 wireless signals are transported using a frequency range of between 2.4 Ghz and 2.5 Ghz, and the first 2101a and the second 2101b beam-forming networks operate directly in said frequency range. In one embodiment, the first 2201sig1 and the second 2201sig2 wireless signals are transported using a frequency range of between 4.8 Ghz and 5.8 Ghz, and the first 2101a and the second 2101b beam-forming networks operate directly in said frequency range. In one embodiment, at least one of the first 2101a and the second 2101b beam-forming networks is a: (i) a rotman-lens, (ii) a butler-matrix, (iii) a blass-matrix, or (iv) a fixed or passive beam-forming network.

Figure 15:
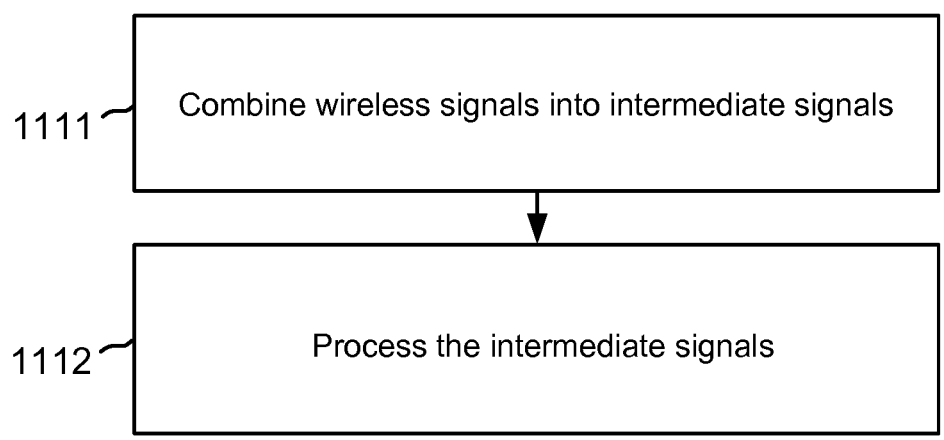
FIG. 15 illustrates one embodiment of a method for combining signals from a plurality of beam-forming networks.

FIG. 15 illustrates one embodiment of a method for combining signals from a plurality of beam-forming networks. In step 1111, combining coherently, by a first and a second beam-forming networks, respectively, a first 2201sig1 and a second 2201sig2 wireless signals arriving at a plurality of antennas connected to said first and second beam-forming networks, into a first 2201inter1 and a second 2201inter2 intermediate signals respectively. In step 1112, processing, by a receiver 2105 connected to the first and second beam-forming networks, said first and second intermediate signals into a single data stream.

Figure 16:
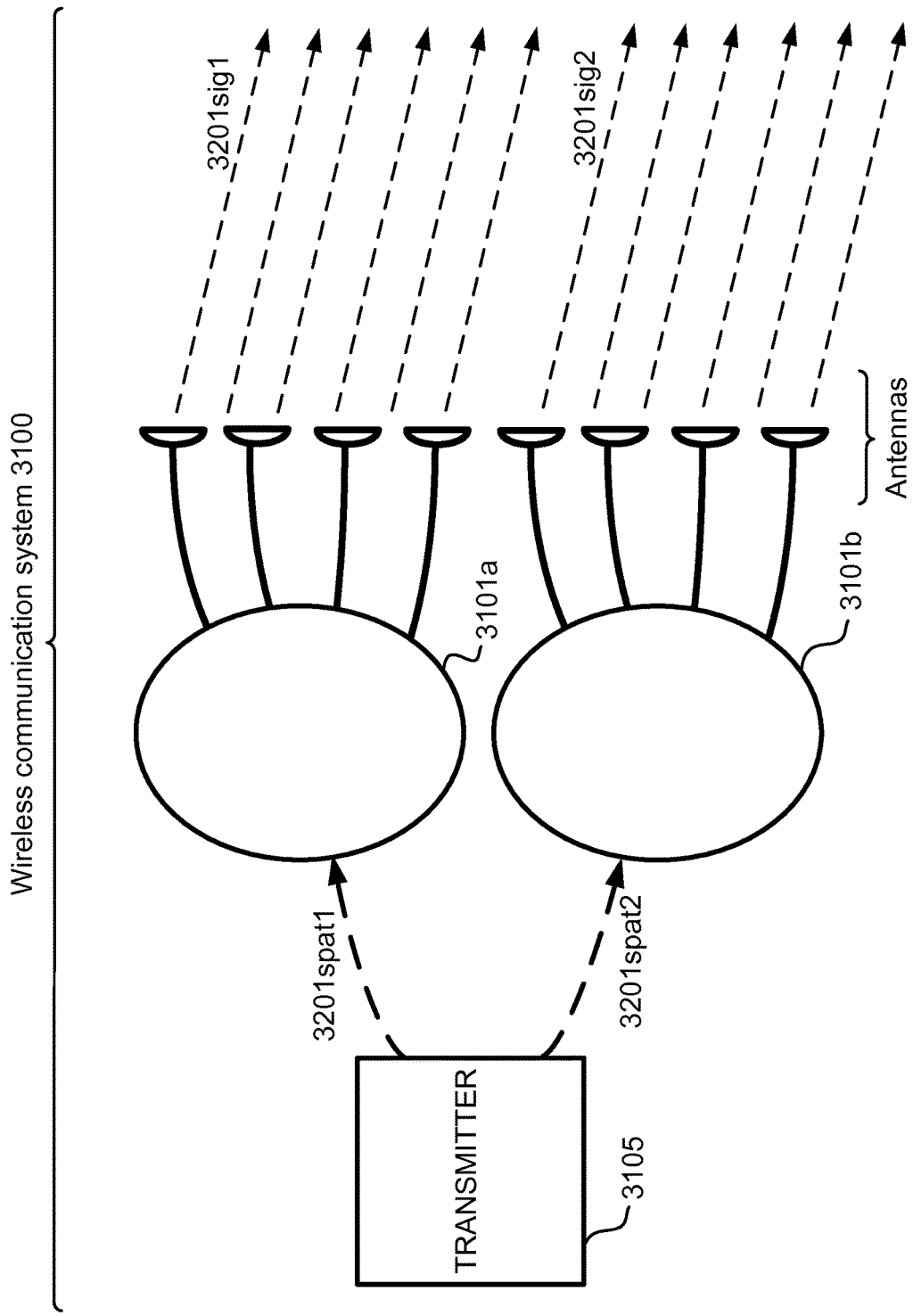
FIG. 16 illustrates one embodiment of a system capable of transmitting spatially multiplexed wireless signals using a plurality of beam-forming networks.

FIG. 16 illustrates one embodiment of a system for transmitting spatially multiplexed wireless signals using a plurality of beam-forming networks. A transmitter 3105 generates a first 3201spat1 and a second 3201spat2 spatially multiplexed signals using a single data stream. Said transmitter 3105 injects said first 3201spat1 and a second 3201spat2 spatially multiplexed signals into beam-ports of a first 3101a and a second 3101b beam-forming networks, respectively. Said first 3101a and second 3101b beam-forming networks transmit a first 3201sig1 and a second 3201sig2 spatially multiplexed wireless signals, respectively, using said first 3201spat1 and a second 3201spat2 spatially multiplexed signals, respectively.

Figure 17:
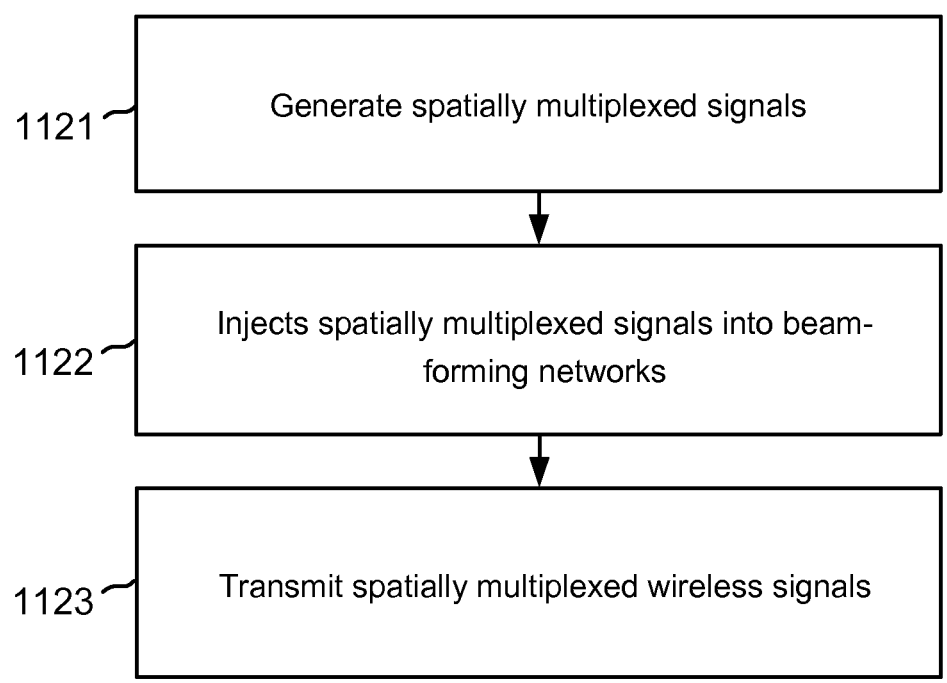
FIG. 17 illustrates one embodiment of a method for transmitting spatially multiplexed wireless signals using a plurality of beam-forming networks.

FIG. 17 illustrates one embodiment of a method for transmitting spatially multiplexed wireless signals using a plurality of beam-forming networks. In step 1121, generating, by a transmitter 3105, a first 3201spat1 and a second 3201spat2 spatially multiplexed signals using a single data stream. In step 1122, injecting, by said transmitter 3105, said first 3201spat1 and a second 3201spat2 spatially multiplexed signals into beam-ports of a first 3101a and a second 3101b beamforming networks, respectively. In step 1123, transmitting, by said first 3101a and second 3101b beam-forming networks, a first 3201sig1 and a second 3201sig2 spatially multiplexed wireless signals, respectively, using said first 3201spat1 and a second 3201spat2 spatially multiplexed signals, respectively.

Figure 18:
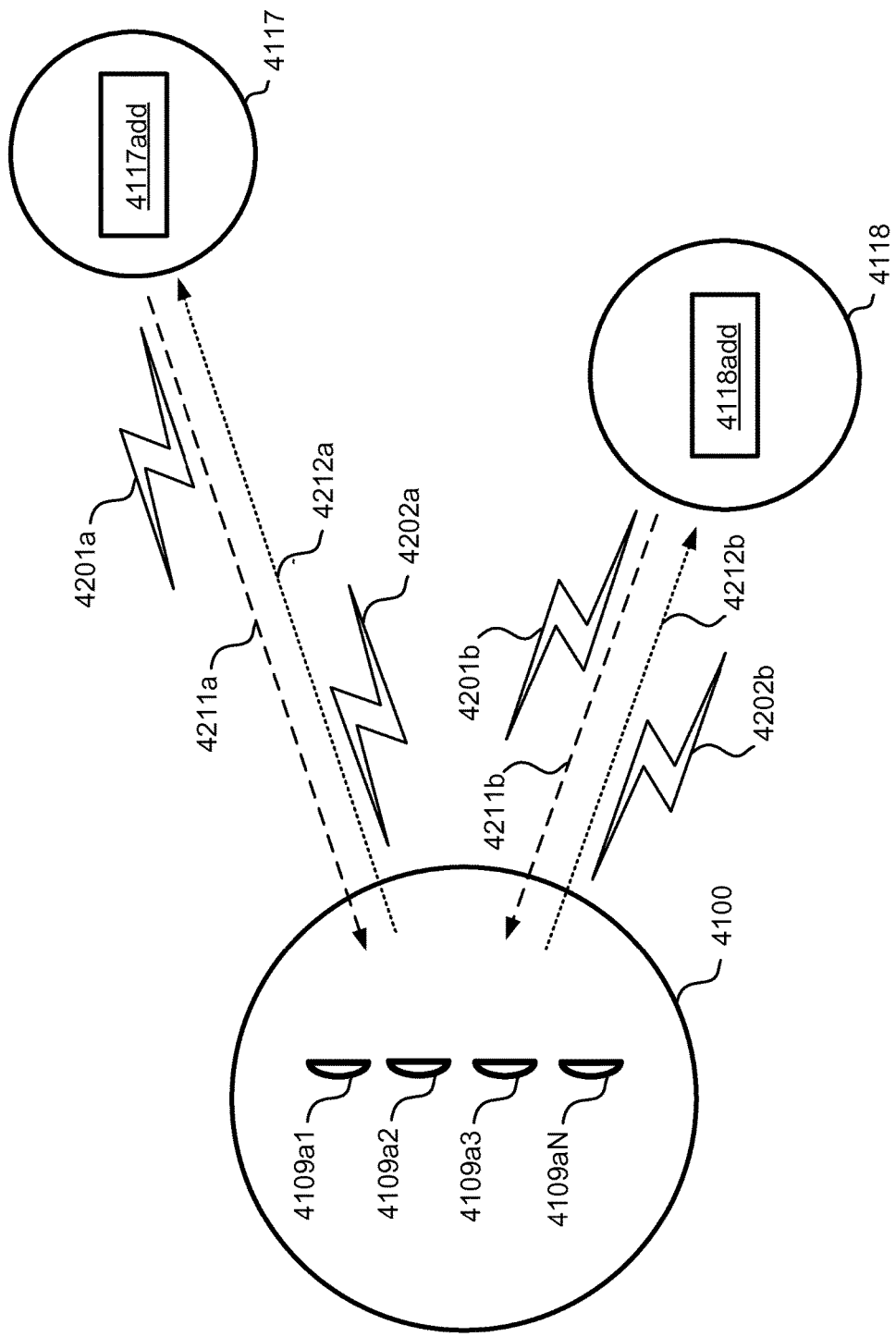
FIG. 18 illustrates one embodiment of a first, second, and third wireless communication systems.

FIG. 18 illustrates one embodiment of a first wireless communication system 4100, a second wireless communication system 4117, and a third wireless communication system 4118. Second wireless communication system 4117 may send wireless transmissions to first wireless communication system 4100, such as wireless transmission 4201a. Depending on position of second wireless communication system 4117 relative to first wireless communication system 4100, wireless transmission 4201a arrives at first wireless communication system 4100 from direction 4211a, also referred to as Direction-Of-Arrival (DOA) 4211a. First wireless communication system 4100 may send wireless transmissions to second wireless communication system 4117, such as wireless transmission 4202a, which may be directed 4212a toward second wireless communication system 4117. If (i) both first and second wireless communication systems 4100, 4117 are stationary, or (ii) either one or both of wireless communication systems 4100, 4117 are almost stationary over a short time interval extending form reception of wireless transmission 4201a to transmission of wireless transmission 4202a, then direction 4212a may be assumed to be same as DOA 4211a for all practical purposes. First wireless communication system 4100 includes a plurality of antennas 4109a1, 4109a2, 4109a3, 4109aN, illustrated as four antennas in a non-limiting fashion, but other multiple antenna configurations are possible, provided however that at least two antennas are involved. Antennas 4109a1, 4109a2, 4109a3, 4109aN, or at least a subset of two antennas thereof, may be used by first wireless communication system 4100 to determine DOA 4211a; this can be done by any of known methods associated with phased array antennas, including inter-antenna phase difference detection, Spatial Fast-Fourier-Transforms on inputs of said antennas, and power or correlation detection on a beam-forming network connected to said antennas. In addition, antennas 4109a1, 4109a2, 4109a3, 4109aN may be arranged in a non-phased array configuration, such as a beam-switching/antenna-switching configuration, in which each of said antennas is directed to a different direction. Antennas 4109a1, 4109a2, 4109a3, 4109aN, or at least a subset of two antennas thereof, may also be used by first wireless communication system 4100 to generate wireless transmission 4202a toward direction 4212a, using any of said phased array, beam-switching/antenna-switching, or other techniques.

Similarly to the abovementioned, third wireless communication system 4118 may send wireless transmissions to first wireless communication system 4100, such as wireless transmission 4201b. Depending on position of third wireless communication system 4118 relative to first wireless communication system 4100, wireless transmission 4201b arrives at first wireless communication system 4100 from direction 4211b, also referred to as DOA 4211b. First wireless communication system 4100 may send wireless transmissions to third wireless communication system 4118, such as a wireless transmission 4202b, which may be directed 4212b toward second wireless communication system 4118. Again, antennas 4109a1, 4109a2, 4109a3, 4109aN, or at least a subset of two antennas thereof, may be used by first wireless communication system 4100 to determine DOA 4211b, and generate wireless transmission 4202b toward direction 4212b, which is assumed to be same as DOA 4211b. It is noted that although only two wireless communication systems 4117, 4118 are illustrated as interacting/communicating with first wireless communication system 4100, any number of wireless communication systems may interact/communicate with first wireless communication system 4100, via any direction covered by antennas 4109a1, 4109a2, 4109a3, 4109aN. Changing transmission directions by first wireless communication system 4100 may be done very fast and dynamically using electrically controlled beam-steering/beam-switching/phased-array configurations associated with antennas 4109a1, 4109a2, 4109a3, 4109aN, thereby serving even dozens of wireless communication systems similar to wireless communication systems 4117, 4118.

Among advantages of directing 4212a wireless transmission 4202a toward wireless communication system 4117 and directing 4212b wireless transmission 4202b toward wireless communication system 4118 are: (i) increasing antenna gain associated with antennas 4109a1, 4109a2, 4109a3, 4109aN, (ii) improving interference immunity, and (iii) boosting data transmission rates.

Identifiers 4117add and 4118add identify wireless communication systems 4117 and 4118 respectively, and may be an embedded property of wireless communication systems 4117, 4118, such as serial numbers, addresses such as IP or Media-Access-Control (MAC) addresses, or alternatively any identifier given or associated with wireless communication systems 4117, 4118, either dynamically or a-priori. Identifiers 4117add and 4118add are referred to simply as addresses 4117add and 4118add respectively. Information associated with address 4117add may be present in wireless transmission 4201a and information associated with address 4118add may be present in wireless transmission 4201b, thereby allowing wireless communication system 4100 to associated wireless transmission 4201a with wireless communication system 4117 and DOA 4211a, and wireless transmission 4201b with wireless communication system 4118 and DOA 4211b.

Figure 19A:
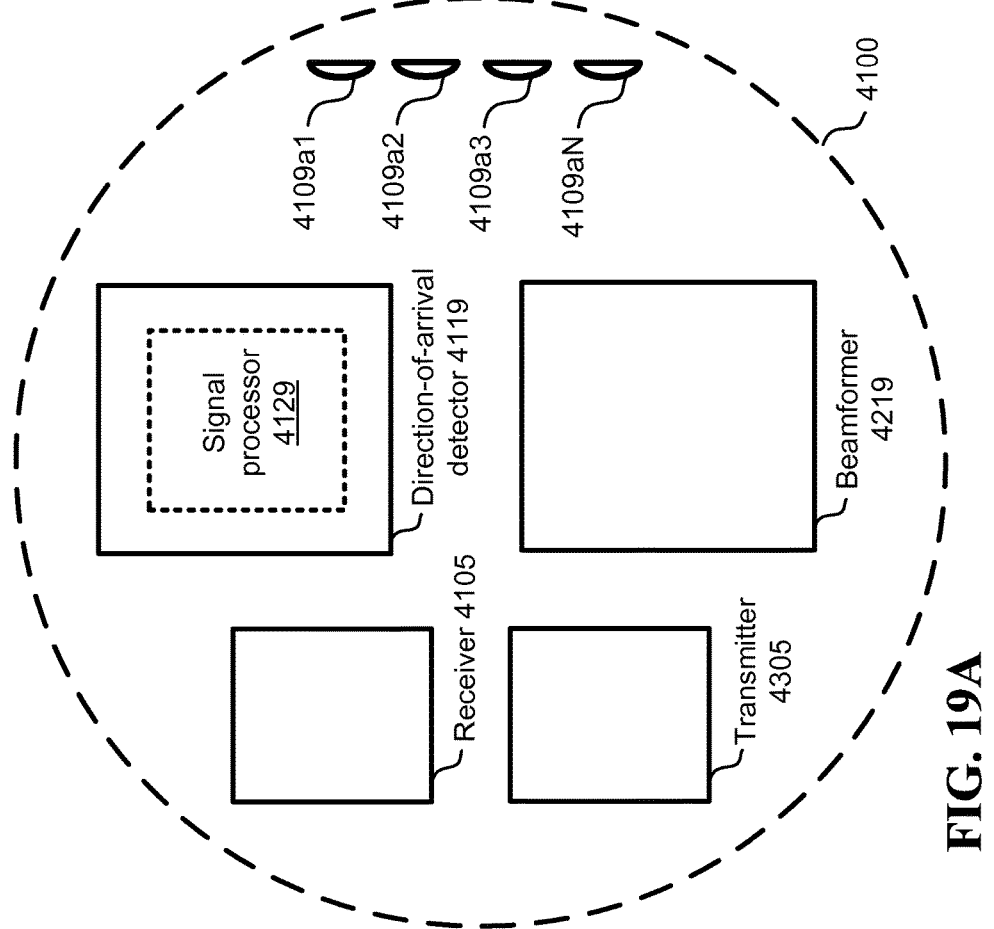
FIG. 19A illustrates one embodiment of various components of a first wireless communication system.

FIG. 19A illustrates one embodiment of wireless communication system 4100. Direction-of-arrival-detector 4119 may detect directions of arrival, such as DOA 4211a and DOA 4211b, in conjunction with antennas 4109a1, 4109a2, 4109a3, 4109aN, and may include a signal processor 4129 operative to aid in such detections. Beamformer 4219 may direct wireless transmissions, and/or receive wireless transmissions, to/from various directions, such as directions 4211a, 4212a, 4211b, and 4212b, in conjunction with antennas 4109a1, 4109a2, 4109a3, and 4109aN. It is noted that although direction-of-arrival-detector 4119 and beamformer 4219 are illustrated as separate component, they may be a single component operative to perform both direction-of-arrival detections and beamforming operations, or alternatively direction-of-arrival-detector 4119 and beamformer 4219 may share common components, such as signal processor 4129. Receiver 4105 may decode wireless transmissions such as wireless transmissions 4201a and 4201b, and may work in conjunction with beamformer 4219 in doing so. Transmitter 4305 may transmit wireless transmissions such as wireless transmissions 4202a and 4202b, and may work in conjunction with beamformer 4219 in doing so.

Figure 19B:
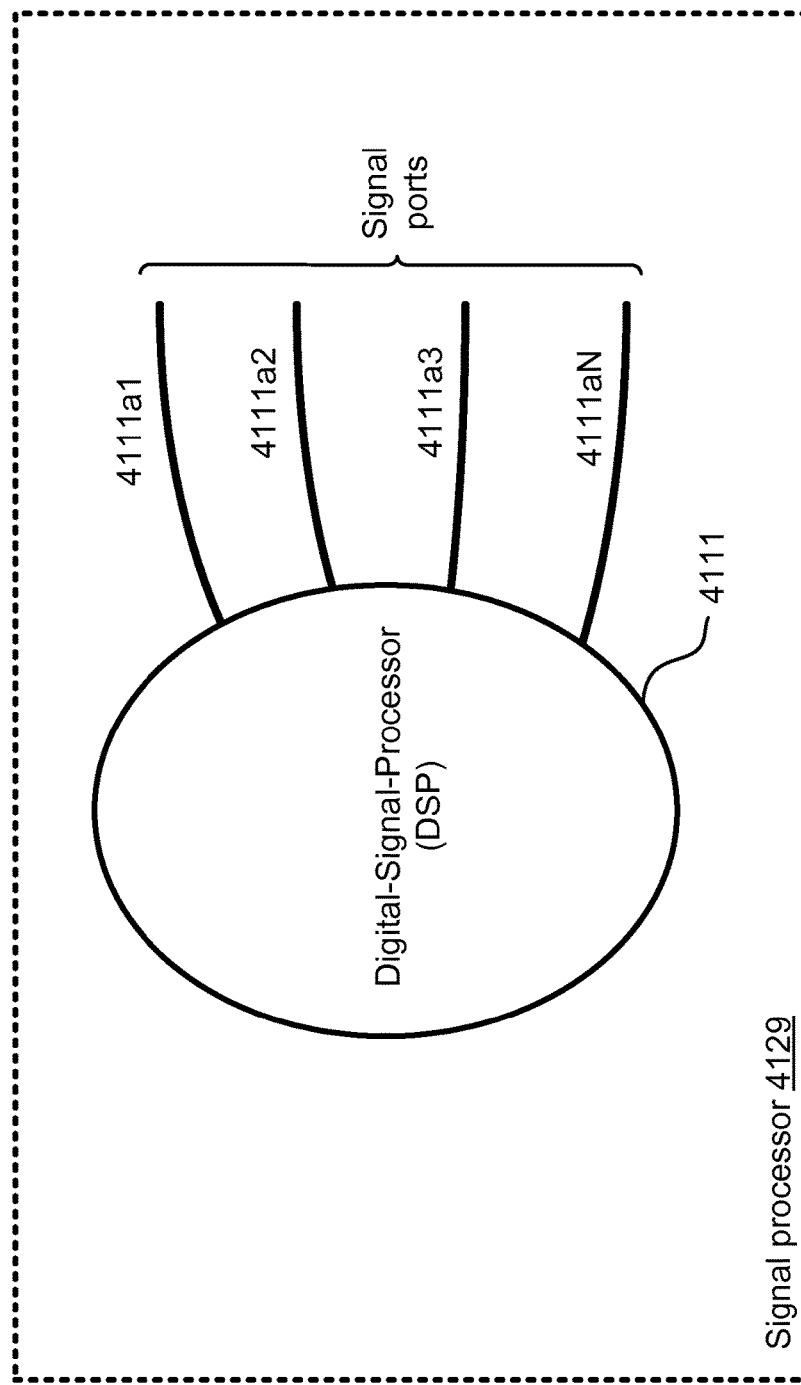
FIG. 19B illustrates one embodiment of a digital-signal-processor belonging to a first wireless communication system.

FIG. 19B illustrates one embodiment of signal processor 4129, in which signal processor 4129 is/or includes a digital-signal-processor (DSP) 4111. DSP 4111 may include signal ports 4111a1, 4111a2, 4111a3, and 4111aN, associated with antennas 4109a1, 4109a2, 4109a3, and 4109aN respectively.

Figure 19C:
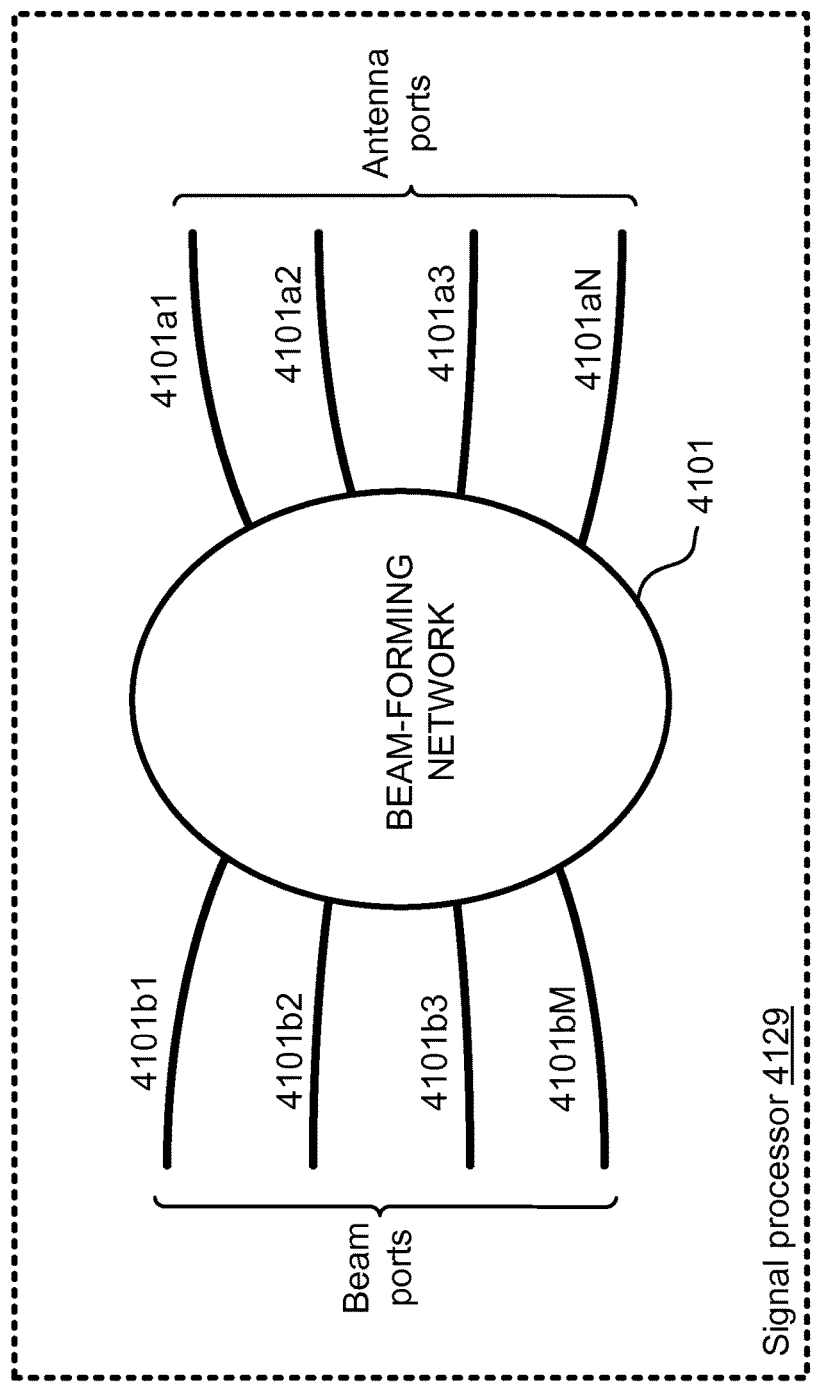
FIG. 19C illustrates one embodiment of a beam-forming network belonging to a first wireless communication system.

FIG. 19C illustrates one embodiment of signal processor 4129, in which signal processor 4129 is/or includes a beam-forming-network 4101. Beam-forming-network 4101 may include (i) antenna ports 4101a1, 4101a2, 4101a3, 4101aN, associated with antennas 4109a1, 4109a2, 4109a3, 4109aN respectively, and (ii) beam ports 4101b1, 4101b2, 4101b3, 4101bM, each associated with a specific DOA.

Figure 20A:
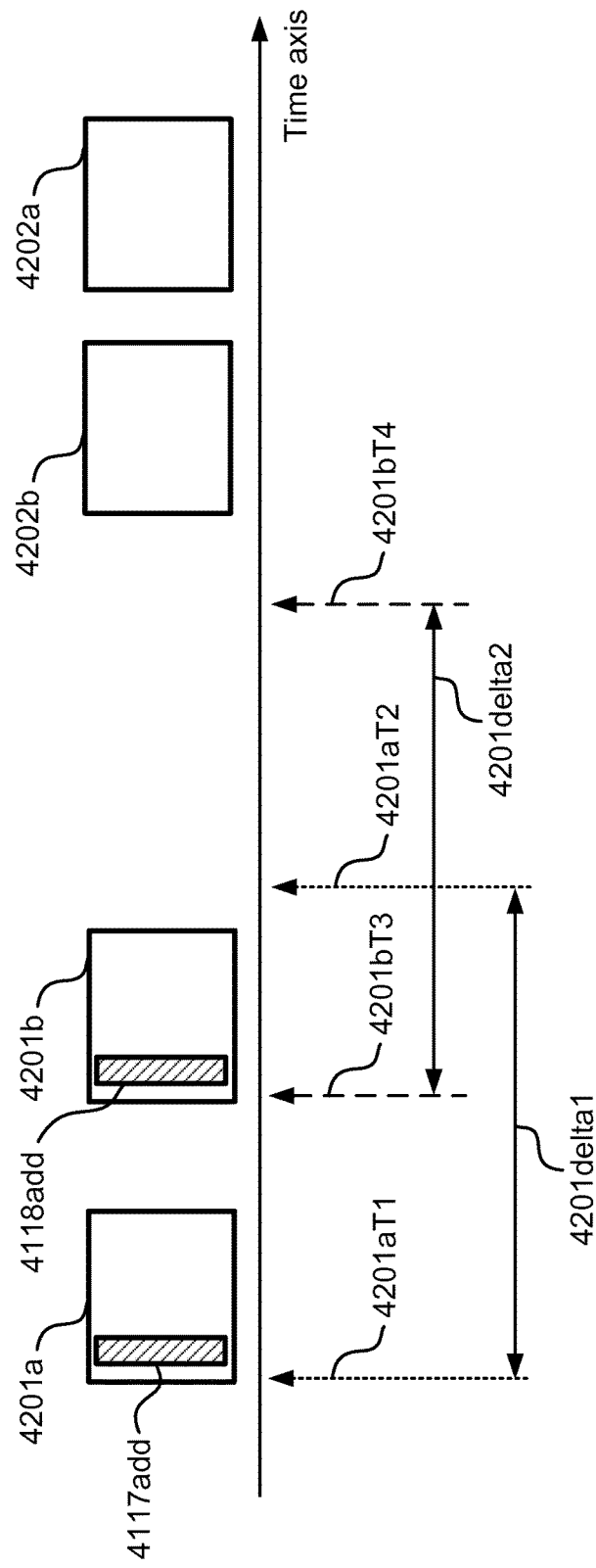
FIG. 20A illustrates one embodiment of a first, second, third, and fourth events associated with wireless transmissions.

FIG. 20A illustrates one embodiment of wireless transmissions 4201a, 4201b, 4202a, 4202b, which may be in a form of wireless packets, together with four events 4201aT1, 4201aT2, 4201bT3, 4201bT4 associated with various phases of processing said wireless transmissions. Address 4117add is embedded in wireless transmission 4201a and address 4118add is embedded in wireless transmission 4201b. By way of example and not limitation, first event 4201aT1 may be the determining of DOA 4211a by direction-or-arrival-detector 4119, and second event 4201aT2 may be the decoding of address 4117add by receiver 4105. Similarly, third event 4201bT3 may be the determining of DOA 4211b, and fourth event 4201bT4 may be the decoding of address 4118add. Wireless transmission 4202a may be, but not necessarily, a response to wireless transmission 4201a, and wireless transmission 4202b may be a response to wireless transmission 4201b.

Figure 20B:
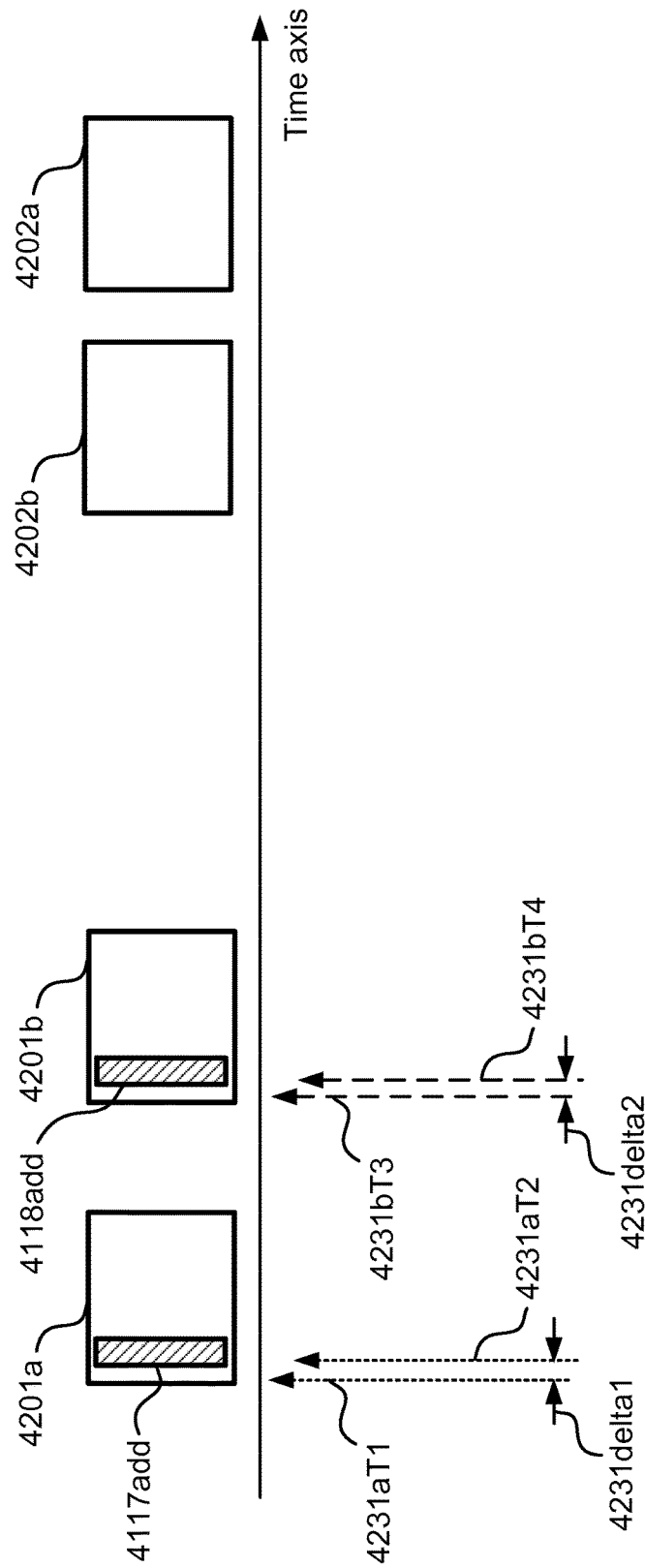
FIG. 20B illustrates one embodiment of a first, second, third, and fourth events associated with wireless transmissions.

FIG. 20B illustrates one embodiment of wireless transmissions 4201a, 4201b, 4202a, 4202b, which may be in a form of wireless packets, together with four events 4231aT1, 4231aT2, 4231bT3, 4231bT4 associated with various phases of detecting said wireless transmissions. By way of example and not limitation, first event 4231aT1 may be the detecting of the beginning of wireless transmission 4201a by direction-or-arrival-detector 4119, and second event 4231aT2 may be the detecting of the beginning of wireless transmission 4201a by receiver 4105. Similarly, third event 4231bT3 may be the detecting of the beginning of wireless transmission 4201b by direction-or-arrival-detector 4119, and fourth event 4231bT4 may be the detecting of the beginning of wireless transmission 4201b by receiver 4105.

Figure 21:
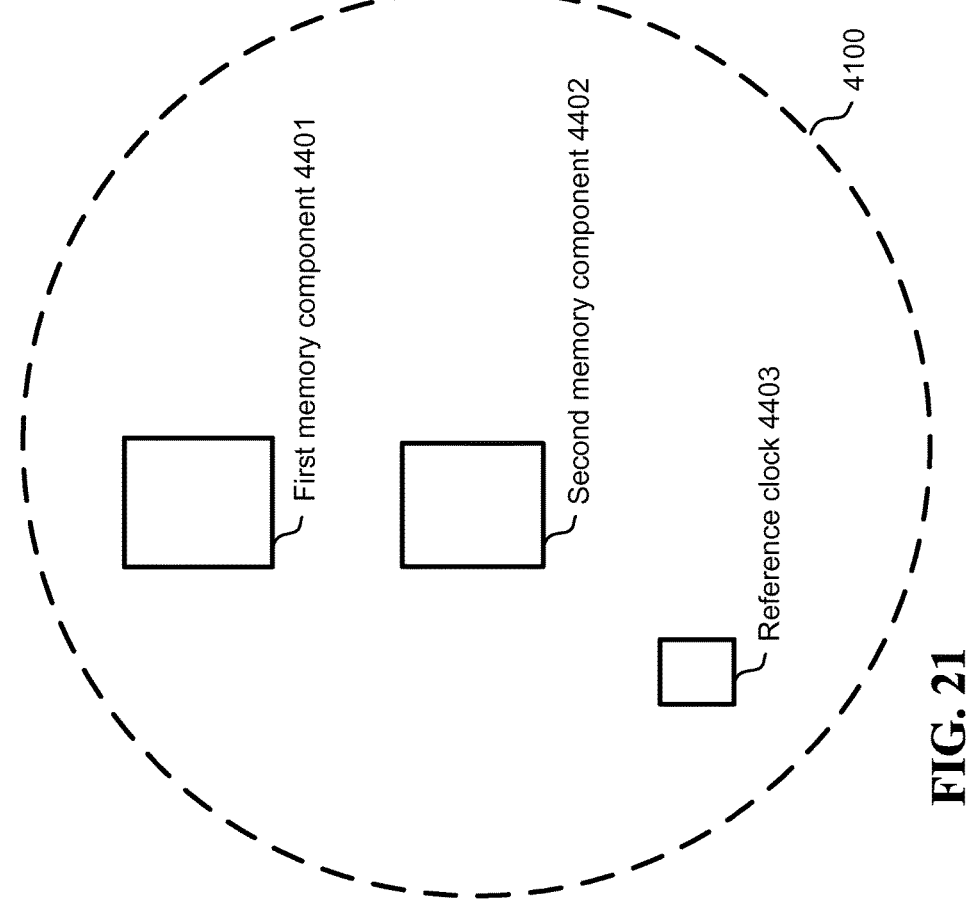
FIG. 21 illustrates one embodiment of various components of a first wireless communication system.

FIG. 21 illustrates one embodiment of additional components associated with wireless communication system 4100. First memory component 4401, second memory component 4402, and reference clock 4403 may be utilized by wireless communication system 4100 in time-stamping and registering various events, such as events 4201aT1, 4201aT2, 4201bT3, 4201bT4 and 4231aT1, 4231aT2, 4231bT3, 4231bT4.

One embodiment for associating direction-of-arrival of a wireless transmission with an address of an originator of the wireless transmission includes: (i) determining, in conjunction with a first event 4201aT1 or 4231aT1, by a first wireless communication system 4100, direction-of-arrival 4211a of a first incoming wireless transmission 4201a arriving from a second wireless communication system 4117 at first wireless communication system 4100 via a plurality of antennas 4109a1, 4109a2, 4109a3, 4109aN belonging to first wireless communication system 4100, (ii) decoding, from said first incoming wireless transmission 4201a, in conjunction with a second event 4201aT2 or 4231aT2, by first wireless communication system 4100, a first source address 4117add associated with second wireless communication system 4117, and (iii) detecting, by said first wireless communication system 4100, time proximity 4201delta1 between first event 4201aT1 and second event 4201aT2, or time proximity 4231delta1 between first event 4231aT1 and second event 4231aT2, thereby associating direction-of-arrival 4211a of first incoming wireless transmission 4201a with first source address 4117add, thereby associating direction-of-arrival 4211a of first incoming wireless transmission 4201a with second wireless communication system 4117. It is noted that two separate scenarios are described above: a first scenario, in which only events 4201aT1 and 4201aT2 are involved in conjunction with time proximity 4201delta1, and a second scenario, in which only events 4231aT1 and 4231aT2 are involved in conjunction with time proximity 4231delta1; the first and second scenarios may be two separate embodiments, describing different types of events.

In one embodiment, first wireless communication system 4100 decides to transmit a first outgoing wireless transmission 4202a to a first destination address, then determines that the first destination address is same as first source address 4117add, thereby associating outgoing wireless transmission 4202a with direction-of-arrival 4211a associated with first source address 4117add, and then transmits wirelessly, via plurality of antennas 4109a1, 4109a2, 4109a3, 4109aN, the first outgoing wireless transmission 4202a toward a direction 4212a same as direction-of-arrival 4211a associated with first source address 4117add, thereby assuring arrival of first outgoing wireless transmission 4202a at second wireless communication system 4117.

In one embodiment, the determination of direction-of-arrival 4211*a* is done out of at least two possible directions-of-arrival 4211*a*, 4211*b*.

In one embodiment, the determination of direction-of-arrival 4211*a* is done by a direction-of-arrival-detector 4119. In one embodiment, direction-of-arrival-detector 4119 includes a signal processor 4129 that derives direction-of-arrival 4211*a* from first incoming wireless transmission 4201*a* arriving from plurality of antennas 4109*a*1, 4109*a*2, 4109*a*3, 4109*a*N. In one embodiment, signal processor 4129 is a digital signal processor 4111. In one embodiment, signal processor 4129 includes a beam-forming network 4101. In one embodiment, beam-forming network 4101 is: (i) a rotman lens, (ii) a butler matrix, or (iii) a blass matrix. In one embodiment, beam-forming network 4101 includes at least a first 4101*b*1 and a second 4101*b*2 beam-ports, but more beam-ports 4101*b*1, 4101*b*2, 4101*b*3, 4101*b*M are possible, such that first beam-port 4101*b*1 produces a first beam-port signal as a response to first incoming wireless transmission 4201*a* arriving from a first direction 4211*a*, and second beam-port 4101*b*2 produces a second beam-port signal as a response to first incoming wireless transmission 4201*a* arriving from a different direction.

In one embodiment, first wireless communication system 4100 determines, in conjunction with a third event 4201*b*T3 or 4231*b*T3, direction-of-arrival 4211*b* of a second incoming wireless transmission 4201*b* arriving from a third wireless communication system 4118 at first wireless communication system 4100 via plurality of antennas 4109*a*1, 4109*a*2, 4109*a*3, 4109*a*N. First wireless communication system 4100 then decodes, from second incoming wireless transmission 4201*b*, in conjunction with a fourth event 4201*b*T4 or 4231*b*T4, a second source address 4118add associated with third wireless communication system 4118, and then detects time proximity 4201delta2 between third event 4201*b*T3 and fourth event 4201*b*T4, or time proximity 4231delta2 between third event 4231*b*T3 and fourth event 4231*b*T4, thereby associating direction-of-arrival 4211*b* of second incoming wireless transmission 4201*b* with second source address 4118add, thereby associating direction-of-arrival 4211*b* of said second incoming wireless transmission 4201*b* with third wireless communication system 4118. It is noted that two separate scenarios are described above: a third scenario, in which only events 4201*b*T3 and 4201*b*T4 are involved in conjunction with time proximity 4201delta2, and a fourth scenario, in which only events 4231*b*T3 and 4231*b*T4 are involved in conjunction with time proximity 4231delta2; the third and fourth scenarios may be two separate embodiments, describing different types of events.

In one embodiment, first wireless communication system 4100 decides to transmit a second outgoing wireless transmission 4202*b* to a second destination address, then determined that the second destination address is same as second source address 4118add, thereby associating second outgoing wireless transmission 4202*b* with direction-of-arrival 4211*b* associated with second source address 4118add, and then transmitting wirelessly, via plurality of antennas 4109*a*1, 4109*a*2, 4109*a*3, 4109*a*N, second outgoing wireless transmission 4202*b*, toward a direction 4212*b* same as direction-of-arrival 4211*b* associated with second source address 4118add, thereby: (i) assuring arrival of second outgoing wireless transmission 4202*b* at third wireless communication system 4118, and (ii) assuring that second outgoing wireless transmission 4202*b* is not transmitted toward a direction 4212*a* same as direction-of-arrival 4211*a* associated with second wireless communication system 4117.

In one embodiment, the determination of direction-of-arrival of first incoming wireless transmission 4201*a* and second incoming wireless transmission 4201*b* is done by a direction-of-arrival-detector 4119, and decoding of first source address 4117add and second source address 4118add is done by a receiver 4105. In one embodiment, direction-of-arrival-detector 4119 records into a first memory component 4401: (i) direction-of-arrival 4211*a* of first incoming wireless transmission 4201*a*, together with (ii) a first time-stamp associated with first event 4201*a*T1 or 4231*a*T1, and direction-of-arrival-detector 4119 records into first memory component 4401: (i) direction-of-arrival 4211*b* of second incoming wireless transmission 4201*b*, together with (ii) a third time-stamp associated with third event 4201*b*T3 or 4231*b*T3. Receiver 4105 records into a second memory component 4402: (i) first source address 4117add, together with (ii) a second time-stamp associated with second event 4201*a*T2 or 4231*a*T2, and receiver 4105 records into second memory component 4402: (i) second source address 4118add, together with (ii) a fourth time-stamp associated with fourth event 4201*b*T4 or 4231*b*T4.

In one embodiment, first wireless communication system 4100 reads from first and second memory components 4401, 4402: first, second, third, and fourth time stamps, and then associates between time stamps having close time proximity, such that: (i) the first time-stamp is associated with the second time-stamp, and (ii) the third time-stamp is associated with the fourth time stamp. First wireless communication system 4100 reads from first and second memory components 4401, 4402: (i) direction-of-arrival 4211*a* of first incoming wireless transmission 4201*a* associated with the first time-stamp, and (ii) the first source address 4117add associated with the second time-stamp, thereby achieving association between direction-of-arrival 4211*a* of first incoming wireless transmission 4201*a* and first source address 4117add. First wireless communication system 4100 reads from first and second memory components 4401, 4402: (i) direction-of-arrival of second incoming wireless transmission 4201*b* associated with the third time-stamp, and (ii) second source address 4118add associated with the fourth time-stamp, thereby achieving association between direction-of-arrival 4211*b* of second incoming wireless transmission 4201*b* and second source address 4118add.

In one embodiment, first memory component 4401 is different from second memory component 4402. In one embodiment, first memory component 4401 is same as second memory component 4402. In one embodiment: (i) the first time-stamp is obtained by reading time from a reference clock 4403 by direction-of-arrival-detector 4119 in proximity to first event 4201*a*T1 or 4231*a*T1, (ii) the second time-stamp is obtained by reading time from reference clock 4403 by receiver 4105 in proximity to second event 4201*a*T2 or 4231*a*T2, (iii) the third time-stamp is obtained by reading time from reference clock 4403 by direction-of-arrival detector 4119 in proximity to third event 4201*b*T3 or 4231*b*T3, and (iv) the fourth time-stamp is obtained by reading time from reference clock 4403 by receiver 4105 in proximity to fourth event 4201*b*T4 or 4231*b*T4.

In one embodiment: (i) first wireless communication system 4100 is a wireless-local-area-network access-point, (ii) second wireless communication system 4117 is a wireless client device associated with the wireless-local-area-network access-point, and (iii) first incoming wireless transmission 4201*a* is in a form of a wireless packet. In one embodiment, the wireless-local-area-network access-point, the wireless client device, and the wireless packet conform to IEEE 802.11 standards. In one embodiment, the wireless-local-area-network access-point, the wireless client device, and the wireless packet conform to Wi-Fi. In one embodiment, the first source address 4117add is a source Media-Access-Control (MAC) address associated with second wireless communication system 4117.

In one embodiment, the determination of direction-of-arrival 4211a of first incoming wireless transmission 4201a is done by a direction-of-arrival-detector 4119 and the decoding of first source address 4117add is done by a receiver 4105. In one embodiment, first event 4231aT1 is a detection of a beginning of first incoming wireless transmission 4201a by first wireless communication system 4100. In one embodiment, first event 4231aT1 is a detection of a beginning of first incoming wireless transmission 4201a by direction-of-arrival-detector 4119. In one embodiment, first event 4231aT1 triggers the determination of direction-of-arrival 4211a of first incoming wireless transmission 4201a. In one embodiment, second event 4231aT2 is a detection of a beginning of first incoming wireless transmission 4201a by first wireless communication system 4100. In one embodiment, second event 4231aT2 is a detection of a beginning of first incoming wireless transmission 4201a by receiver 4105. In one embodiment, second event 4231aT2 triggers the decoding of first source address 4117add.

In one embodiment, first event 4201aT1 is any point in processing of incoming wireless transmission 4201a by first wireless communication system 4100. In one embodiment, first event 4201aT1 is any point in processing of first incoming wireless transmission 4201a by direction-of-arrival-detector 4119. In one embodiment, second event 4201aT2 is any point in processing of first incoming wireless transmission 4201a by first wireless communication system 4100. In one embodiment, second event 4201aT2 is any point in processing of first incoming wireless transmission 4201a by receiver 4105.

One embodiment for associating directions of incoming transmissions with directions of outgoing transmissions in a wireless communication network includes: (i) determining, by a first wireless communication system 4100, for each of a plurality of incoming wireless transmissions 4201a, 4201b arriving at first wireless communication system 4100: (1) time of arrival 4201aT1, 4201bT3 respectively and direction-of-arrival 4211a, 4211b respectively, and (2) time of decoding 4201aT2, 4201bT4 respectively and source address 4117add, 4118add respectively, (ii) associating, by first wireless communication system 4100, between each of source addresses 4117add, 4118add and corresponding direction-of-arrival 4211a, 4211b respectively, by detecting time proximities between the times of arrival and times of decoding, such as time proximity 4201delta1 detected between time of arrival 4201aT1 and time of decoding 4201aT2, and time proximity 4201delta2 detected between time of arrival 4201bT3 and time of decoding 4201bT4, and (iii) transmitting, by first wireless communication system 4100, at least one outgoing wireless transmission 4202a having a destination address same as one of said source addresses 4117add, toward a direction 4212a same as direction-of-arrival 4211a associated previously with said one of said source addresses 4117add.

In one embodiment, the determination of times of arrival 4201aT1, 4201bT3 and directions-of-arrival 4211a, 4211b is done by a direction-of-arrival-detector 4119 belonging to first wireless communication system 4100, and the determination of times of decoding 4201aT2, 4201bT4 and source addresses 4117add, 4118add is done by a receiver 4105 belonging to first wireless communication system 4100, wherein receiver 4105 performs decoding of source address 4117add, 4188add from corresponding incoming wireless transmissions 4201a, 4201b respectively.

In one embodiment, first wireless communication system 4100 is a half-duplex wireless communication system, such that the transmitting of at least one outgoing wireless transmission 4202a occurs at a later time slot than arrival of incoming wireless transmissions 4201a. In one embodiment: (i) operation of direction-of-arrival-detector 4119 is not coordinated with operation of receiver 4105, (ii) direction-of-arrival-detector 4119 is incapable of determining source address 4117add, 4188add, and (iii) receiver 4105 is incapable of determining directions-of-arrival 4211a, 4211b.

One embodiment is a wireless communication system 4100 capable of associating between data from a direction-of-arrival-detector and data from a receiver operating separately, including: (i) at least a first and second antennas 4109a1, 4109a2 operative to receive a first incoming wireless transmission 4201a arriving at first and second antennas 4109a1, 4109a2, (ii) a direction-of-arrival-detector 4119, working in conjunction with the at least first and second antennas 4109a1, 4109a2, operative to determine direction-of-arrival 4211a of first incoming wireless transmission 4201a in associations with a first event 4231aT1, and (iii) a receiver 4105, operating separately from direction-of-arrival-detector 4119, operative to decode a first source address 4117add from first incoming wireless transmission 4201a in association with a second event 4231aT2. Wireless communication system 4100 is operative to detect time proximity 4231delta1 between first event 4231aT1 and second event 4231aT2, thereby associating direction-of-arrival 4211a of first incoming wireless transmission 4201a with first source address 4117add of first incoming wireless transmission 4201a.

In one embodiment, time proximity 4231delta1 is shorter than two milliseconds. In one embodiment, time proximity 4231delta1 is shorter than 200 microseconds. In one embodiment, time proximity 4231delta1 is shorter than 20 microseconds.

In one embodiment, the association of direction-of-arrival 4211a with first source address 4117add is done at least 10 milliseconds after second event 4231aT2, thereby allowing for non real-time association of direction-of-arrival 4211a with first source address 4117add.

In one embodiment, receiver 4105 is unaware of direction-of-arrival-detector 4119 and direction-of-arrival 4211a, thereby operating separately from direction-of-arrival-detector 4119.

In one embodiment: (i) wireless communication system 4100 is a wireless-local-area-network access-point, and (ii) first incoming wireless transmission 4201a is in a form of a wireless packet. In one embodiment, the wireless-local-area-network access-point and the wireless packet conform to IEEE 802.11 standards.

In one embodiment, first source address 4117add is a source Media-Access-Control (MAC) address associated with first incoming wireless transmission 4201a.

One embodiment for associating a relative direction (bearing) of a wireless communication device with its Media-Access-Control (MAC) address includes: (i) receiving, at a plurality of antennas 4109a1, 4109a2, 4109a3, 4109aN, in a first wireless communication device 4100, a first wireless communication packet 4201a sent by a second wireless communication device 4117, (ii) determining, in a direction-of-arrival detector 4119 of first wireless communication device 4100, the bearing 4211a of second wireless communication device 4117 with respect to the first wireless communication device 4100, (iii) decoding, in a receiver 4105 of first wireless communication device 4100, a portion of the first wireless communication packet 4201a so as to determine a MAC address 4117add encoded in the portion of the first wireless communication packet 4201a, and (iv) associating bearing 4211a of the second wireless communication device 4117 with MAC address 4117add of the second wireless communication device 4117.

In one embodiment, the receiving of first wireless communication packet 4201a causes respective antenna output signals in each of said plurality of antennas 4109a1, 4109a2, 4109a3, 4109aN, and determining bearing 4211a includes determining bearing 4211a based at least on the plurality of antenna output signals. In one embodiment, first wireless communication device 4100 determines a first event 4201aT1 to which the determining of bearing 4211a is associated, and determines a second event 4201aT2 to which the decoding of MAC address 4117add is associated. In one embodiment, first wireless communication device 4100 determines a difference in time 4201delta1 between the first and second events 4201aT1, 4201aT2. In one embodiment, the associating of the bearing 4211a and MAC address 4117add of the second wireless communication device 4117 employs the determining of the difference in time 4201delta1.

In one embodiment, the determining the bearing 4211a of the second wireless communication device 4117 comprising beam-forming by direction-of-arrival detector 4119 using the plurality of antenna output signals.

In one embodiment, repeating the receiving, determining, decoding and associating from time to time so as to track second wireless communication device 4117 where its bearing with respect to first wireless communication device 4100 varies in time.

In one embodiment, repeating the receiving, determining, decoding and associating for a third wireless communication device 4118 so as to associate a plurality of wireless communication device bearings 4211a, 4211b with their respective MAC addresses 4117add, 4118add.

Figure 22:
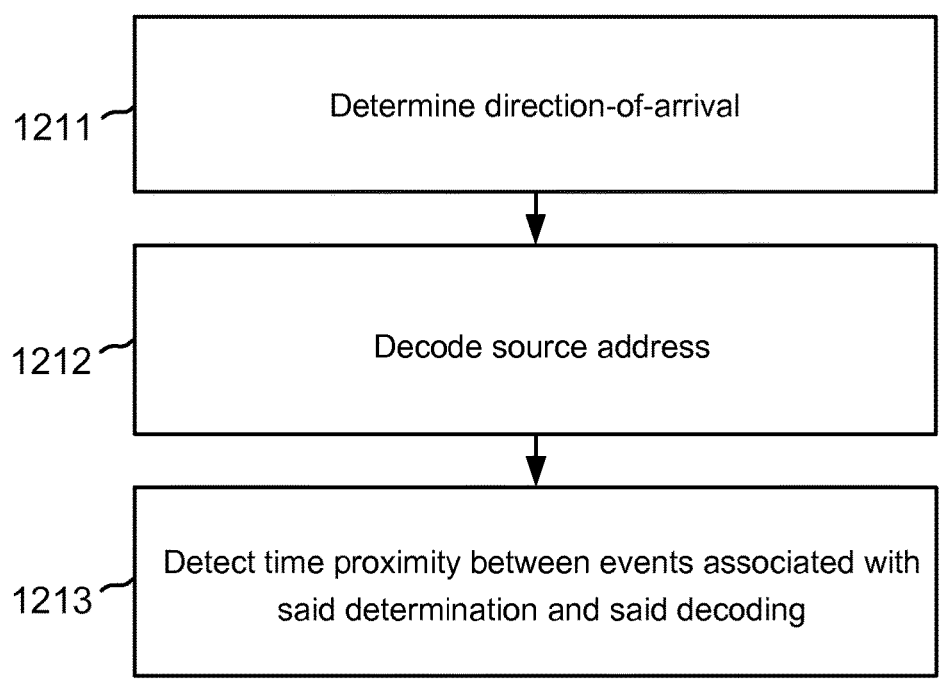
FIG. 22 illustrates one embodiment of a method for associating direction-of-arrival of a wireless transmission with an address of an originator of the wireless transmission.

FIG. 22 illustrates one embodiment of a method for associating direction-of-arrival of a wireless transmission with an address of an originator of the wireless transmission. In step 1211: determining, in conjunction with a first event 4201aT1 or 4231aT1, by a first wireless communication system 4100, direction-of-arrival 4211a of a first incoming wireless transmission 4201a arriving from a second wireless communication system 4117 at first wireless communication system 4100 via a plurality of antennas 4109a1, 4109a2, 4109a3, 4109aN belonging to first wireless communication system 4100. In step 1212: decoding, from the first incoming wireless transmission 4201a, in conjunction with a second event 4201aT2 or 4231aT2, by first wireless communication system 4100, a first source address 4117add associated with second wireless communication system 4117. In step 1213: detecting, by the first wireless communication system 4100, time proximity 4201delta1 between first event 4201aT1 and second event 4201aT2, or time proximity 4231delta1 between first event 4231aT1 and second event 4231aT2, thereby associating direction-of-arrival 4211a of first incoming wireless transmission 4201a with first source address 4117add, thereby associating direction-of-arrival 4211a of first incoming wireless transmission 4201a with second wireless communication system 4117.

Figure 23:
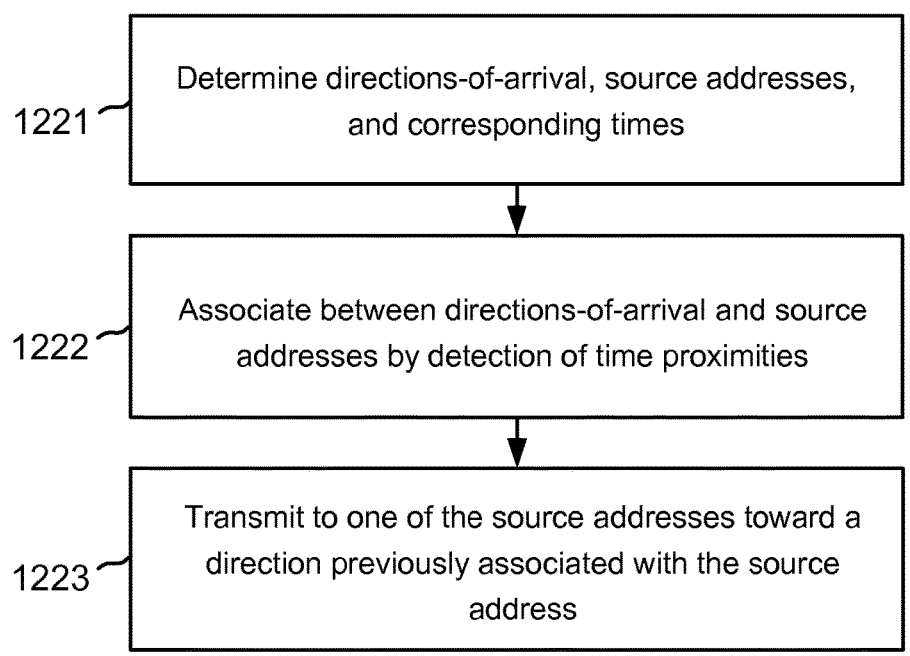
FIG. 23 illustrates one embodiment of a method for associating directions of incoming transmissions with directions of outgoing transmissions in a wireless communication network.

FIG. 23 illustrates one embodiment of a method for associating directions of incoming transmissions with directions of outgoing transmissions in a wireless communication network. In step 1221: determining, by a first wireless communication system 4100, for each of a plurality of incoming wireless transmissions 4201a, 4201b arriving at first wireless communication system 4100: (1) time of arrival 4201aT1, 4201bT3 respectively and direction-of-arrival 4211a, 4211b respectively, and (2) time of decoding 4201aT2, 4201bT4 respectively and source address 4117add, 4118add respectively. In step 1222: associating, by first wireless communication system 4100, between each of source addresses 4117add, 4118add and corresponding direction-of-arrival 4211a, 4211b respectively, by detecting time proximities between the times of arrival and times of decoding. In step 1223: transmitting, by first wireless communication system 4100, at least one outgoing wireless transmission 4202a having a destination address same as one of said source addresses 4117add, toward a direction 4212a same as direction-of-arrival 4211a associated previously with one of said source addresses 4117add.

Figure 24:
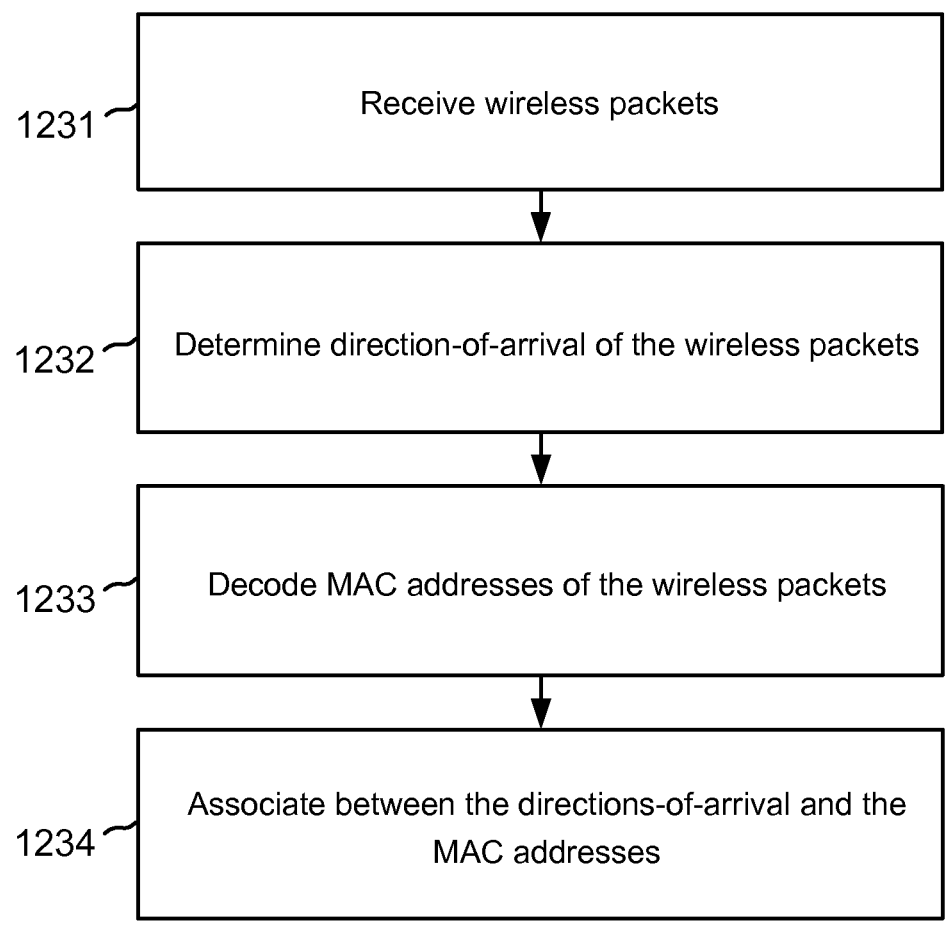
FIG. 24 illustrates one embodiment of a method for associating a relative direction (bearing) of a wireless communication device with its Media-Access-Control (MAC) address.

FIG. 24 illustrates one embodiment of a method for associating a relative direction (bearing) of a wireless communication device with its Media-Access-Control (MAC) address. In step 1231: receiving, at a plurality of antennas 4109a1, 4109a2, 4109a3, 4109aN in a first wireless communication device 4100, a first wireless communication packet 4201a sent by a second wireless communication device 4117. In step 1232: determining, in a direction-of-arrival detector 4119 of first wireless communication device 4100, the bearing 4211a of second wireless communication device 4117 with respect to the first wireless communication device 4100. In step 1233: decoding, in a receiver 4105 of first wireless communication device 4100, a portion of the first wireless communication packet 4201a so as to determine a MAC address 4117add encoded in the portion of the first wireless communication packet 4201a. In step 1234: associating bearing 4211a of the second wireless communication device 4117 with MAC address 4117add of the second wireless communication device 4117.

Figure 25A:
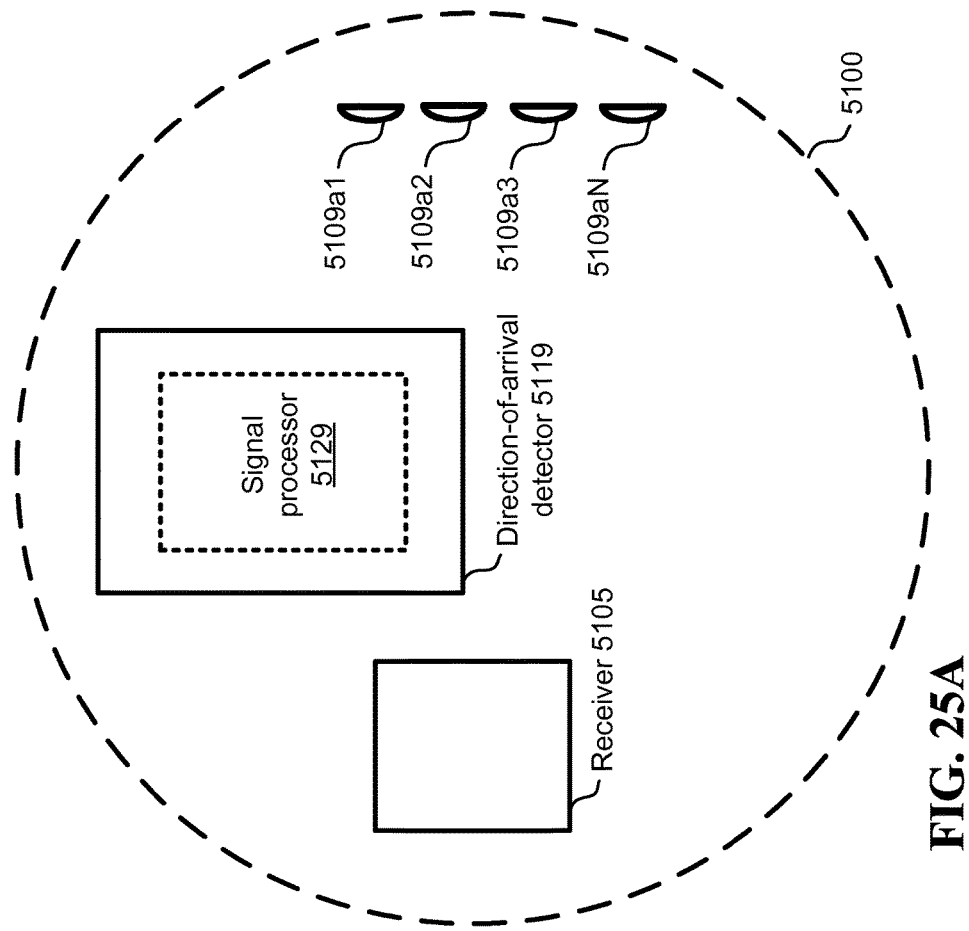
FIG. 25A illustrates one embodiment of a wireless communication system operative to process and detect iteratively an incoming wireless transmission.

FIG. 25A illustrates one embodiment of a wireless communication system operative to process and detect iteratively an incoming wireless transmission. Wireless communication system 5100 includes: (i) a direction-of-arrival detector 5119 operative to detect direction of arrival of an incoming wireless transmission using a signal processor 5129, (ii) a receiver 5105 operative to process the incoming wireless transmission, and (iii) at least two antennas 5109a1, 5109a2, 5109a3, 5109aN operative to pick up the incoming wireless transmission.

Figure 25B:
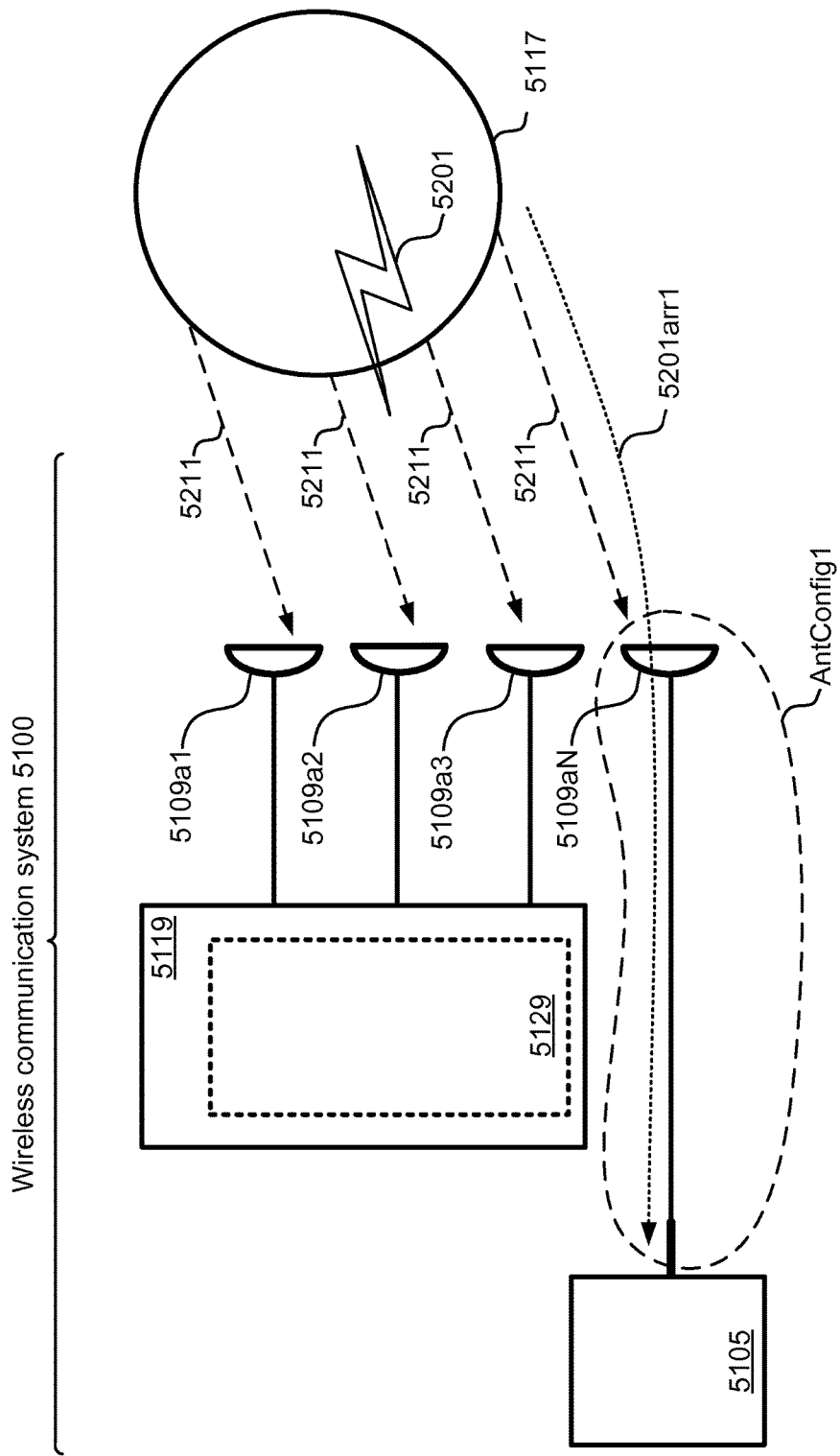
FIG. 25B illustrates one embodiment of a first state of a wireless communication system, in which a first portion of an incoming wireless transmission is processed.

FIG. 25B illustrates one embodiment of a first state of a wireless communication system, in which a first portion of an incoming wireless transmission is processed. A first antenna configuration AntConfig1, which includes by way of example antenna 5109aN, receives a first portion of an incoming wireless transmission 5201 arriving 5201arr1 from a transmission source 5117 via direction 5211; this first portion is then delivered to receiver 5105 for processing. Antenna configuration AntConfig1 has a static radiation pattern associated with antenna 5109aN; this static radiation pattern is wide enough to facilitate reception of incoming wireless transmission 5201 on the one hand, but results in a relatively low reception gain on the other hand. Using such a wide and static radiation pattern is required, at least at the beginning while processing said first portion, since the bearing 5211 of transmission source 5117 is not yet known. However, antennas 5109a1, 5109a2, 5109a3, in conjunction with direction-of-arrival detector 5119, may be used to estimate such bearing 5211, concurrently with said processing, and without interfering with such processing or with the operation of first antenna configuration AntConfig1, thereby facilitating higher reception gain for later portions of incoming wireless transmission 5201.

Figure 25C:
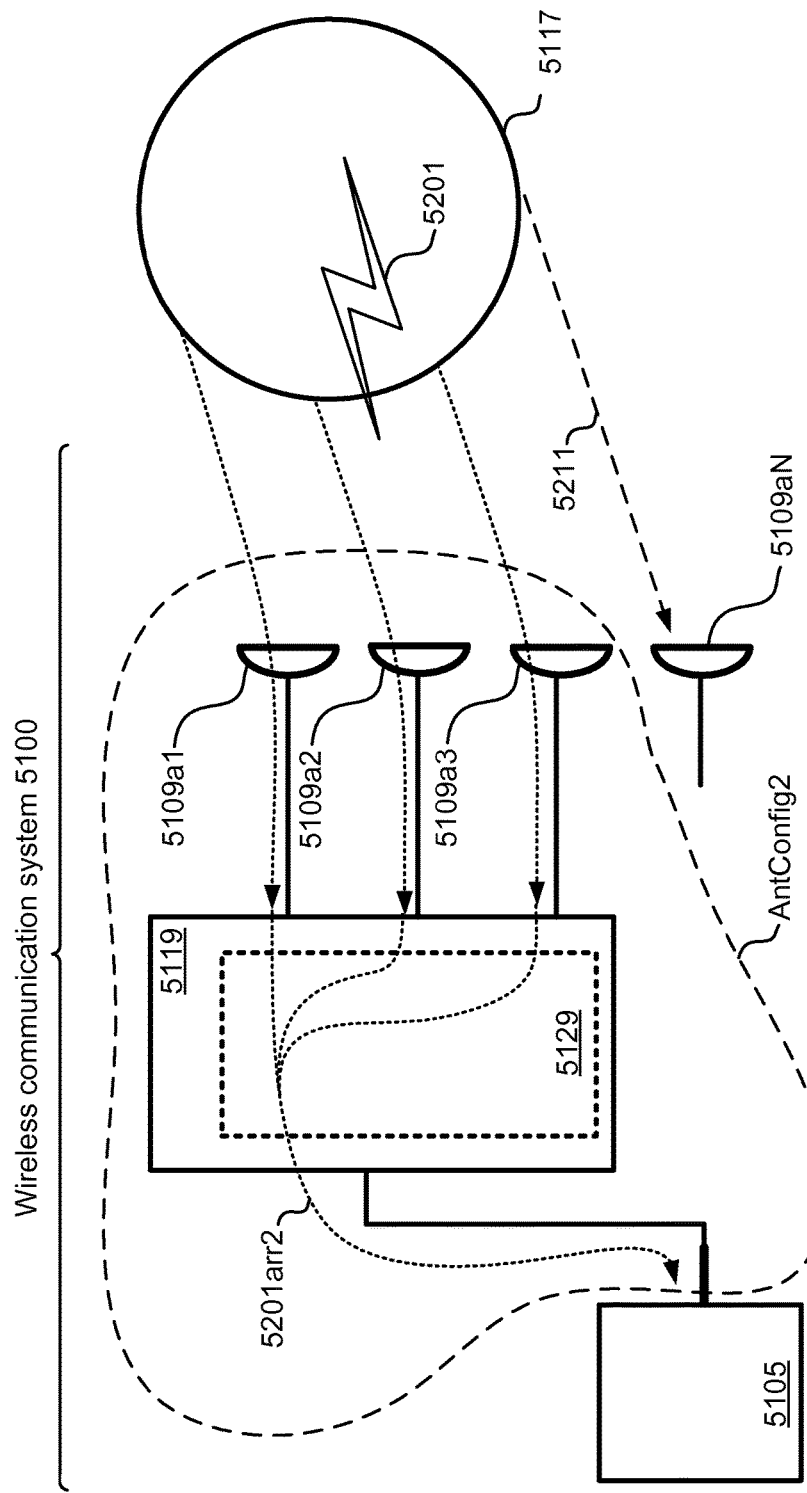
FIG. 25C illustrates one embodiment of a second state of a wireless communication system, in which a second portion of an incoming wireless transmission is processed.

FIG. 25C illustrates one embodiment of a second state of a wireless communication system, in which a second portion of an incoming wireless transmission is processed. A second antenna configuration AntConfig2, which includes by way of example antennas 5109a1, 5109a2, 5109a3, receives a second portion of the incoming wireless transmission 5201 arriving 5201arr2 from transmission source 5117 via direction 5211; this second portion is then delivered to receiver 5105 for processing. Antenna configuration AntConfig2 has a directed radiation pattern associated with antennas 5109a1, 5109a2, 5109a3 and signal processor 5129; this directed radiation pattern is relatively narrow and high gain, and is based on previously estimated bearing 5211. A transition from the first state to the second state may be done by switching from the first antenna configuration AntConfig1 to the second antenna configuration AntConfig2. Receiver 5105 is not necessarily aware of such a transition.

Figure 25D:
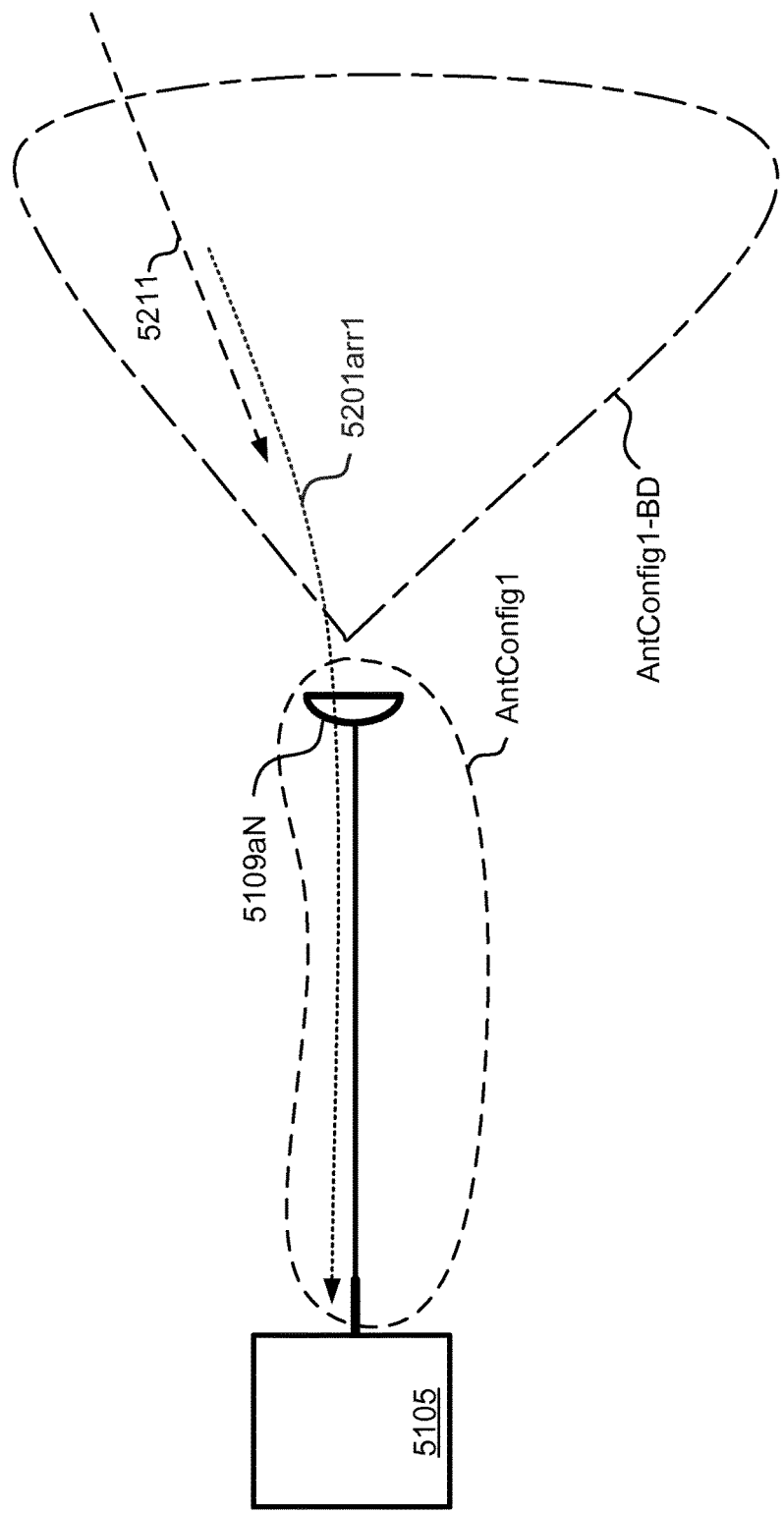
FIG. 25D illustrates one embodiment of a first antenna configuration.

FIG. 25D illustrates one embodiment of a first antenna configuration. First antenna configuration AntConfig1 has a static radiation pattern AntConfig1-BD (also referred to as a beam direction) that is wide enough to facilitate reception of incoming wireless transmission 5201 on the one hand, but results in a relatively low reception gain on the other hand. It is noted that bearing 5211 falls within the reception span of static radiation pattern AntConfig1-BD.

Figure 25E:
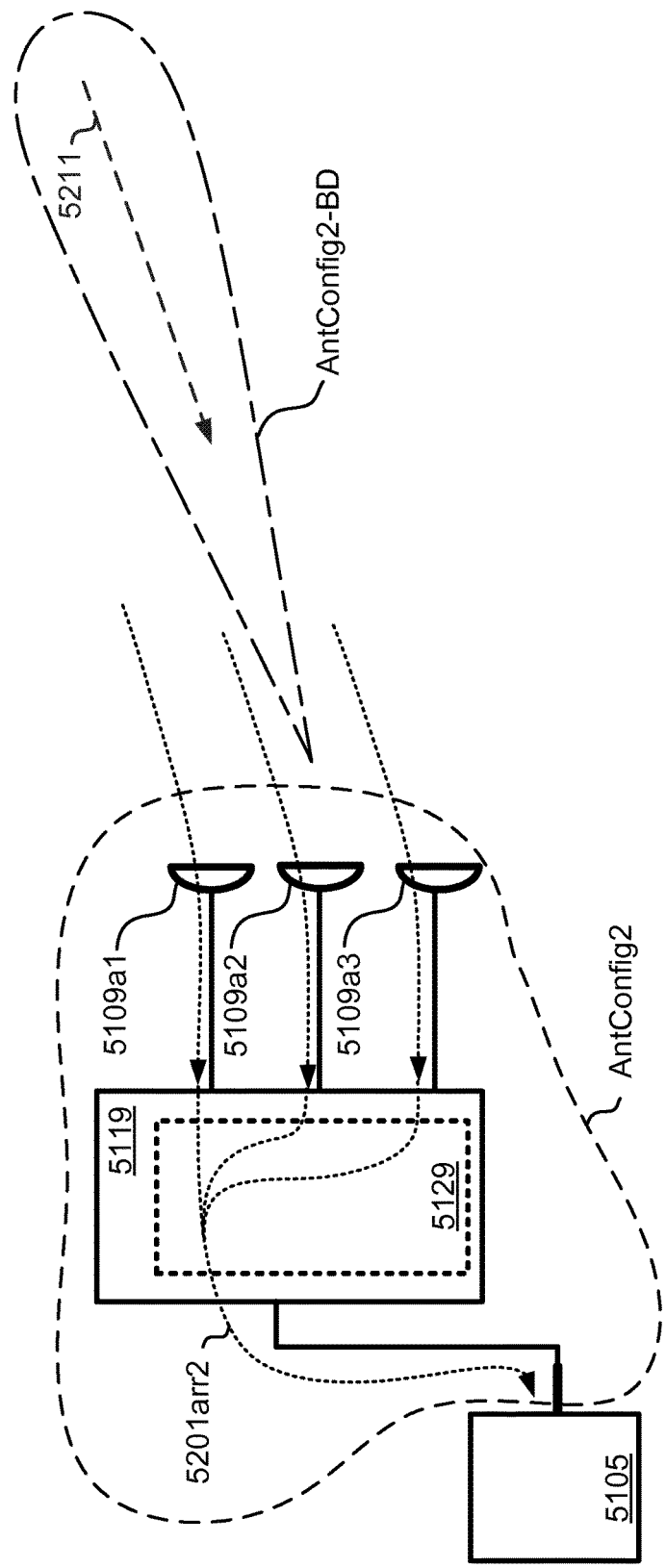
FIG. 25E illustrates one embodiment of a second antenna configuration.

FIG. 25E illustrates one embodiment of a second antenna configuration. Second antenna configuration AntConfig2 has a directed radiation pattern AntConfig2-BD, which is relatively narrow, high gain, and directed substantially toward bearing 5211.

Figure 25F:
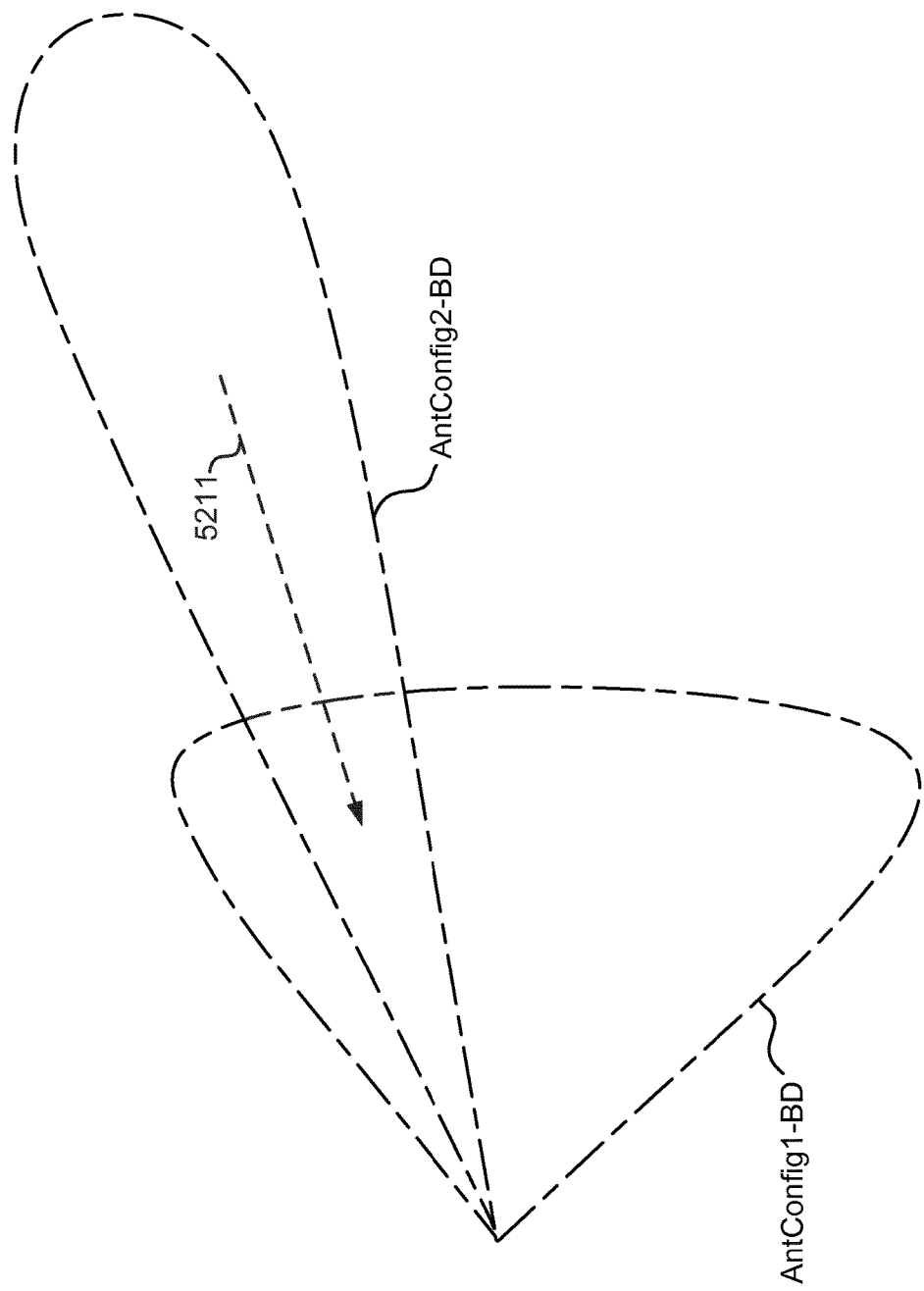
FIG. 25F illustrates one embodiment of a static radiation pattern and a directed radiation pattern.

FIG. 25F illustrates one embodiment of a static radiation pattern and a directed radiation pattern. It is noted that the static radiation pattern AntConfig1-BD is wider than the directed radiation pattern AntConfig2-BD, but the directed radiation pattern AntConfig2-BD has a higher gain than the static radiation pattern AntConfig1-BD. Both radiation patterns AntConfig1-BD, AntConfig2-BD cover bearing 5211.

Figure 25G:
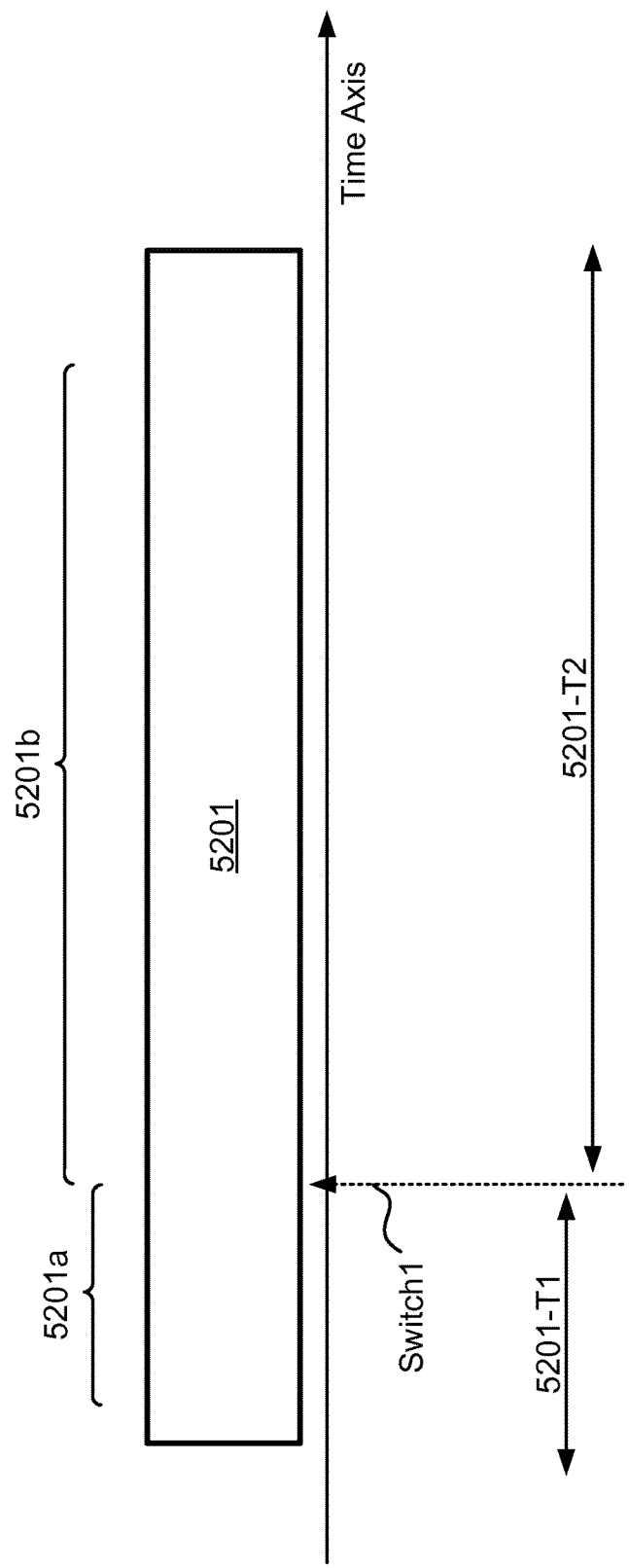
FIG. 25G illustrates one embodiment of an incoming wireless transmission.

FIG. 25G illustrates one embodiment of an incoming wireless transmission. Incoming wireless transmission 5201 includes two portions: first portion 5201a and second portion 5201b that immediately follows the first portion. The first and second portions 5201a, 5201b are not necessarily properties of incoming wireless transmission 5201, but are rather a result of a switching event Switch1, during which wireless communication system 5100 switches form the first antenna configuration AntConfig1 to the second antenna configuration AntConfig2. At least some of the processing of first portion 5201a may occur during time interval 5201-T1, and at least some of the processing of second portion 5201b may occur during time interval 5201-T2.

Figure 26A:
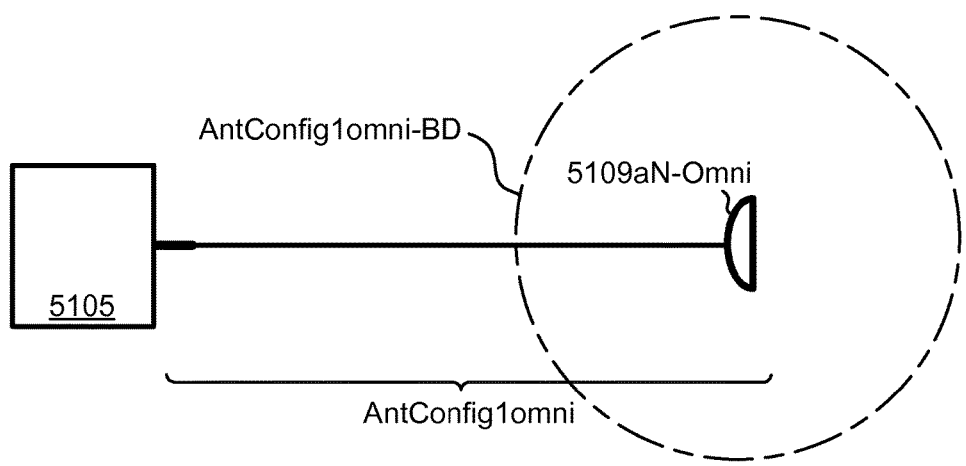
FIG. 26A illustrates one embodiment of a first antenna configuration which is omni-directional.

FIG. 26A illustrates one embodiment of a first antenna configuration which is omni-directional. Antenna 5109aN may be an omni-directional antenna 5109aN-Omni having an omni-directional radiation pattern AntConfig1omni-BD, which results in a first antenna configuration AntConfig1 that is an omni-directional antenna configuration AntConfig1omni.

Figure 26B:
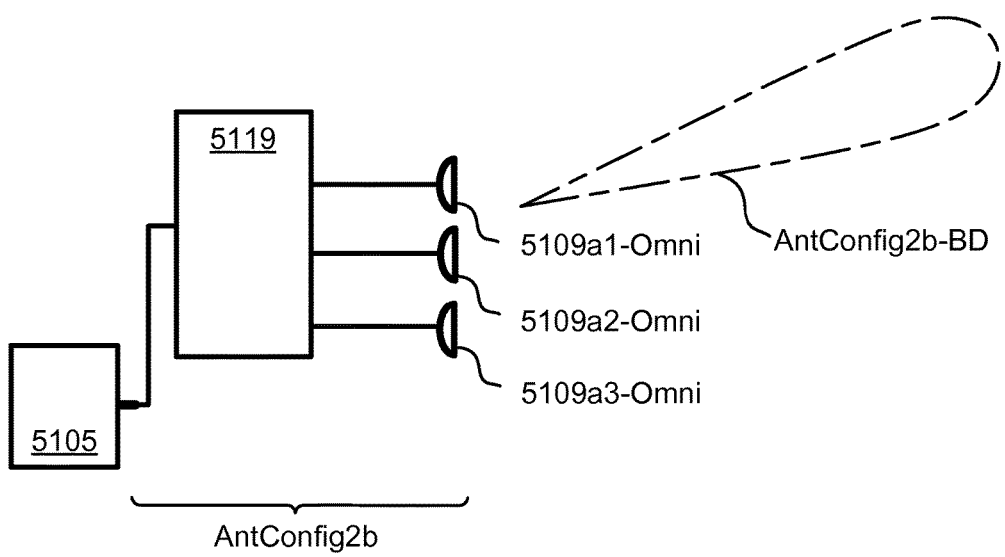
FIG. 26B illustrates one embodiment of a second antenna configuration comprising at least two omni-directional antennas.

FIG. 26B illustrates one embodiment of a second antenna configuration comprising at least two omni-directional antennas. Antennas 5109a1, 5109a2, 5109a3 may be respectively omni-directional antennas 5109a1-Omni, 5109a2-Omni, 5109a3-Omni, each having an omni-directional radiation pattern, but together resulting in a combined radiation pattern that is a directed radiation pattern AntConfig2b-BD, which results in a second antenna configuration AntConfig2b.

Figure 27:
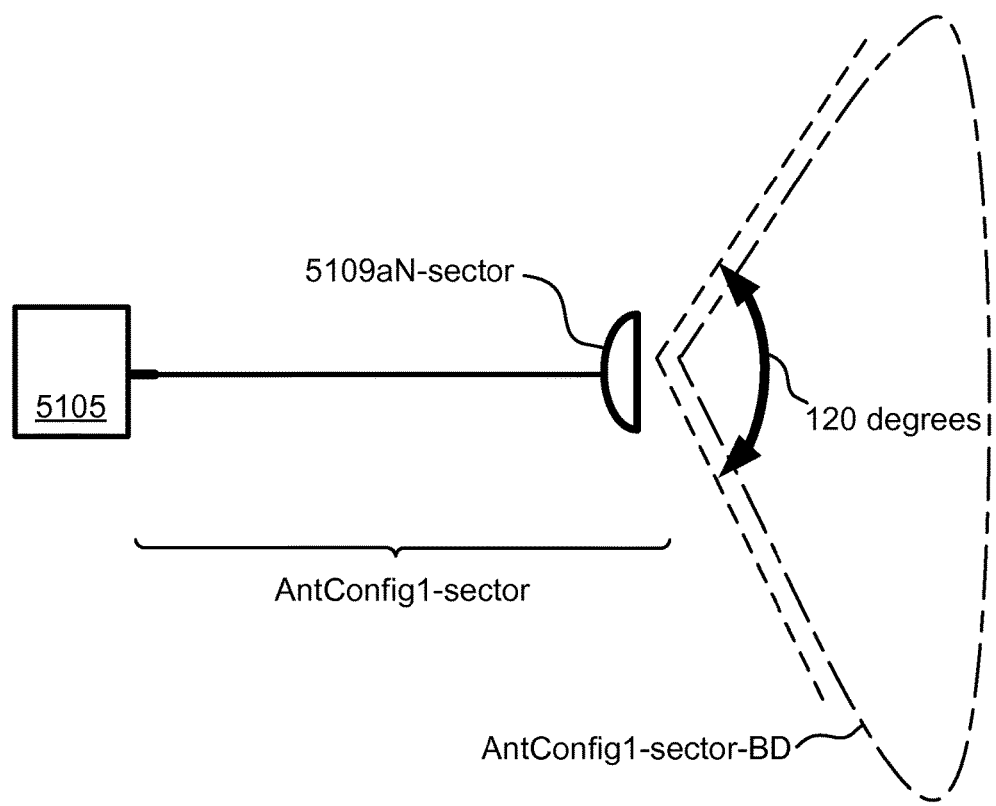
FIG. 27 illustrates one embodiment of a first antenna configuration which is a sector configuration.

FIG. 27 illustrates one embodiment of a first antenna configuration which is a sector configuration. Antenna 5109aN may be a sector antenna 5109aN-sector having a sector radiation pattern AntConfig1-sector-BD, which results in a first antenna configuration AntConfig1 that is a sector antenna configuration AntConfig1-sector. The sector radiation pattern AntConfig1-sector-BD may have 120 degrees coverage by way of example.

Figure 28A:
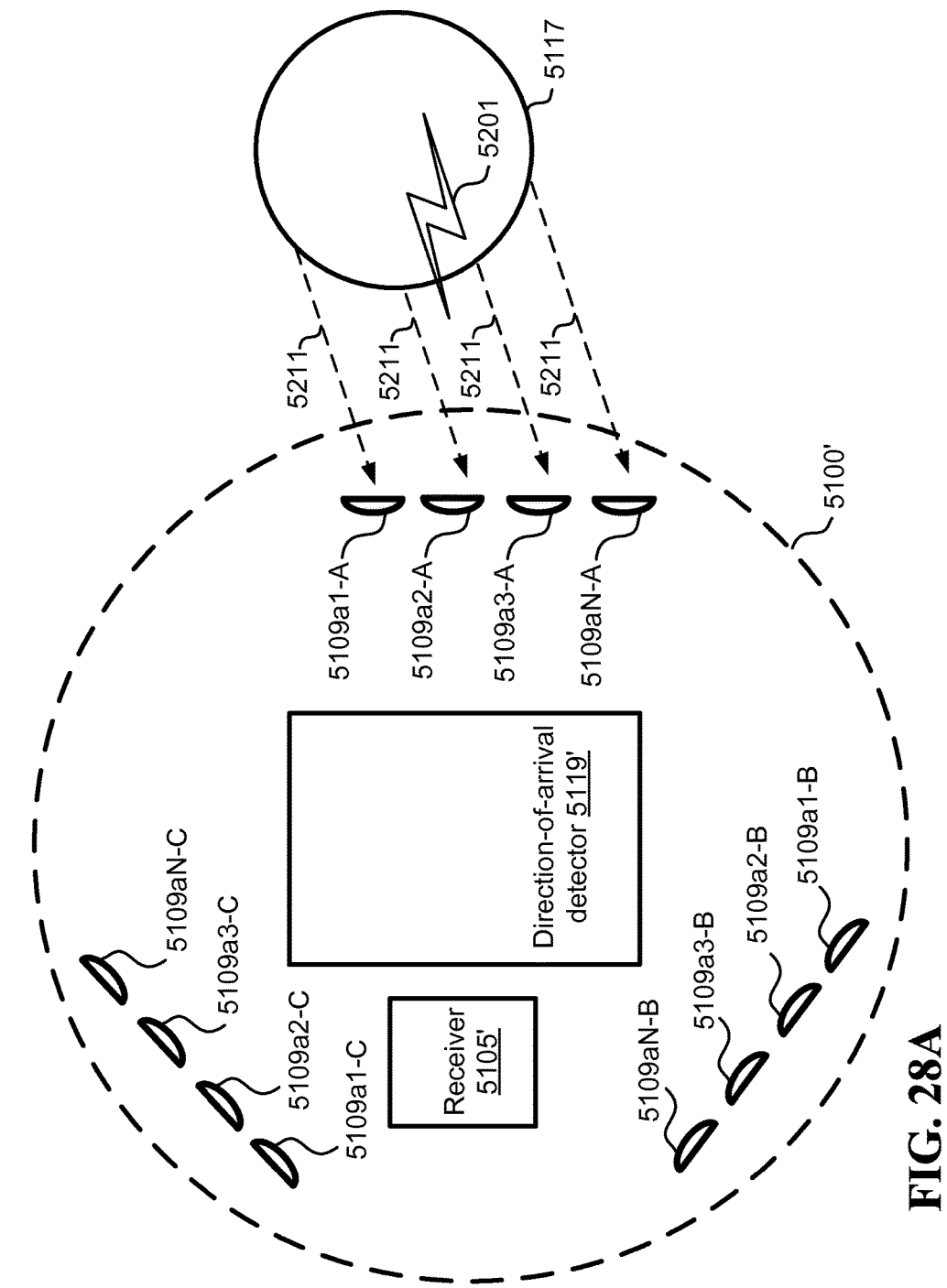
FIG. 28A illustrates one embodiment of a wireless communication system operative to process and detect iteratively an incoming wireless transmission.

FIG. 28A illustrates one embodiment of a wireless communication system operative to process and detect iteratively an incoming wireless transmission. Wireless communication system 5100' includes: (i) a direction-of-arrival detector 5119' operative to detect direction of arrival (bearing) 5211 of an incoming wireless transmission 5201, (ii) a receiver 5105' operative to process incoming wireless transmission 5201, and (iii) at least two sets of at least two antennas: 5109a1-A, 5109a2-A, 5109a3-A, 5109aN-A (first set), 5109a1-B, 5109a2-B, 5109a3-B, 5109aN-B (second set), 5109a1-C, 5109a2-, 5109a3-C, 5109aN-C (third set), operative to pick up the incoming wireless transmission. Each set of at least two antennas may be a sector antenna.

Figure 28B:
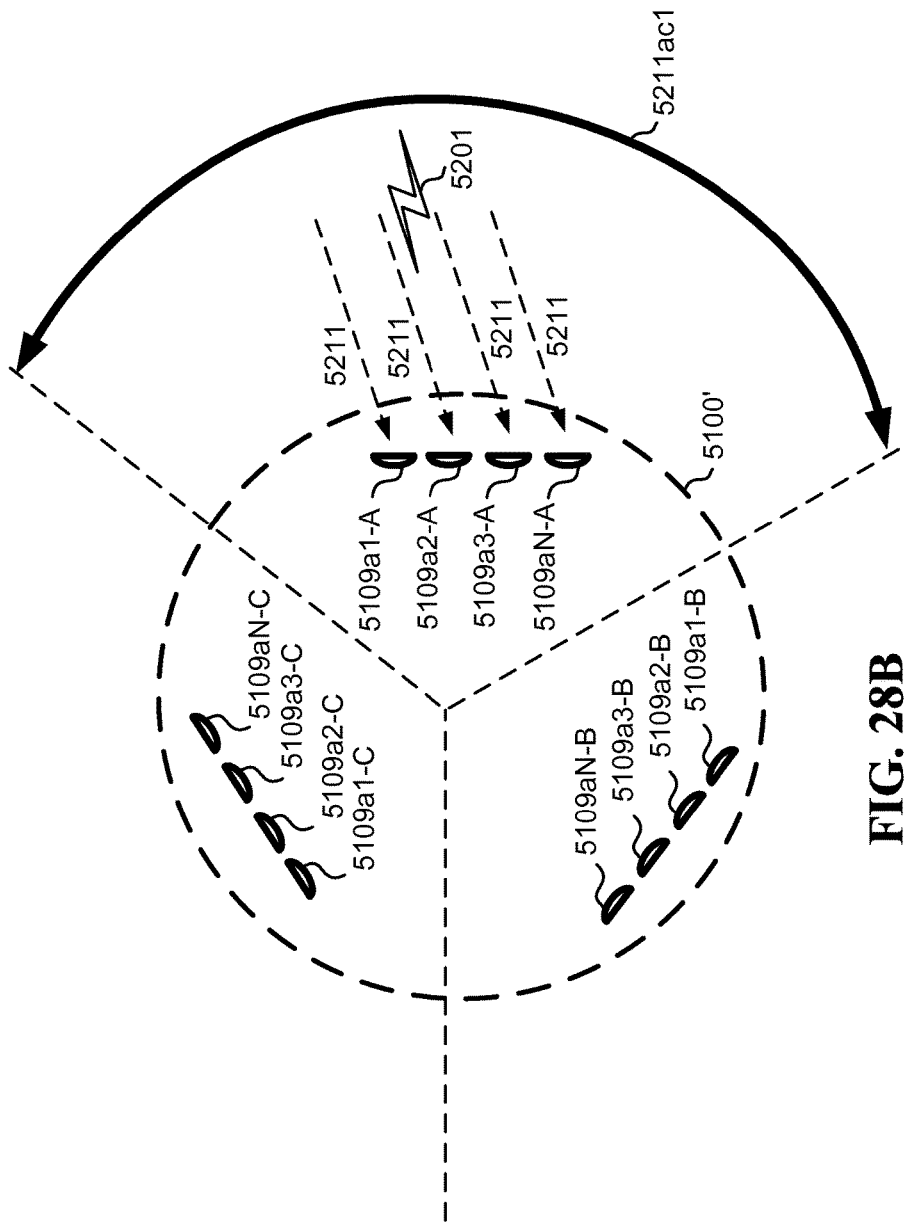
FIG. 28B illustrates one embodiment of a zero state of a wireless communication system, in which a direction of arrival of an incoming wireless communication is estimated.

FIG. 28B illustrates one embodiment of a zero state of a wireless communication system, in which a direction of arrival of an incoming wireless communication is estimated. Bearing 5211 of incoming wireless transmission 5201 is estimated in direction-of-arrival detector 5119' to within a first directional accuracy 5211ac1. The first directional accuracy 5211ac1 may be 120 degrees by way of example; if each of antennas 5109aN-A, 5109aN-B, 5109aN-C covers a different 120 degrees sector, then detection of signal surge in one of said antennas puts the estimate of the bearing to within the respective 120 degrees coverage of that antenna. Detection can also be based on calculating signal correlation, or using any other known techniques.

Figure 28C:
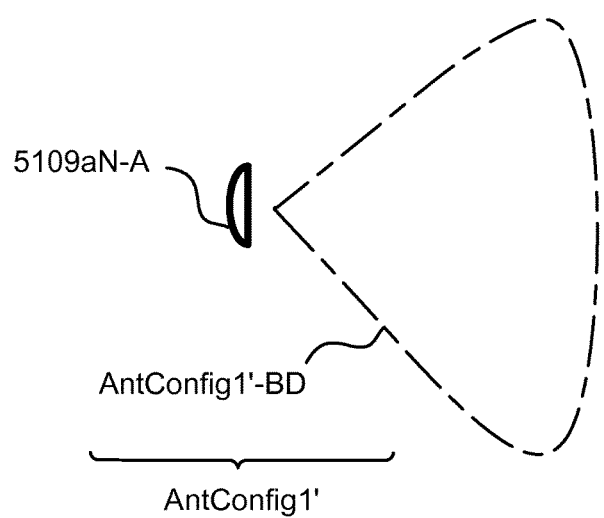
FIG. 28C illustrates one embodiment of a first state of a wireless communication system, in which a first portion of an incoming wireless transmission is processed.

FIG. 28C illustrates one embodiment of a first state of a wireless communication system, in which a first portion of an incoming wireless transmission is processed. A first antenna configuration AntConfig1', determined as a result of the previous estimation in the zero state, which includes by way of example antenna 5109aN-A, receives a first portion of an incoming wireless transmission 5201 arriving from a transmission source 5117 via direction 5211; this first portion is then delivered to receiver 5105' for processing. Antenna configuration AntConfig1' has a static radiation pattern associated with antenna 5109aN-A. Antennas 5109a1-A, 5109a2-A, 5109a3-A, in conjunction with direction-of-arrival detector 5119, may be used to improve estimation of bearing 5211 to within a second directional accuracy 5211ac2 (FIG. 28D), which is better than said first directional accuracy 5211ac1, concurrently with said processing, and without interfering with such processing or with the operation of first antenna configuration AntConfig1'.

Figure 28D:
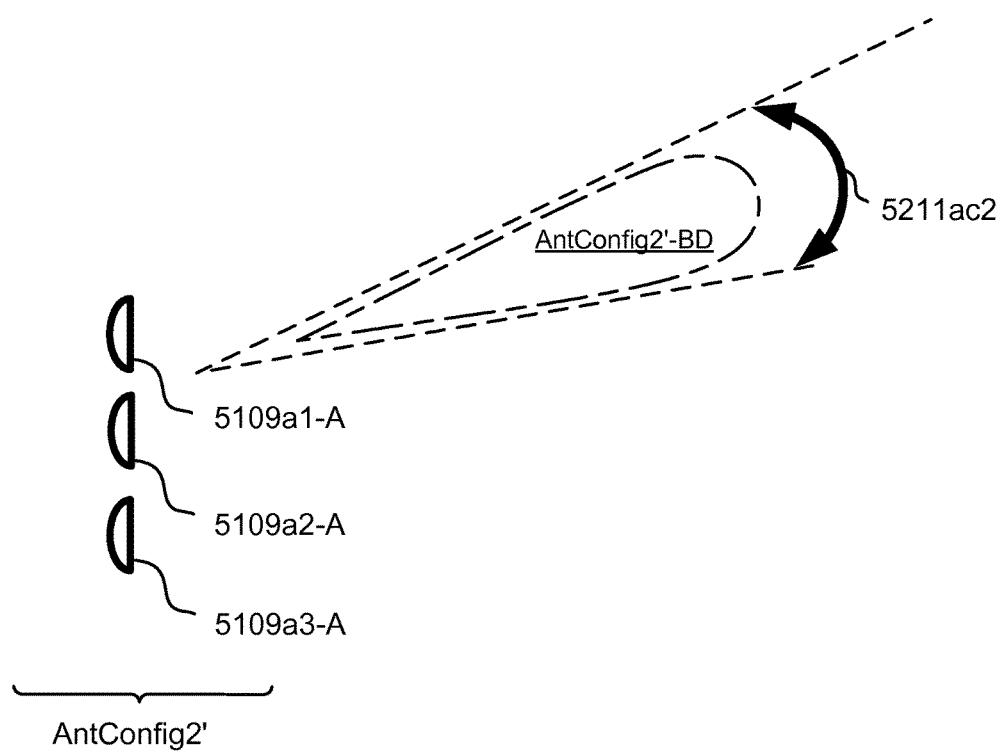
FIG. 28D illustrates one embodiment of a second state of a wireless communication system, in which a second portion of an incoming wireless transmission is processed.

FIG. 28D illustrates one embodiment of a second state of a wireless communication system, in which a second portion of an incoming wireless transmission is processed. A second antenna configuration AntConfig2', which includes by way of example antennas 5109a1-A, 5109a2-A, 5109a3-A, receives a second portion of the incoming wireless transmission 5201 arriving from transmission source 5117 via direction 5211; this second portion is then delivered to receiver 5105' for processing. Antenna configuration AntConfig2' has a directed radiation pattern AntConfig2'-BD associated with antennas 5109a1-A, 5109a2-A, 5109a3-A;

this directed radiation pattern is relatively narrow and high gain, and is based on previously improved estimated bearing 5211. A transition from the first state to the second state may be done by switching from the first antenna configuration AntConfig1' to the second antenna configuration AntConfig2'. Receiver 5105' is not necessarily aware of such a transition.

Figure 28E:
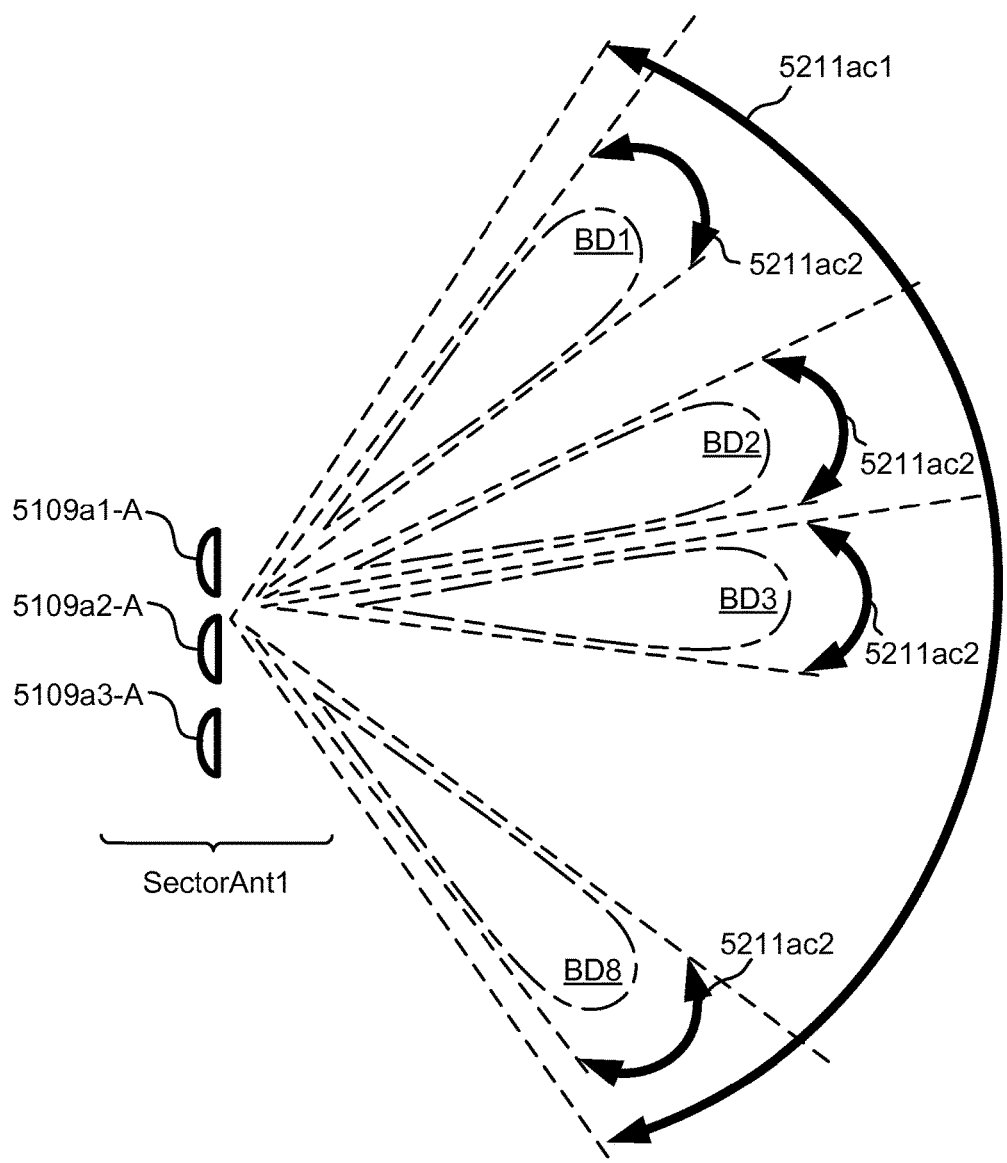
FIG. 28E illustrates one embodiment of improving direction-of-arrival estimate.

FIG. 28E illustrates one embodiment of improving direction-of-arrival estimate. Antennas 5109a1-A, 5109a2-A, 5109a3-A are arranged as a sector antenna SectorAnt1, which in conjunction with direction-of-arrival detector 5119 may be used to improve estimation of bearing 5211 to within a second directional accuracy 5211ac2, which is better than said first directional accuracy 5211ac1. Several beam directions BD1, BD2, BD3, BD8 can be synthesized using sector antenna SectorAnt1, each beam direction having a directional span which is related to the second directional accuracy 5211ac2. Second antenna configuration AntConfig2' may be related to one of said beam directions BD1, BD2, BD3, BD8, and may be a selection of one of said beam directions BD1, BD2, BD3, BD8 which happens to span bearing 5211.

Figure 29A:
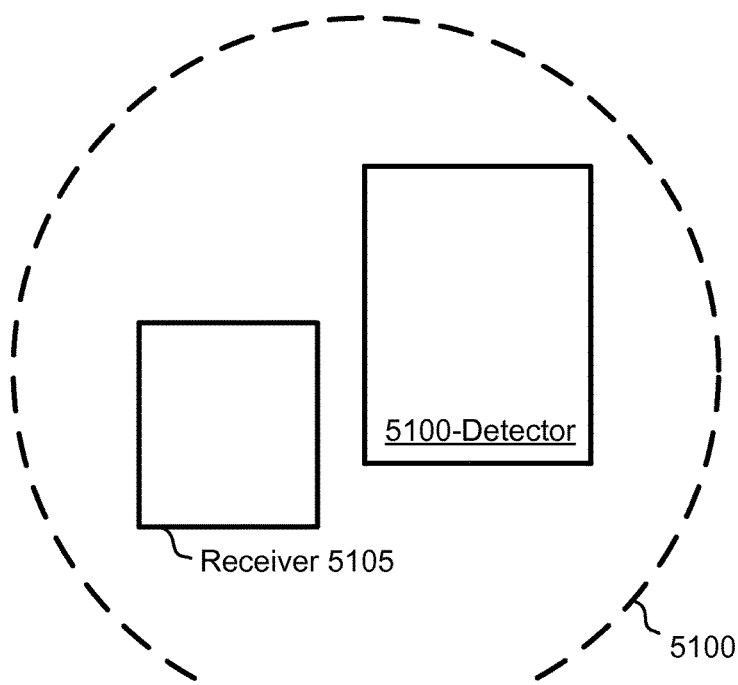
FIG. 29A illustrates one embodiment of a wireless communication system operative to process and detect iteratively an incoming wireless transmission.

FIG. 29A illustrates one embodiment of a wireless communication system operative to process and detect iteratively an incoming wireless transmission. Wireless communication system 5100 includes (i) a detector 5100-Detector operative to determine a parameter associated with an incoming wireless transmission, and (ii) a receiver 5105.

Figure 29B:
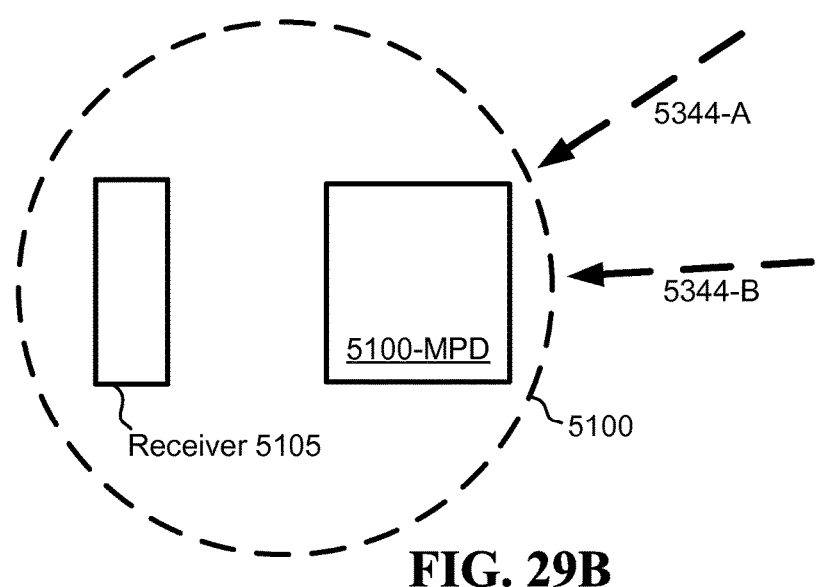
FIG. 29B illustrates one embodiment of a wireless communication system operative to process and detect iteratively an incoming wireless transmission.

FIG. 29B illustrates one embodiment of a wireless communication system operative to process and detect iteratively an incoming wireless transmission. Wireless communication system 5100 includes a multipath detector 5100-MPD and a receiver 5105.

Figure 29C:
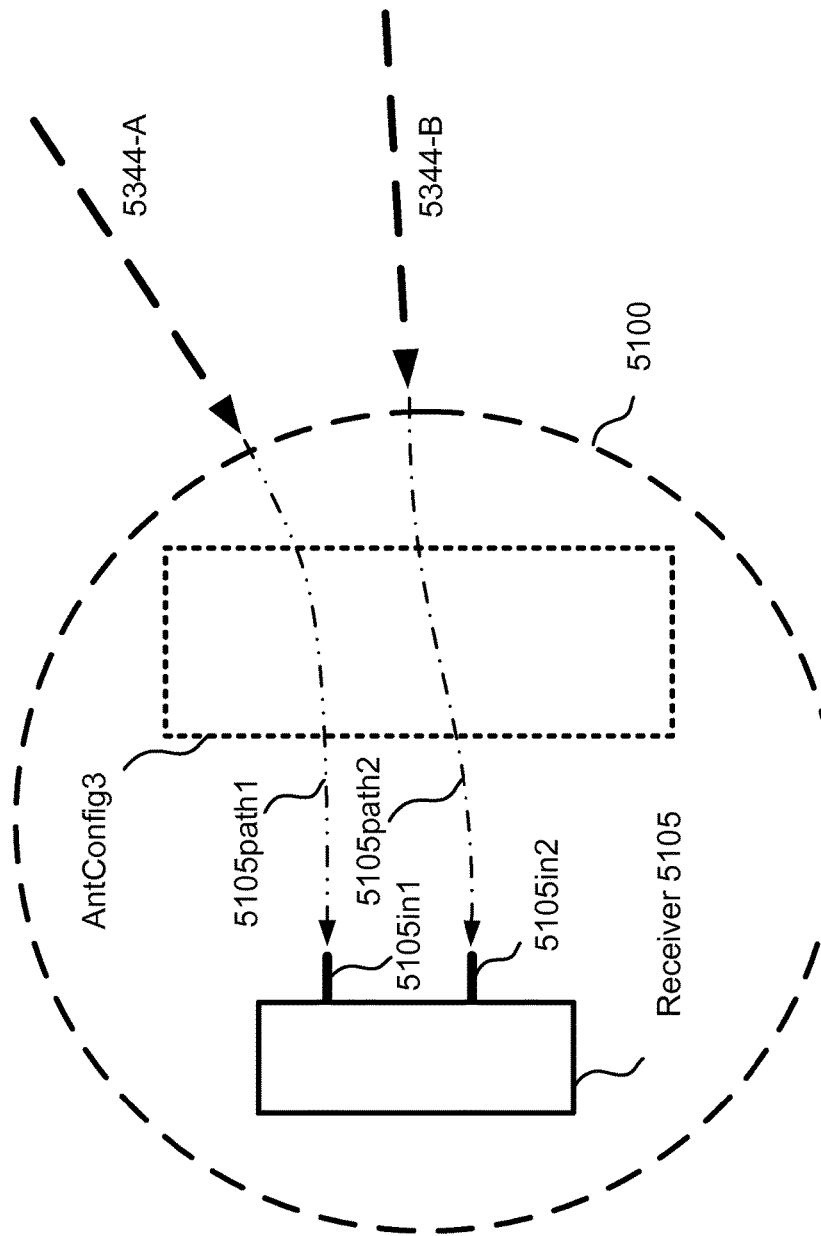
FIG. 29C illustrates one embodiment of receiving an incoming wireless transmission via multiple wireless paths.

FIG. 29C illustrates one embodiment of receiving an incoming wireless transmission via multiple wireless paths. A third antenna configuration AntConfig3 includes multiple reception paths 5105path1, 5105path2 associated respectively with multiple wireless paths 5344-A, 5344-B. Reception paths 5105path1, 5105path2 are associated respectively with reception inputs 5105in1, 5105in2 of receiver 5105.

Figure 29D:
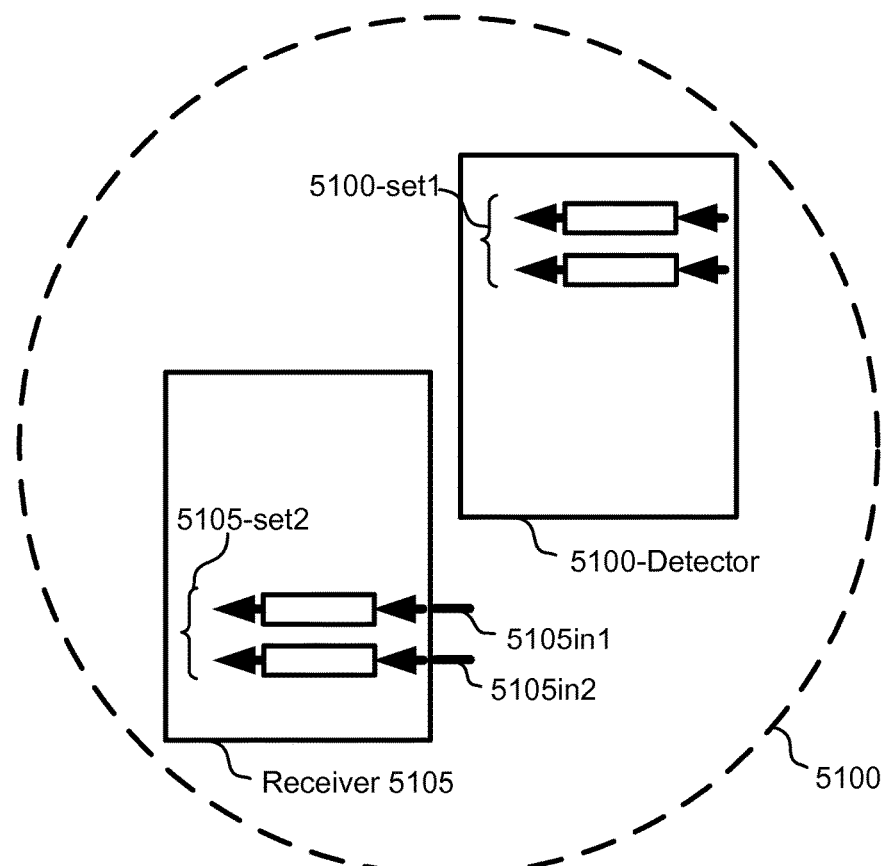
FIG. 29D illustrates one embodiment of sets of radio-frequency receiving chains operative to down-convert incoming wireless transmissions.

FIG. 29D illustrates one embodiment of sets of radio-frequency receiving chains operative to down-convert incoming wireless transmissions. A first set of radio-frequency receiving chains 5100-set1, belonging to detector 5100-Detector, facilitates determination a parameter associated with an incoming wireless transmission. A second set of radio-frequency receiving chains 5100-set2, belonging to receiver 5105, facilitates processing of an incoming wireless transmission.

Figure 29E:
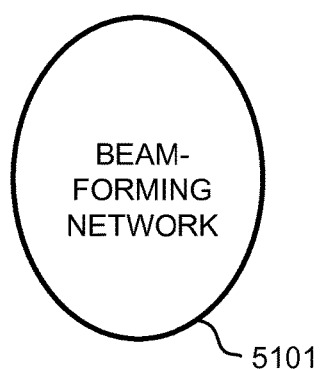
FIG. 29E illustrates one embodiment of a beamforming network operative to determine direction or arrival of an incoming wireless transmission.

FIG. 29E illustrates one embodiment of a beamforming network operative to determine direction or arrival of an incoming wireless transmission. Beamforming network 5101 may work in conjunction with the first set of radio-frequency receiving chains 5100-set1 to determine bearing 5211.

One embodiment for iterative direction-of-arrival detecting and processing of wireless signals includes: (i) processing, in a receiver 5105 of a wireless communication system 5100, a first portion 5201a of an incoming wireless transmission 5201 arriving 5201arr1 via a first antenna configuration AntConfig1, (ii) estimating, in a direction-of-arrival-detector 5119, direction of arrival 5211 of incoming wireless transmission 5201, and (iii) processing, by receiver 5105, a second portion 5201b of said incoming wireless transmission 5201 arriving 5201arr2 via a second antenna configuration AntConfig2 determined using results of said estimating step. In one embodiment, said estimation starts before said processing of first portion 5201a ends. In one embodiment, said processing of second portion 5201b starts after said processing of first portion 5201a ends. In one embodiment, said processing of second portion 5201b is a continuation of said processing of first portion 5201a, together resulting in decoding of incoming wireless transmission 5201.

In one embodiment, wireless communication system 5100 switches Switch1 between first and second antenna configurations AntConfig1, AntConfig2 prior to said processing of second portion 5201b. In one embodiment, direction-of-arrival-detector 5119 detects incoming wireless transmission 5201 using first antenna configuration AntConfig1 and prior to said processing of first portion 5201a. In one embodiment, said processing of first portion 5201a includes at least initiating an automatic-gain-control operation on incoming wireless transmission 5201. In one embodiment, said processing of first portion 5201a includes at least locking onto a preamble section belonging to incoming wireless transmission 5201. In one embodiment, said processing of first portion 5201a includes at least decoding a media-access-control header belonging to incoming wireless transmission 5201. In one embodiment, said processing of second portion 5201b includes at least decoding a media-access-control header belonging to incoming wireless transmission 5201. In one embodiment, said processing of second portion 5201b includes at least decoding a payload belonging to incoming wireless transmission 5201. In one embodiment, incoming wireless transmission 5201 is a wireless packet. In one embodiment, said wireless packet conforms to IEEE-802.11 wireless standard. In one embodiment, said: (i) processing of first portion 5201a, (ii) estimating, (iii) and processing of second portion 5201, are repeated for at least a second wireless packet.

In one embodiment, first antenna configuration AntConfig1 is omni-directional antenna configuration AntConfig1omni having a first antenna gain. In one embodiment, second antenna configuration AntConfig2b is not omni-directional, resulting in a second antenna gain that is higher than said first antenna gain. In one embodiment, first antenna configuration AntConfig1 is a sector antenna configuration AntConfig1-sector covering between 140 and 60 degrees (120 degrees coverage is illustrated by way of example) and having a first antenna gain; second antenna configuration AntConfig2 has an antenna gain that is higher than said first antenna gain.

One embodiment for iterative direction-of-arrival detection and processing of wireless signals includes: (i) estimating, in a direction-of-arrival detector 5119' of a wireless communication system 5100', a direction of arrival 5211 of an incoming wireless transmission 5201 so as to obtain a first direction-of-arrival estimate that is accurate to within a first directional accuracy 5211ac1, (ii) processing, in a receiver 5105' of wireless communication system 5100', a first portion 5201a of incoming wireless transmission 5201 arriving via a first antenna configuration AntConfig1' determined using results of said estimating step, (iii) improving, in direction-of-arrival detector 5119', said direction-of-arrival estimate so as to obtain a second direction-of-arrival estimate that is accurate to within a second directional accuracy 5211ac2 that is better than first directional accuracy 5211ac1, and (iv) processing, in receiver 5105', a second portion 5201b of incoming wireless transmission 5201 arriving via a second antenna configuration AntConfig2' determined using results of said improving step. In one embodiment, said improving starts before said pre-processing ends. In one embodiment, said processing of second portion 5201*b* starts after said processing of first portion 5201*a* ends. In one embodiment, said processing of second portion 5201*b* is a continuation of said processing of first portion 5201*a*, together resulting in decoding of incoming wireless transmission 5201.

In one embodiment, wireless communication system 5100' switches Switch1 between first and second antenna configurations AntConfig1', AntConfig2' prior to said processing of second portion 5201*b*. In one embodiment, said processing of first portion 5201*a* includes at least initiating an automatic-gain-control operation on incoming wireless transmission 5201. In one embodiment, said processing of first portion 5201*a* includes at least locking onto a preamble section belonging to incoming wireless transmission 5201. In one embodiment, said processing of first portion 5201*a* includes at least decoding a media-access-control header belonging to incoming wireless transmission 5201. In one embodiment, said processing of second portion 5201*b* includes at least decoding a media-access-control header belonging to incoming wireless transmission 5201. In one embodiment, said processing of second portion 5201*b* includes at least decoding a payload belonging to incoming wireless transmission 5201. In one embodiment, incoming wireless transmission 5201 is a wireless packet. In one embodiment, said wireless packet conforms to IEEE-802.11 wireless standard. In one embodiment, said: (i) estimating, (ii) processing of first portion 5201*a*, (iii) improving, and (iv) processing of second portion 5201, are repeated for at least a second wireless packet.

In one embodiment, first directional accuracy 5211ac1 is between 140 degrees and 60 degrees (120 degrees, which is one third of 360 degrees, is illustrated by way of example). In one embodiment, said estimating is done out of 360 degrees of possible directions of arrival. In one embodiment, said 360 degrees are covered by three antenna sectors, each antenna sector covering different 120 degrees out of said 360 degrees, and wherein first antenna configuration AntConfig1' is one of said antenna sectors determined using results of said estimating phase. In one embodiment, second directional accuracy 5211ac2 is between 30 and 7.5 degrees. In one embodiment, said improving is done out of 120 degrees of possible directions of arrival covered by a single sector antenna SectorAnt1. In one embodiment, single sector antenna SectorAnt1 includes a plurality of antennas 5109*a*1-A, 5109*a*2-A, 5109*a*3-A, together covering said 120 degrees via between 4 to 16 different beam directions BD1, BD2, BD3, BD8 respectively covering between 30 and 7.5 degrees, and second antenna configuration AntConfig2' is associated with one of said beam directions. In one embodiment, second antenna configuration AntConfig2' has a higher gain than first antenna configuration AntConfig1', thereby allowing for improved processing of incoming wireless transmission 5201.

One embodiment is a wireless communication system operative to iteratively detect and process wireless signals. Wireless communication system 5100 includes: (i) a receiver 5105 operative to process a first portion 5201*a* of an incoming wireless transmission 5201 during a first time interval 5201-T1 of said incoming wireless transmission, and (ii) a detector 5100-Detector operative to determine at least a first parameter associated with incoming wireless transmission 5201 during first time interval 5201-T1, concurrently with said processing of first portion 5201*a*, wherein wireless communication system 5100 is operative to change at least one factor affecting receiver 5105, based on said at least first parameter determined, thereby better conditioning receiver 5105 to process a second portion 5201*b* of incoming wireless transmission 5201 during a second time interval 5201-T2 following first time interval 5201-T1. In one embodiment, detector 5100-Detector is a direction-of-arrival-detector 5119, and said first parameter is a direction of arrival (bearing) 5211 of incoming wireless transmission 5201. In one embodiment, said change is a switch Switch1 from a first antenna configuration AntConfig1 to a second antenna configuration AntConfig2 determined using direction of arrival 5211 and having a higher gain than said first antenna configuration, thereby better conditioning receiver 5105 to process further incoming wireless transmission 5201. In one embodiment, detector 5100-Detector is a multipath detector 5100-MPD, operative to detect multiple wireless paths 5344-A, 5344-B (two paths are illustrated by way of example) via which incoming wireless transmission 5201 arrives, and said first parameter includes said multiple wireless paths. In one embodiment, said change is a switch to a third antenna configuration AntConfig3 determined using multiple wireless paths 5344-A, 5344-B detected, and said third antenna configuration includes a distinct reception path 5105path1, 5105path2 per each of said multiple wireless paths 5344-A, 5344-B, each reception path associated with a respective reception input 5105in1, 5105in2 of receiver 5105.

In one embodiment, detector 5100-Detector includes a first set 5100-set1 of at least one radio-frequency receiving chain operative to down-convert incoming wireless transmission 5201, and said down-conversion facilitates said determination of said first parameter. In one embodiment, receiver 5105 includes a second set 5105-set2 of at least one radio-frequency receiving chain operative to down-convert incoming wireless transmission 5201, and said down-conversion facilitates said processing of first portion 5201*a*. In one embodiment, first set 5100-set1 is separate from second set 5105-set2. In one embodiment, first and second sets 5100-set1, 5105-set2 operate concurrently. In one embodiment, first set 5100-set1 includes at least two radio-frequency receiving chains each operative to down-convert incoming wireless transmission 5201. In one embodiment, said at least two radio-frequency receiving chains belonging to first set 5100-set1 work in conjunction with a beamforming network 5101, wherein said first parameter is a direction of arrival 5211 of incoming wireless transmission 5201 and is determined using said beamforming network.

In one embodiment, first time interval 5201-T1 is less than two microseconds, thereby allowing said processing of said second portion to quickly benefit form said change. In one embodiment, said processing of second portion 5201*b* includes at least decoding a media-access-control header belonging to incoming wireless transmission 5201. In one embodiment, said processing of second portion 5201*b* includes at least decoding a payload belonging to incoming wireless transmission 5201. In one embodiment, first time interval 5201-T1 is at least 200 nanoseconds, thereby allowing said processing of first portion 5201*a* to facilitate reception of incoming wireless transmission 5201. In one embodiment, said processing of first portion 5201*a* includes at least initiating an automatic-gain-control operation on incoming wireless transmission 5201. In one embodiment, said processing of first portion 5201*a* includes at least detecting incoming wireless transmission 5201.

Figure 30:
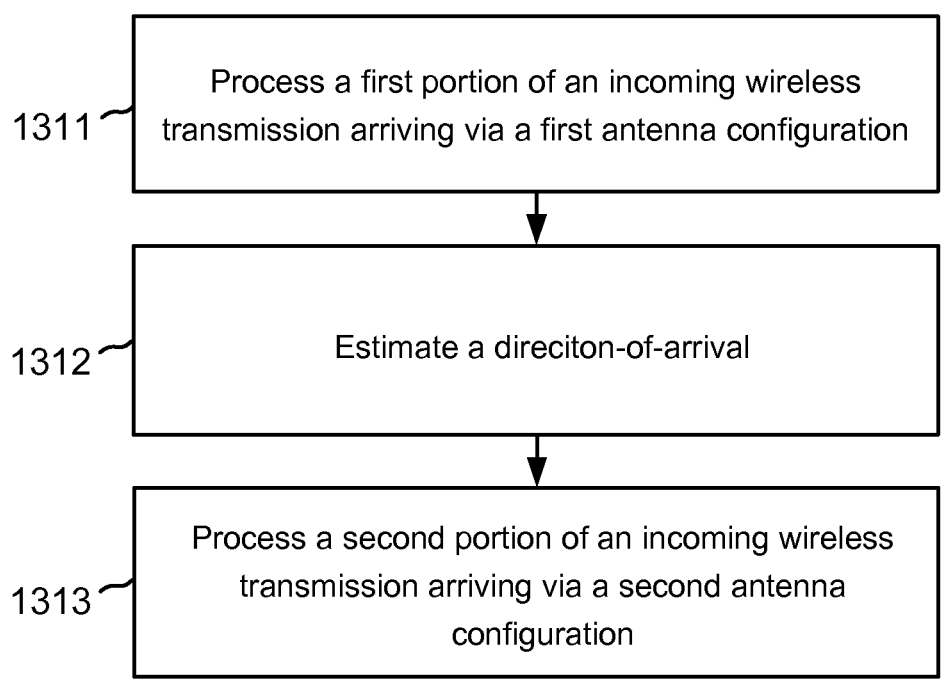
FIG. 30 illustrates one embodiment of a method for iterative direction-of-arrival detecting and processing of wireless signals.

FIG. 30 illustrates one embodiment of a method for iterative direction-of-arrival detecting and processing of wireless signals. In step 1311: processing, in a receiver 5105 of a wireless communication system 5100, a first portion 5201*a* of an incoming wireless transmission 5201 arriving 5201arr1 via a first antenna configuration AntConfig1. In step 1312: estimating, in a direction-of-arrival-detector 5119, direction of arrival 5211 of incoming wireless transmission 5201. In step 1313: processing, by receiver 5105, a second portion 5201b of said incoming wireless transmission 5201 arriving 5201arr2 via a second antenna configuration AntConfig2 determined using results of said estimating step.

Figure 31:
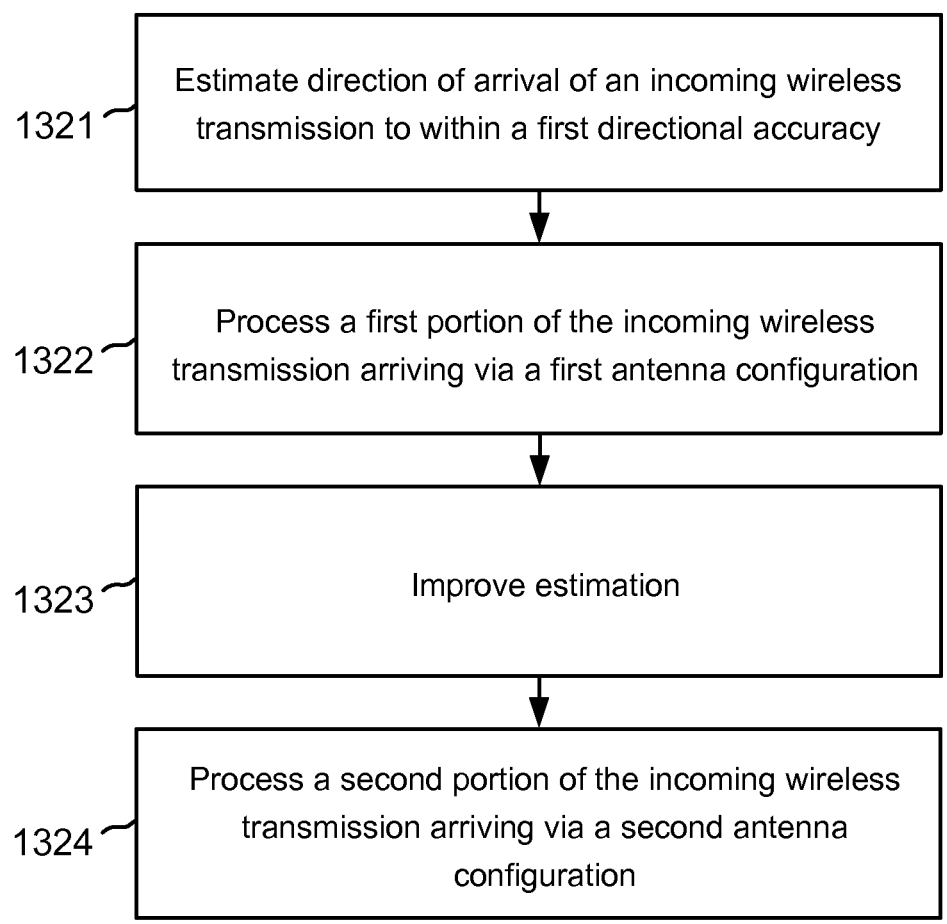
FIG. 31 illustrates one embodiment of a method for iterative direction-of-arrival detecting and processing of wireless signals.

FIG. 31 illustrates one embodiment of a method for iterative direction-of-arrival detecting and processing of wireless signals. In step 1321: estimating, in a direction-of-arrival detector 5119' of a wireless communication system 5100', a direction of arrival 5211 of an incoming wireless transmission 5201 so as to obtain a first direction-of-arrival estimate that is accurate to within a first directional accuracy 5211ac1. In step 1322: processing, in a receiver 5105' of wireless communication system 5100', a first portion 5201a of incoming wireless transmission 5201 arriving via a first antenna configuration AntConfig1' determined using results of said estimating step. In step 1323: improving, in direction-of-arrival detector 5119', said direction-of-arrival estimate so as to obtain a second direction-of-arrival estimate that is accurate to within a second directional accuracy 5211ac2 that is better than first directional accuracy 5211ac1. In step 1324: processing, in receiver 5105', a second portion 5201b of incoming wireless transmission 5201 arriving via a second antenna configuration AntConfig2' determined using results of said improving step.

Figure 32A:
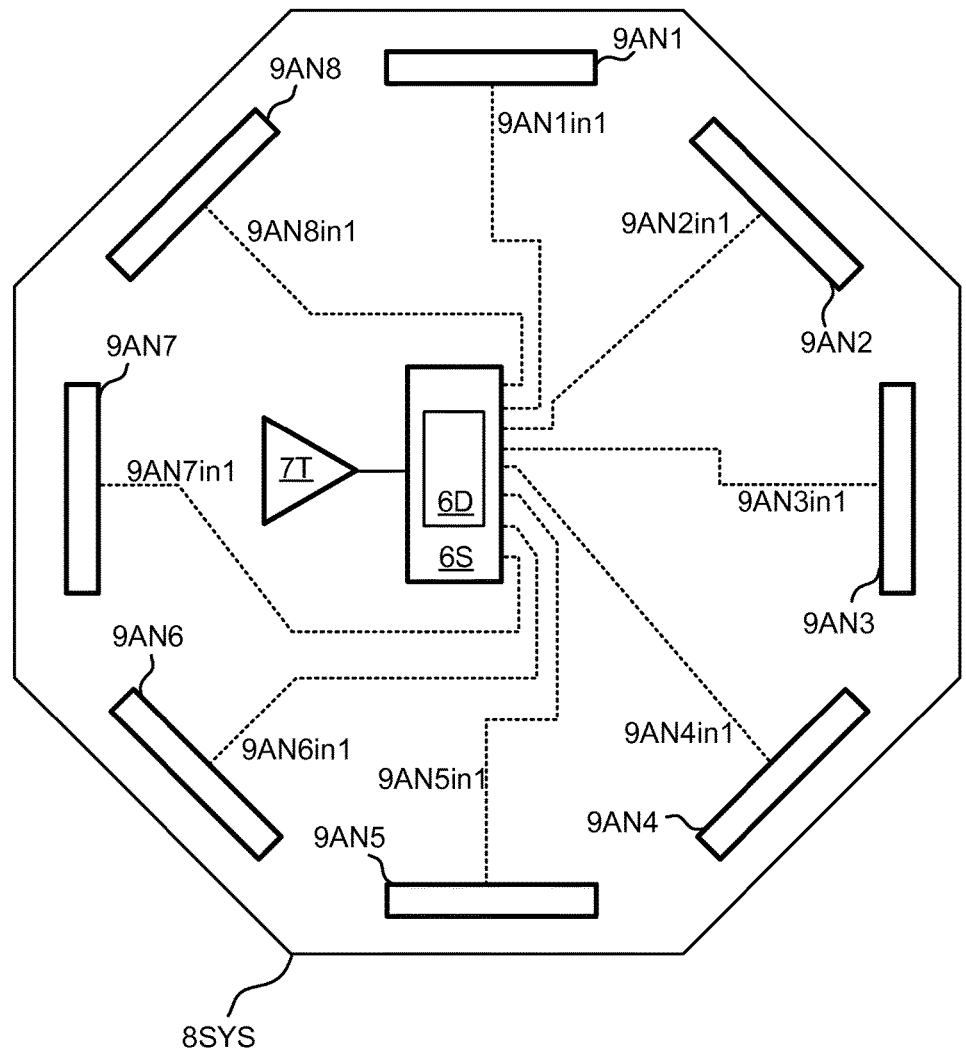
FIG. 32A illustrates one embodiment of a wireless communication system operative to cover a large angular span using combinations of directional antennas.

FIG. 32A illustrates one embodiment of a wireless communication system 8SYS operative to cover a large angular span using combinations of directional antennas; eight (8) directional antennas 9AN1-9AN8 are shown by way of example, but other antenna configurations are also possible, such as configurations including three or four directional antennas. A first radio-frequency transmitter 7T may be connected to at least some of the directional antennas 9AN1-9AN8 via a configurable radio-frequency switching fabric 6S, which includes a bank 6D of radio-frequency delay components. Directional antennas 9AN1-9AN8 are connected to configurable radio-frequency switching fabric 6S via first-polarity inputs 9AN1in1-9AN8in1 respectively.

Figure 32B:
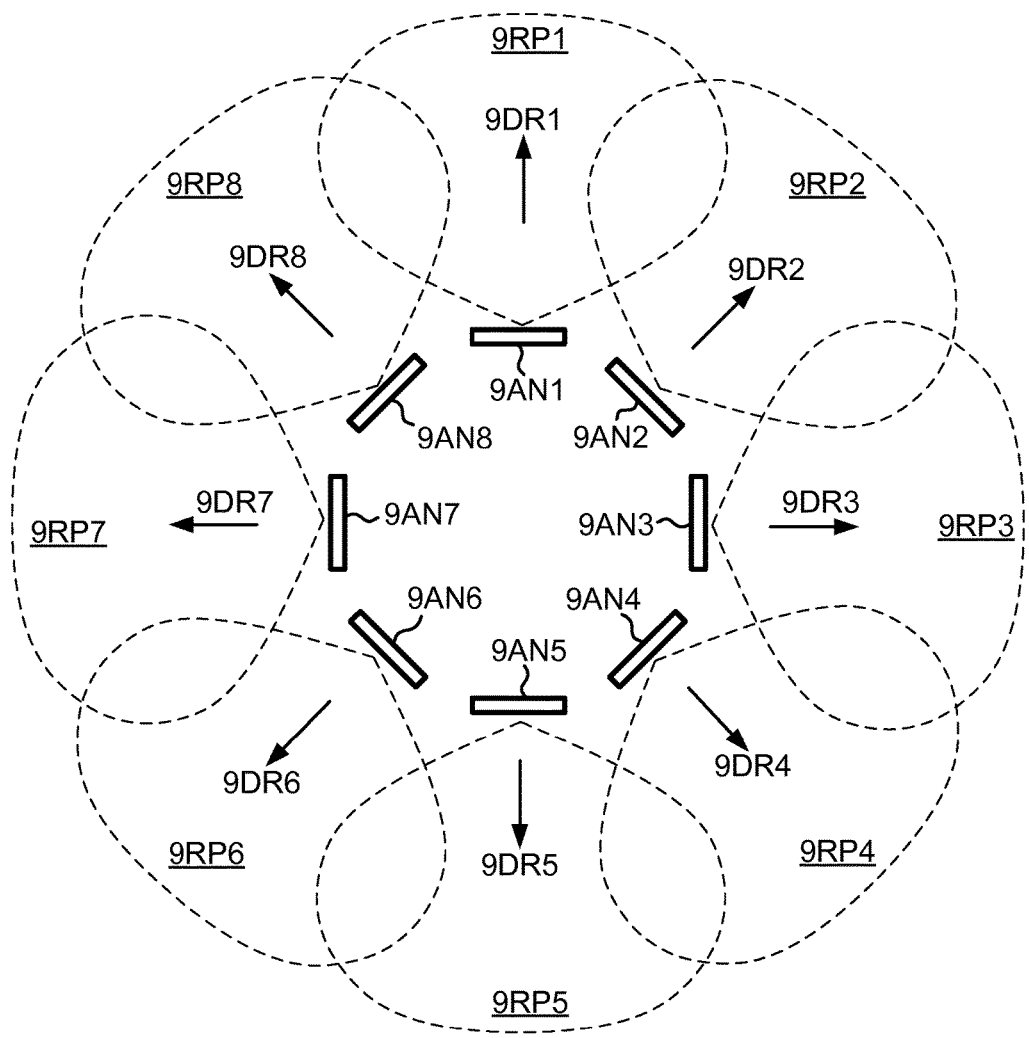
FIG. 32B illustrates one embodiment of directional antennas and associated radiation patterns.

FIG. 32B illustrates one embodiment of directional antennas and associated radiation patterns. The associated radiation patterns describe angular electromagnetic coverage of the directional antennas. Radiation patterns 9RP1-9RP8 are respectively associated with directional antennas 9AN1-9AN8, such that each radiation pattern at least partially overlaps in angular coverage with at least one adjacent radiation pattern. As an example, radiation pattern 9RP1 partially overlaps to the right with radiation pattern 9RP2, and partially overlaps to the left with radiation pattern 9RP8. Radiation patterns 9RP1-9RP8 point to directions 9DR1-9DR8 respectively, wherein a pointing direction of a radiation pattern may refer to a direction toward which a center peak of the radiation pattern occurs, or an average of all directions covered by the radiation pattern. Although each radiation pattern at least partially overlaps in angular coverage with at least one adjacent radiation pattern, it is noted that each radiation pattern may point to a unique direction, thereby achieving a large angular span. Directional antennas 9AN1-9AN8 produce a full 360 degrees angular coverage by way of example. In one embodiment, each of pointing directions 9DR1-9DR8 is unique, and is offset by at least 35 degrees from any of the other pointing directions, thereby making each of said radiation patterns 9RP1-9RP8 point to a substantially different direction than the other radiation patterns. According to one non-limiting example, each of the eight (8) radiation patterns 9RP1-9RP8 points to a direction that is offset by 45 degrees from a direction toward which an adjacent radiation pattern points. In one embodiment, radiation patterns 9RP1-9RP8 have respectively center peaks directed respectively toward directions 9DR1-9DR8. In one embodiment, all of said center peaks are within two (2) decibels (dB) of each other. According to one non-limiting example, each center peak is nine (9) dBmi.

Figure 33A:
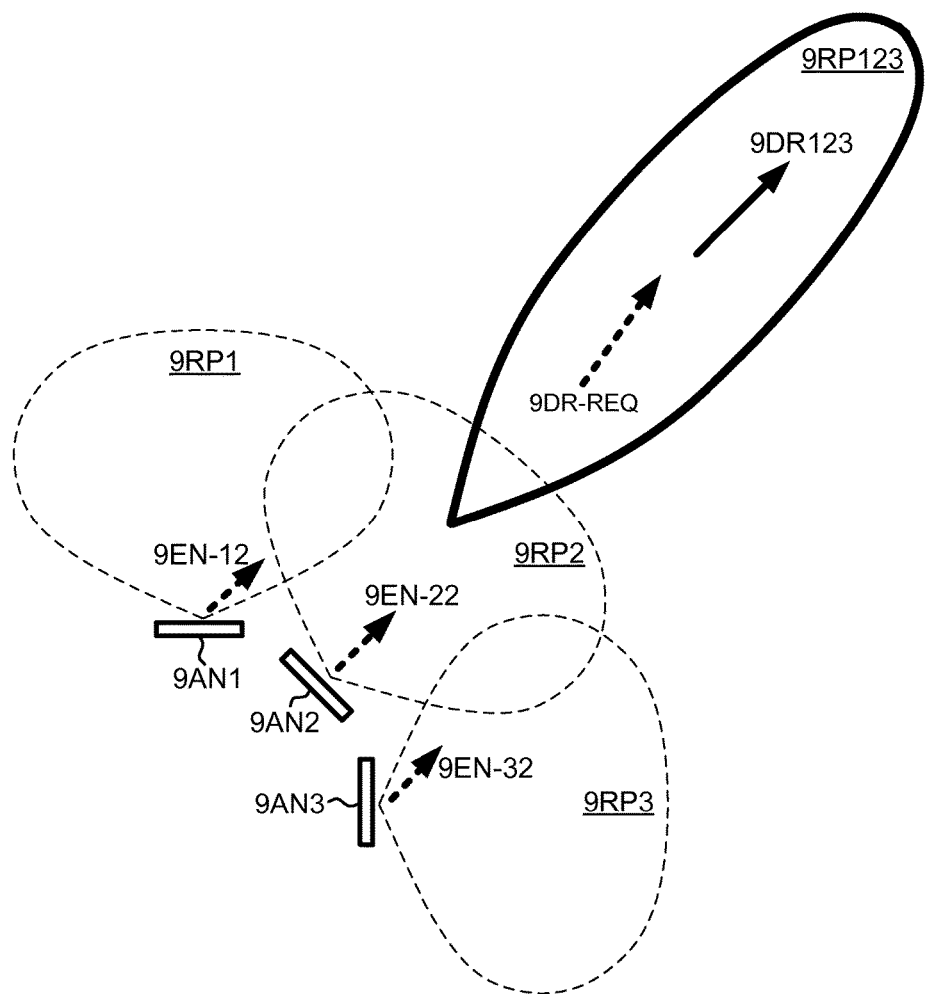
FIG. 33A illustrates one embodiment of selecting three successive directional antennas and associated radiation patterns.

FIG. 33A illustrates one embodiment of selecting three successive directional antennas and associated radiation patterns. Three successive, and optionally adjacent, directional antennas 9AN1, 9AN2, 9AN3 are shown to be selected by way of example. A specific selection of successive directional antennas is made in order to synthesize an enhanced transmission radiation pattern in a specific direction, such as direction 9DR123 toward which enhanced transmission radiation pattern 9RP123 is pointing. Enhanced transmission radiation pattern 9RP123 is synthesized toward direction 9DR123 by combining the three radiation patterns 9RP1, 9RP2, 9RP3 of directional antennas 9AN1, 9AN2, 9AN3 respectively. It is possible to combine three radiation patterns 9RP1, 9RP2, 9RP3 into enhanced transmission radiation pattern 9RP123 pointing to direction 9DR123, since radiation patterns 9RP1, 9RP2, 9RP3 respectively contain energy components 9EN-12, 9EN-22, 9EN-32 toward direction 9DR123. Directional antenna 9AN4, as an example, cannot participate in synthesis of enhanced transmission radiation pattern 9RP123, since radiation pattern 9RP4 associated with directional antenna 9AN4 does not span direction 9DR123 and therefore does not contain energy components toward direction 9DR123. A requirement to synthesize an enhanced transmission radiation pattern toward a direction 9DR-REQ may be presented; in such a case, the sequence of directional antennas 9AN1, 9AN2, 9AN3 and associated radiation patterns 9RP1, 9RP2, 9RP3 may be selected in order to produce enhanced transmission radiation pattern 9RP123 spanning direction 9DR-REQ required. Other direction requirements may result in a different sequences of directional antennas and associated radiation patterns, which happen to produce enhanced transmission radiation patterns toward directions associated with the other requirements. In one embodiment, each of energy components 9EN-12 and 9EN-32 is weaker than energy component 9EN-22 by no more than four (4) decibels (dB), thereby making said overlap of radiation patterns a substantial overlap of radiation patterns, and thereby allowing each of radiation patterns 9RP1, 9RP2, 9RP3 to substantially contribute to said enhanced transmission radiation pattern 9RP123. According to one non-limiting example, energy component 9EN-22 is nine (9) dBmi, while each of energy components 9EN-12 and 9EN-32 is six (6) dBmi. In one embodiment, enhanced transmission radiation pattern 9RP123 has a peak that is at least three (3) decibels (dB) above a peak of radiation pattern 9RP2. According to one non-limiting example, enhanced transmission radiation pattern 9RP123 has a peak of thirteen (13) dBmi, while radiation pattern 9RP2 has a peak of nine (9) dBmi. In one embodiment the peak of radiation pattern 9RP2 is aligned with direction 9DR123 of enhanced transmission radiation pattern 9RP123, and therefore energy component 9EN-22 and the peak of radiation pattern 9RP2 are also aligned and have the same value. In one embodiment, said overlap is a substantial overlap, while each of said radiation patterns 9RP1-9RP8 point to a substantially different direction than the other radiation patterns.

Figure 33B:
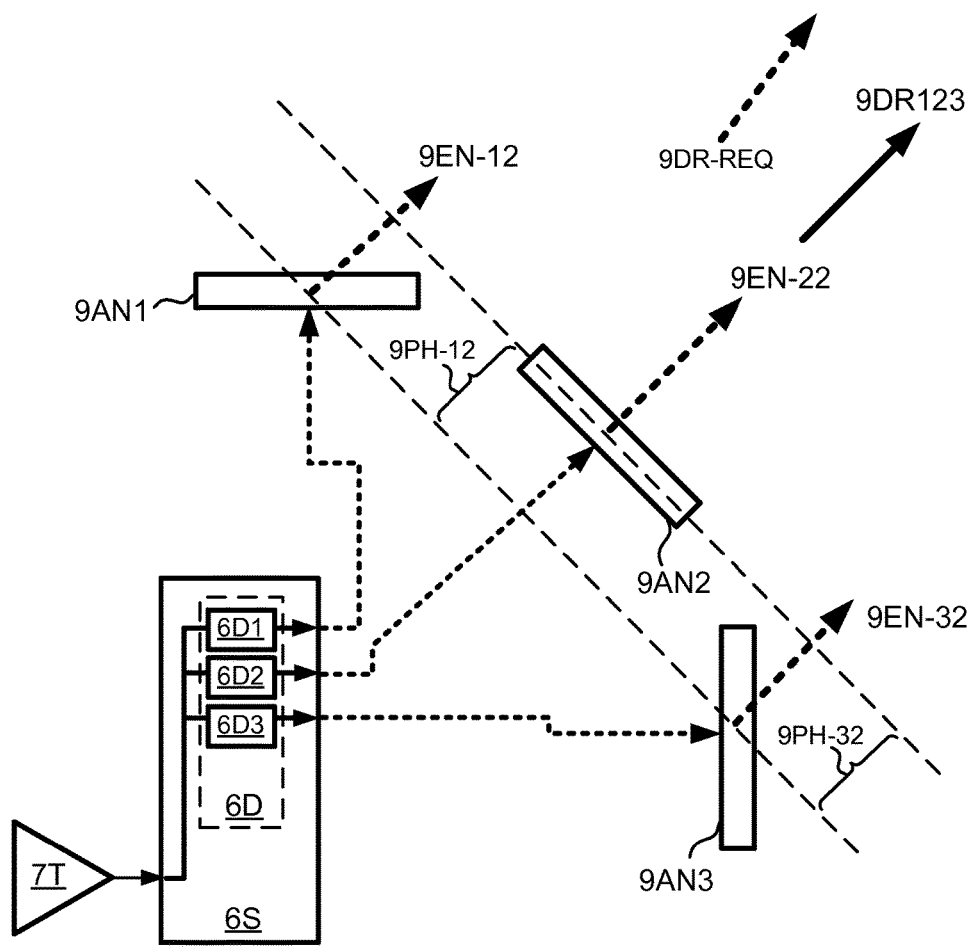
FIG. 33B illustrates one embodiment of radio frequency delay components operative to produce coherent radiation pattern in conjunction with directional antennas.

FIG. 33B illustrates one embodiment of radio frequency delay components operative to produce coherent radiation pattern in conjunction with directional antennas. Directional antennas 9AN1, 9AN2, 9AN3 respectively radiate energy components 9EN-12, 9EN-22, 9EN-32 toward direction 9DR123, thereby facilitating creation of enhanced transmission radiation pattern 9RP123 (FIG. 33A). However, in order to effectively create enhanced transmission radiation pattern 9RP123, all energy components 9EN-12, 9EN-22, 9EN-32 must be combined coherently—meaning in-phase. Any coherent combination of energy components 9EN-12, 9EN-22, 9EN-32 must take into consideration different propagation distances; as can be seen: (i) energy component 9EN-12 has to travel a larger distance than energy component 9EN-22, since the position of antennas 9AN1 and 9AN2 results in a path difference 9PH-12, and (ii) energy component 9EN-32 has to travel a larger distance than energy component 9EN-22, since the position of antennas 9AN3 and 9AN2 results in a path difference 9PH-32. The function of radio frequency delay components 6D1, 6D2, 6D3 is to compensate at least for path differences 9PH-12 and 9PH-32, but also for other differences in delay that may occur between first radio-frequency transmitter 7T and directional antennas 9AN1, 9AN2, 9AN3. Radio frequency delay components 6D1, 6D2, 6D3 may be selected and switched dynamically to directional antennas 9AN1, 9AN2, 9AN3 by configurable radio-frequency switching fabric 6S. It is noted that directional antennas 9AN1, 9AN2, 9AN3 are not statically switched to radio frequency delay components 6D1, 6D2, 6D3, since other sequences of other directional antennas may require different association of delay components with directional antennas, such as in a case of a two-antenna sequence shown in FIG. 34A and FIG. 34B.

Figure 34A:
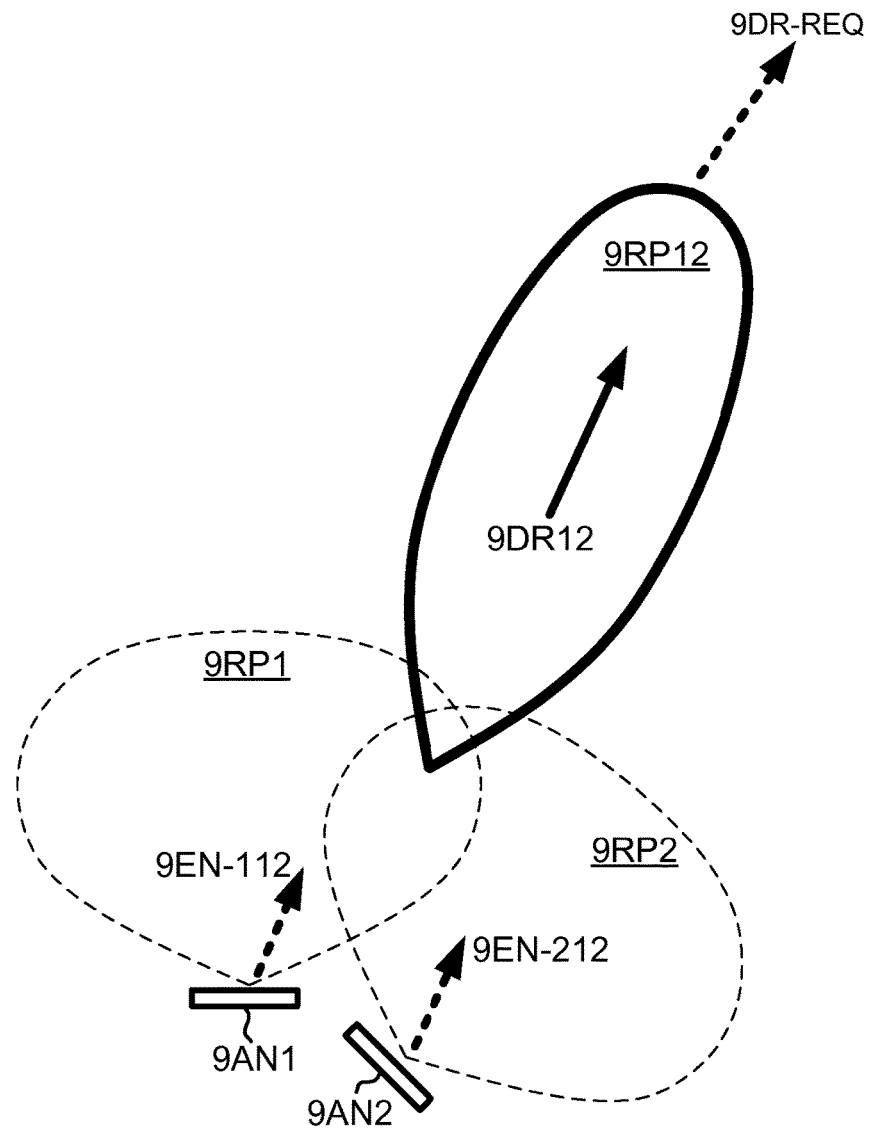
FIG. 34A illustrates one embodiment of selecting two successive directional antennas and associated radiation patterns.

FIG. 34A illustrates one embodiment of selecting two successive directional antennas and associated radiation patterns. Two successive directional antennas 9AN1, 9AN2 are shown to be selected by way of example. A specific selection of directional antennas is made in order to synthesize an enhanced transmission radiation pattern in a specific direction, such as direction 9DR12 toward which enhanced transmission radiation pattern 9RP12 is pointing. Enhanced transmission radiation pattern 9RP12 is synthesized toward direction 9DR12 by combining the two radiation patterns 9RP1, 9RP2 of directional antennas 9AN1, 9AN2 respectively. It is possible to combine two radiation patterns 9RP1, 9RP2 into enhanced transmission radiation pattern 9RP12 pointing to direction 9DR12, since radiation patterns 9RP1, 9RP2 respectively contain energy components 9EN-112, 9EN-212 toward direction 9DR12. Directional antenna 9AN4, as an example, cannot participate in synthesis of enhanced transmission radiation pattern 9RP12, since radiation pattern 9RP4 associated with directional antenna 9AN4 does not span direction 9DR12 and therefore does not contain energy components toward direction 9DR12. A requirement to synthesize an enhanced transmission radiation pattern toward a direction 9DR-REQ may be presented; in such a case, directional antennas 9AN1, 9AN2 and associated radiation patterns 9RP1, 9RP2 may be selected in order to produce enhanced transmission radiation pattern 9RP12 spanning direction 9DR-REQ required. Other direction requirements may result in different sequences of directional antennas and associated radiation patterns, which happen to produce enhanced transmission radiation patterns toward directions associated with the other requirements.

Figure 34B:
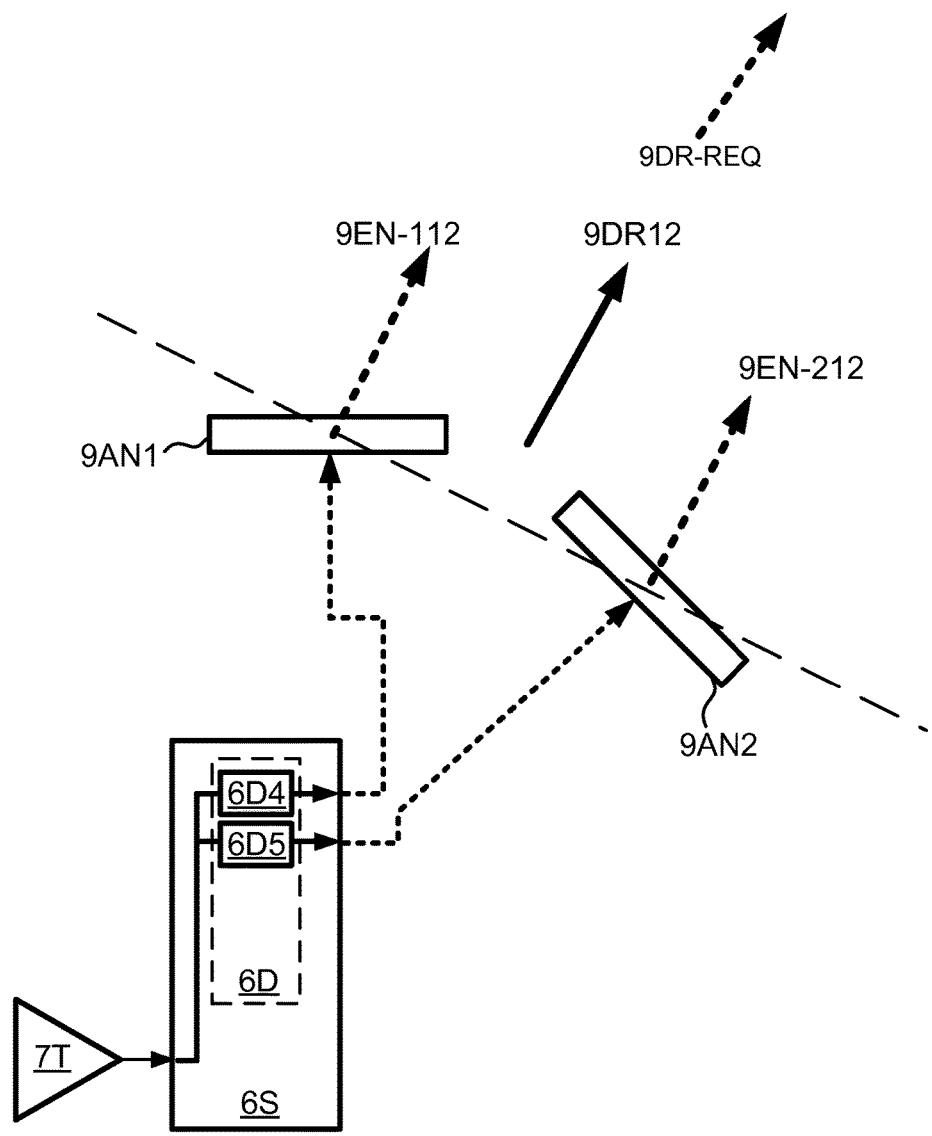
FIG. 34B illustrates one embodiment of radio frequency delay components operative to produce coherent radiation pattern in conjunction with directional antennas.

FIG. 34B illustrates one embodiment of radio frequency delay components operative to produce coherent radiation patterns in conjunction with directional antennas. Directional antennas 9AN1, 9AN2 respectively radiate energy components 9EN-112, 9EN-212 toward direction 9DR12, thereby facilitating creation of enhanced transmission radiation pattern 9RP12 (FIG. 34A). However, in order to effectively create enhanced transmission radiation pattern 9RP12, all energy components 9EN-112, 9EN-212 must be combined coherently—meaning in-phase. Any coherent combination of energy components 9EN-112, 9EN-212 must take into consideration different propagation distances; since as can be seen, energy component 9EN-112 has to travel essentially the same distance as energy component 9EN-212, there is no path difference between the two. Therefore, the function of radio frequency delay components 6D4, 6D5 is to compensate for other differences in delay that may occur between first radio-frequency transmitter 7T and directional antennas 9AN1, 9AN2. Radio frequency delay components 6D4, 6D5 may be selected and switched dynamically to directional antennas 9AN1, 9AN2 by configurable radio-frequency switching fabric 6S. It is noted that directional antennas 9AN1, 9AN2 are not statically switched to radio frequency delay components 6D4, 6D5, since other sequences of directional antennas may require different association of delay components with directional antennas, such as in a case of a three-antenna sequence shown in FIG. 33A and FIG. 33B. As an example, directional antenna 9AN1 at one time may be switched to first radio-frequency transmitter 7T via radio-frequency delay component 6D4 in conjunction with generating enhanced transmission radiation pattern 9RP12 (FIG. 34A, FIG. 34B), but at another time may be switched to first radio-frequency transmitter 7T via radio-frequency delay component 6D1 in conjunction with generating enhanced transmission radiation pattern 9RP123 (FIG. 33A, FIG. 33B).

Figure 35A:
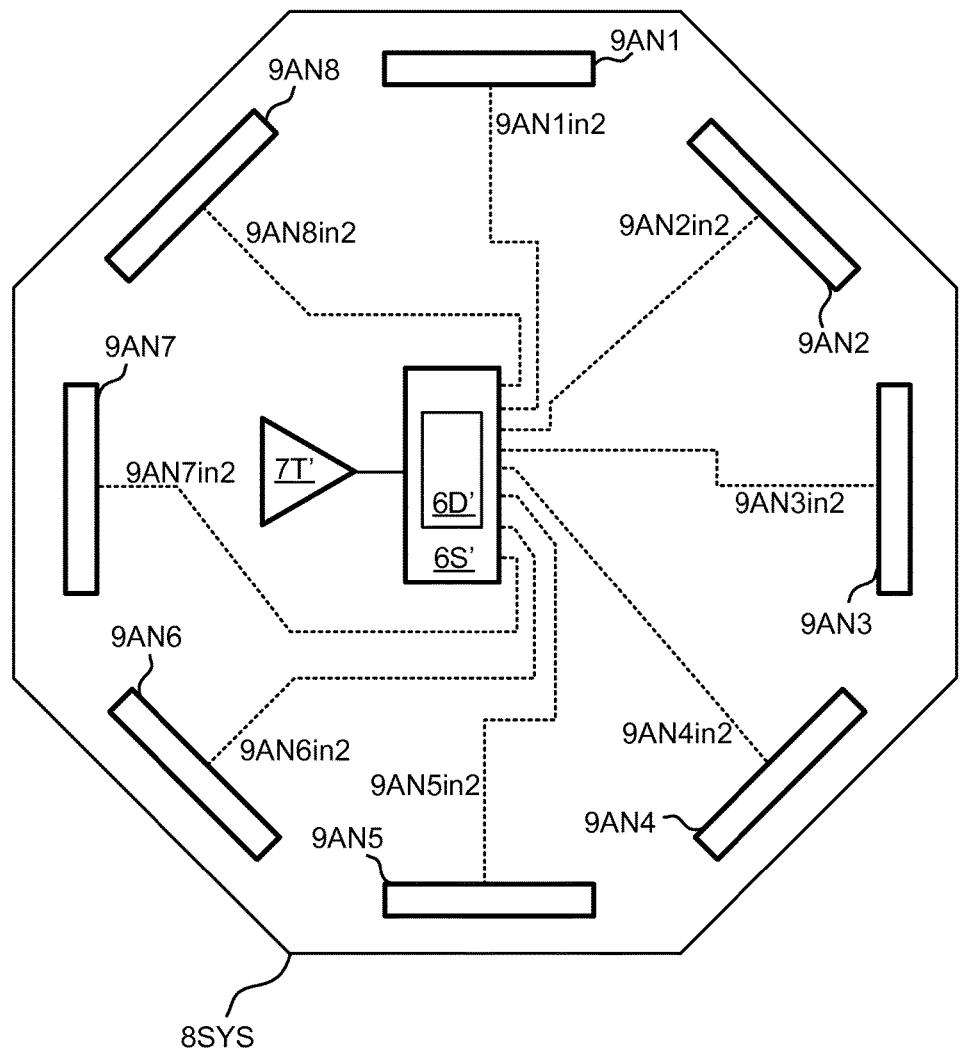
FIG. 35A illustrates one embodiment of a wireless communication system operative to cover a large angular span using combinations of directional antennas.

FIG. 35A illustrates one embodiment of a wireless communication system operative to cover a large angular span using combinations of directional antennas. A second radio-frequency transmitter 7T' may be connected to at least some of directional antennas 9AN1-9AN8 via a second configurable radio-frequency switching fabric 6S', which includes a second bank 6D' of radio-frequency delay components. Directional antennas 9AN1-9AN8 may be connected to the second configurable radio-frequency switching fabric 6S' via second-polarity inputs 9AN1in2-9AN8in2 respectively. It is noted that directional antennas 9AN1-9AN8 may have both first polarity inputs 9AN1in1-9AN8in1 respectively and second polarity inputs 9AN1in2-9AN8in2 respectively, and in that case can be referred to as crossed-polarized directional antennas 9AN1-9AN8.

Figure 35B:
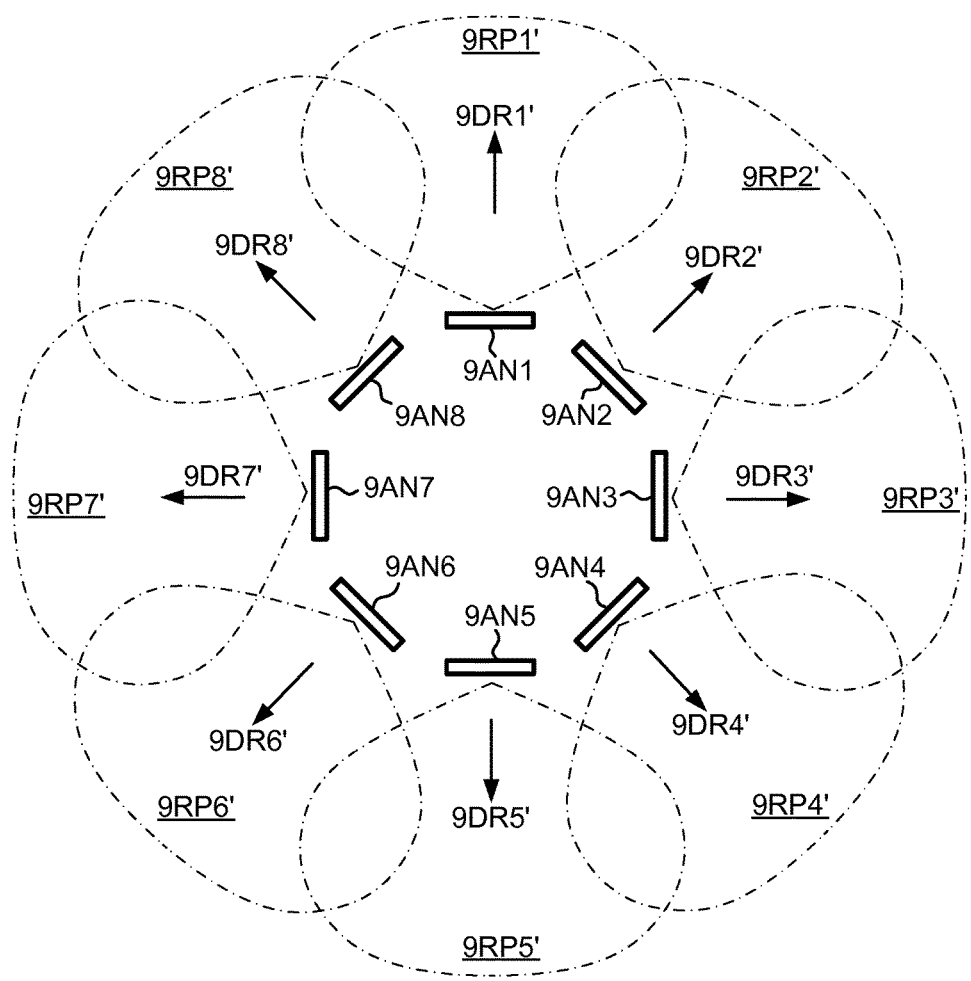
FIG. 35B illustrates one embodiment of directional antennas and associated radiation patterns having a second polarity.

FIG. 35B illustrates one embodiment of directional antennas and associated radiation patterns having a second polarity. Radiation patterns 9RP1'-9RP8' are respectively associated with directional antennas 9AN1-9AN8, such that each radiation pattern at least partially overlaps in angular coverage with at least one adjacent radiation pattern. As an example, radiation pattern 9RP1' partially overlaps to the right with radiation pattern 9RP2', and partially overlaps to the left with radiation pattern 9RP8'. Radiation patterns 9RP1'-9RP8' point to directions 9DR1'-9DR8' respectively, wherein a pointing direction of a radiation pattern may refer to a direction toward which a center peak of the radiation pattern occurs, or an average of all directions covered by the radiation pattern. Although each radiation pattern at least partially overlaps in angular coverage with at least one adjacent radiation pattern, it is noted that each radiation pattern may point to a unique direction, thereby achieving a large angular span. Directional antennas 9AN1-9AN8 produce a full 360 degrees angular coverage by way of example.

In one embodiment, radiation patterns 9RP1'-9RP8' may have a second polarity when associated with signals produced by second radio-frequency transmitter 7T' and delivered to directional antennas 9AN1-9AN8 via second-polarity inputs 9AN1in2-9AN8in2 respectively. In one embodiment, radiation patterns 9RP1-9RP8 may have a first polarity when associated with signals produced by first radio-frequency transmitter 7T and delivered to directional antennas 9AN1-9AN8 via first-polarity inputs 9AN1in1-9AN8in1 respectively. In one embodiment, radiation patterns 9RP1'-9RP8' may have a second polarity that is orthogonal to a first polarity of radiation patterns 9RP1-9RP8.

Figure 35C:
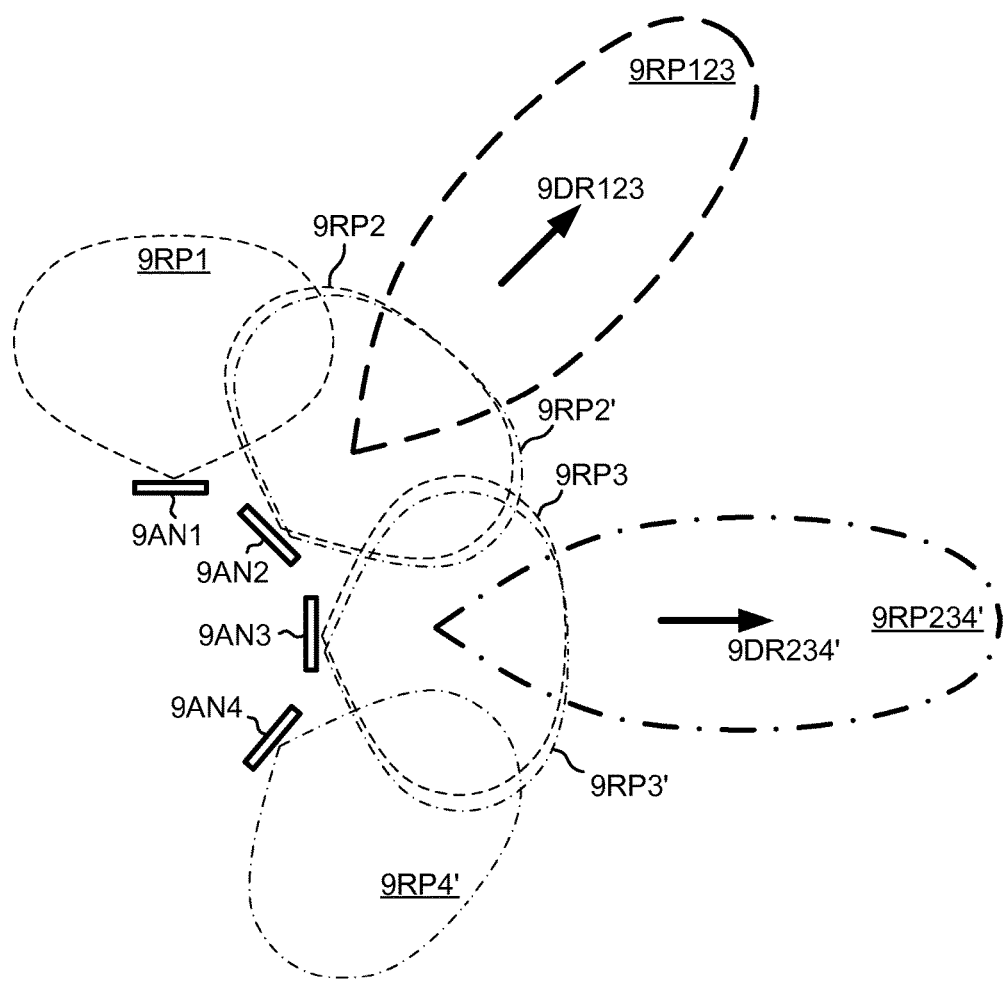
FIG. 35C illustrates one embodiment of two sequences of directional antennas, comprising three directional antennas per sequence, and associated radiation patterns having different polarities.

FIG. 35C illustrates one embodiment of two sequences of three directional antennas per sequence, and associated radiation patterns having different polarities. A first sequence of directional antennas includes by way of example directional antennas 9AN1, 9AN2, 9AN3 associated respectively with first-polarity radiation patterns 9RP1, 9RP2, 9RP3 produced using a signal generated by first radio-frequency transmitter 7T and conveyed to directional antennas 9AN1, 9AN2, 9AN3 via first-polarity inputs 9AN1in1, 9AN2in1, 9AN3in1 respectively. A second sequence of directional antennas includes by way of example directional antennas 9AN2, 9AN3, 9AN4 associated respectively with second-polarity radiation patterns 9RP2', 9RP3', 9RP4' produced using a signal generated by second radio-frequency transmitter 7T' and conveyed to directional antennas 9AN2, 9AN3, 9AN4 via second-polarity inputs 9AN2in2, 9AN3in2, 9AN4in2 respectively. It is noted that in the above example of sequences of directional antennas, directional antennas 9AN2, 9AN3 are common to both the first and the second sequences, and therefore generate both first polarity and second polarity radiation patterns concurrently. The combination of radiation patterns 9RP1, 9RP2, 9RP3 produces enhanced transmission radiation pattern 9RP123 toward direction 9DR123 and having a first polarity, while the combination of radiation patterns 9RP2', 9RP3', 9RP4' produces enhanced transmission radiation pattern 9RP234' toward direction 9DR234' and having a second polarity. Other sequences of directional antennas may be possible, such that: (i) all directional antennas participating in both sequences are unique, (ii) some directional antennas participating in both sequences are common to both sequences, or (iii) all directional antennas participating in both sequences are common to both sequences. More than two sequences of selected directional antennas may be possible, in which case additional radio-frequency transmitters are needed other than 7T, 7T'.

One embodiment is a wireless communication system 8SYS operative to cover a large angular span using combinations of directional antennas, comprising: a plurality of directional antennas 9AN1-9AN8 each having an associated radiation pattern 9RP1-9RP8 respectively, placed side-by-side forming a sequence of directional antennas covering a large angular span, such that each of said associated radiation patterns 9RP1-9RP8 points to a direction 9DR1-9DR8 respectively that is unique and offset relative to the other associated radiation patterns, and wherein said associated radiation patterns partially overlap; a first radio-frequency transmitter 7T operative to output a first radio-frequency signal; and a configurable radio-frequency switching fabric 6S operative to split and direct said first radio-frequency signal into combinations of said directional antennas; wherein the wireless communication system is operative to: (i) select, out of the plurality of directional antennas, any sequence of at least two successive ones of said directional antennas, and (ii) split and direct said first radio-frequency signal into said at least two directional antennas selected, thereby (iii) generate an enhanced transmission radiation pattern having an enhanced gain and directed in a direction covered mutually by said at least two directional antennas and radiation patterns thereof.

In one embodiment, said sequence of at least two of said directional antennas is a sequence of a first, second, and third directional antennas 9AN1, 9AN2, 9AN3 of said plurality of directional antennas, wherein all three radiation patterns 9RD1, 9RD2, 9RD3 associated with said first, second, and third directional antennas 9AN1, 9AN2, 9AN3 have a substantial energy component 9EN-12, 9EN-22, 9EN-32 directed toward said direction 9DR123 of said enhanced transmission radiation pattern 9RP123 as a result of said radiation patterns 9RD1, 9RD2, 9RD3 partially overlap, thereby allowing all three radiation patterns 9RD1, 9RD2, 9RD3 to contribute to said enhanced gain. It is noted that antennas 9AN1, 9AN2, 9AN3 are presented by way of example as one possible sequence of a first, second, and third directional antennas selected, but many other sequences are possible, such as: 9AN2+9AN3+9AN4, 9AN3+9AN4+9AN5, 9AN4+9AN5+9AN6, 9AN5+9AN6+9AN7, 9AN6+9AN7+9AN8, 9AN7+9AN8+9AN1, and 9AN8+9AN1+9AN2.

In one embodiment, the wireless communication system further comprises: a first radio-frequency delay component 6D1 operative to compensate for path differences 9PH-12 between the first directional antenna 9AN1 and the second directional antenna 9AN2 along the direction 9DR123 of said enhanced transmission radiation pattern 9RP123, and a second radio-frequency delay component 6D3 operative to compensate for path differences 9PH-32 between the third directional antenna 9AN3 and the second directional antenna 9AN2 along the direction 9DR123 of said enhanced transmission radiation pattern 9RP123, thereby facilitating said generation of said enhanced transmission radiation pattern 9RP123 coherently.

In one embodiment, said plurality of directional antennas 9AN1-9AN8 are eight (8) directional antennas, arranged in a substantially symmetrical and generally circular configuration, together covering an angular span of substantially 360 degrees, such that each radiation pattern associated with each of said 8 directional antennas points to direction that is offset by substantially 45 degrees relative from a radiation pattern of an adjacent directional antennas in said configuration. In one embodiment, each of said 8 directional antennas has a radiation pattern having an angular span of between 90 degrees and 140 degrees, thereby facilitating said partial overlap, thereby allowing three successive radiation patterns, such as 9RD1, 9RD2, 9RD3, to contribute to said enhanced gain.

In one embodiment, said sequence of at least two of said directional antennas selected is a sequence of a first and a second directional antennas 9AN1, 9AN2 of said plurality of directional antennas, wherein the two radiation patterns 9RD1, 9RD2 associated with said first and second directional antennas 9AN1, 9AN2 have a substantial energy component 9EN-112, 9EN212 directed toward said direction 9DR12 of said enhanced transmission radiation pattern 9RP12 as a result of said radiation patterns 9RD1, 9RD2 partially overlap, thereby allowing the two radiation patterns 9RD1, 9RD2 to contribute to said enhanced gain. It is noted that antennas 9AN1, 9AN2 are presented by way of example as one possible sequence of a first and second directional antennas selected, but many other sequences are possible, such as: 9AN2+9AN3, 9AN3+9AN4, 9AN4+9AN5, 9AN5+9AN6, 9AN6+9AN7, 9AN7+9AN8, and 9AN8+9AN1.

In one embodiment, (i) said plurality of directional antennas 9AN1-9AN8 are crossed-polarized and each having a first-polarity input 9AN1in1-9AN8in1 and a second-polarity input 9AN1in2-9AN8in2, thereby capable of generating second-polarity radiation patterns 9RP1'-9RP8' toward directions 9DR1'-9DR8' similar to said directions 9DR1-9DR8 of said radiation patterns 9RP1-9RP8, and (ii) said first radio-frequency signal is split and directed toward combinations of first-polarity inputs 9AN1in1-9AN8in1 of directional antennas 9AN1-9AN8, thereby (iii) causing radiation patterns 9RP1-9RP8 and combinations thereof, such as said enhanced transmission radiation pattern 9RP123, to have a first polarity, and further comprising: a second radio-frequency transmitter 7T' operative to output a second radio-frequency signal; and a second configurable radio-frequency switching fabric 6S' operative to split and direct said second radio-frequency signal into combinations of second-polarity inputs 9AN1in2-9AN8in2 of said directional antennas 9AN1-9AN8; wherein the wireless communication system is operative to: (i) second select, out of the plurality of directional antennas 9AN1-9AN8, any second sequence of at least two directional antennas 9AN2, 9AN3, 9AN4, and (ii) split and direct said second radio-frequency signal into said at least two directional antennas 9AN2, 9AN3, 9AN4 of the second sequence via associated second-polarity inputs 9AN2in2, 9AN3in2, 9AN4in2, thereby (iii) generate a second enhanced transmission radiation pattern 9RP234' having an enhanced gain and a second polarity and pointing toward a direction 9DR234' that is covered mutually by said at least two directional antennas 9AN2, 9AN3, 9AN4 of the second sequence and second-polarity radiation patterns 9RP2', 9RP3', 9RP4' thereof, wherein said second enhanced transmission radiation pattern 9RP234' has a second polarity which is orthogonal to a first polarity of the enhanced transmission radiation pattern 9RP123. It is noted that other second sequences of at least two of said directional antennas are possible, and that the second sequence 9AN2, 9AN3, 9AN4 is given by way of example.

In one embodiment, said second radio-frequency signal is an IEEE 802.11 radio-frequency signal operative to generate a wireless packet.

One embodiment is a wireless communication system operative to dynamically synthesize antenna radiation patterns, comprising: a plurality of directional antennas 9AN1-9AN8 each having an associated radiation pattern 9RP1-9RP8 respectively that at least partially overlaps with at least one of the other radiation patterns, wherein each of said directional antennas is placed in a unique spatial position relative to the other directional antennas; a first radio-frequency transmitter 7T operative to output a first radio-frequency signal; a bank 6D of plurality of radio-frequency delay components 6D1-6D5, each operative to delay a radio-frequency signal by a predetermined phase; and a configurable radio-frequency switching fabric 6S operative to split and direct said first radio-frequency signal into combinations of said directional antennas via combinations of said plurality of radio-frequency delay components; wherein the wireless communication system is operative to: (i) select, out of the plurality of directional antennas, any sequence of between two and four of said directional antennas, (ii) match, for each said directional antennas selected, a specific one of said plurality of radio-frequency delay components such as to achieve phase coherency, and (iii) split and direct said first radio-frequency signal into said directional antennas selected via said radio-frequency delay components matched, thereby (iv) generate an enhanced transmission radiation pattern having an enhanced gain and pointing toward a resulting direction, while maintaining phase coherency between said directional antenna selects toward said resulting direction, as a result of said matching.

Figure 36:
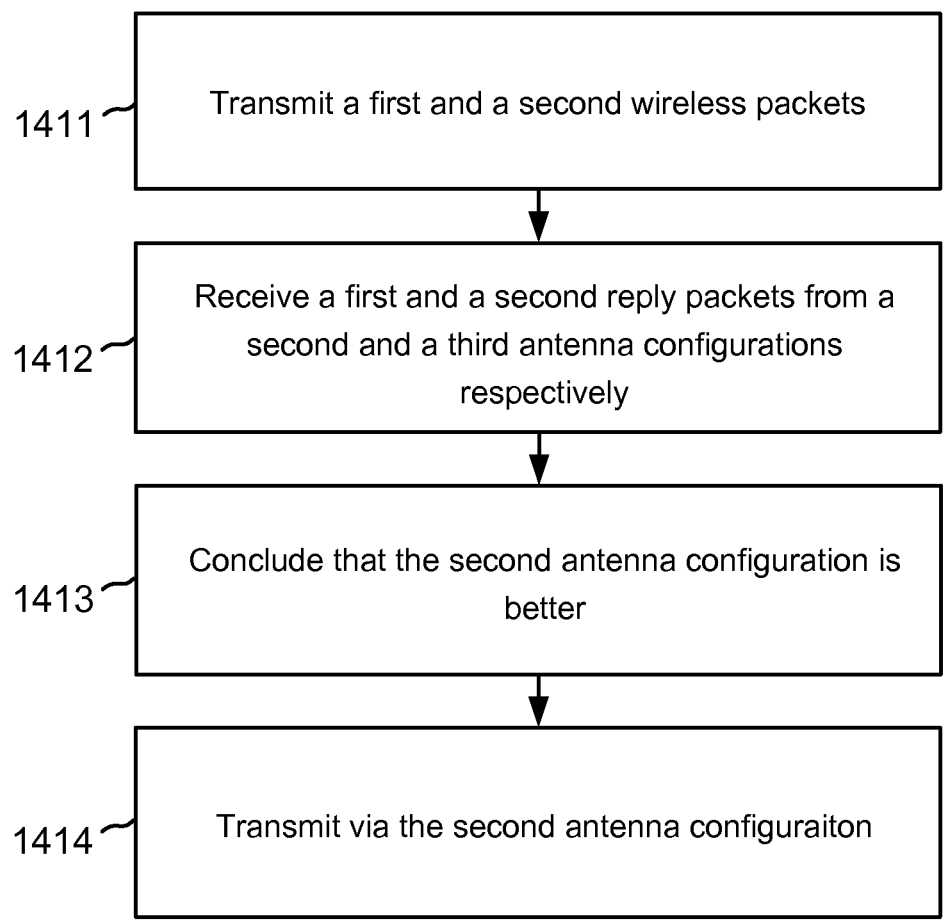
FIG. 36 illustrates one embodiment of a method for antenna configuration selection and beamforming.

FIG. 36 illustrates one embodiment of a method for antenna configuration selection and beamforming. In step 1411: transmitting wirelessly, by a wireless communication system 8SYS, at least a first and a second wireless packets via a first antenna configuration associated by way of example with antenna 9AN2 and radiation pattern 9RP2, to a first wireless node. In step 1412: receiving, by said wireless communication system 8SYS, from said first wireless node: (i) a first replay packet via a second antenna configuration associated by way of example with antennas 9AN1+9AN2+9AN3 and radiation pattern 9RP123, and (ii) a second replay packet via a third antenna configuration associated by way of example with antennas 9AN1+9AN2 and radiation pattern 9RP12, wherein said first and second replay packets are associated, respectively, with said first and second wireless packets. In step 1413: determining, by said wireless communication system 8SYS, that at least a first reception parameter associated with the first reply packet is better than said first reception parameter associated with the second reply packet, thereby concluding that the second antenna configuration is better than the third antenna configuration for the purpose of communicating with the first wireless node. In step 1414: transmitting wirelessly, by said wireless communication system 8SYS, to said first wireless node, a third wireless packet, via the second antenna configuration selected based on said determination.

In one embodiment, said first reception parameter is signal strength indication. One embodiment further comprises repeating said transmitting, receiving, and determining using additional antenna configurations, prior to said transmitting. In one embodiment, said replay packets are standard WiFi acknowledgment packets.

Figure 37:
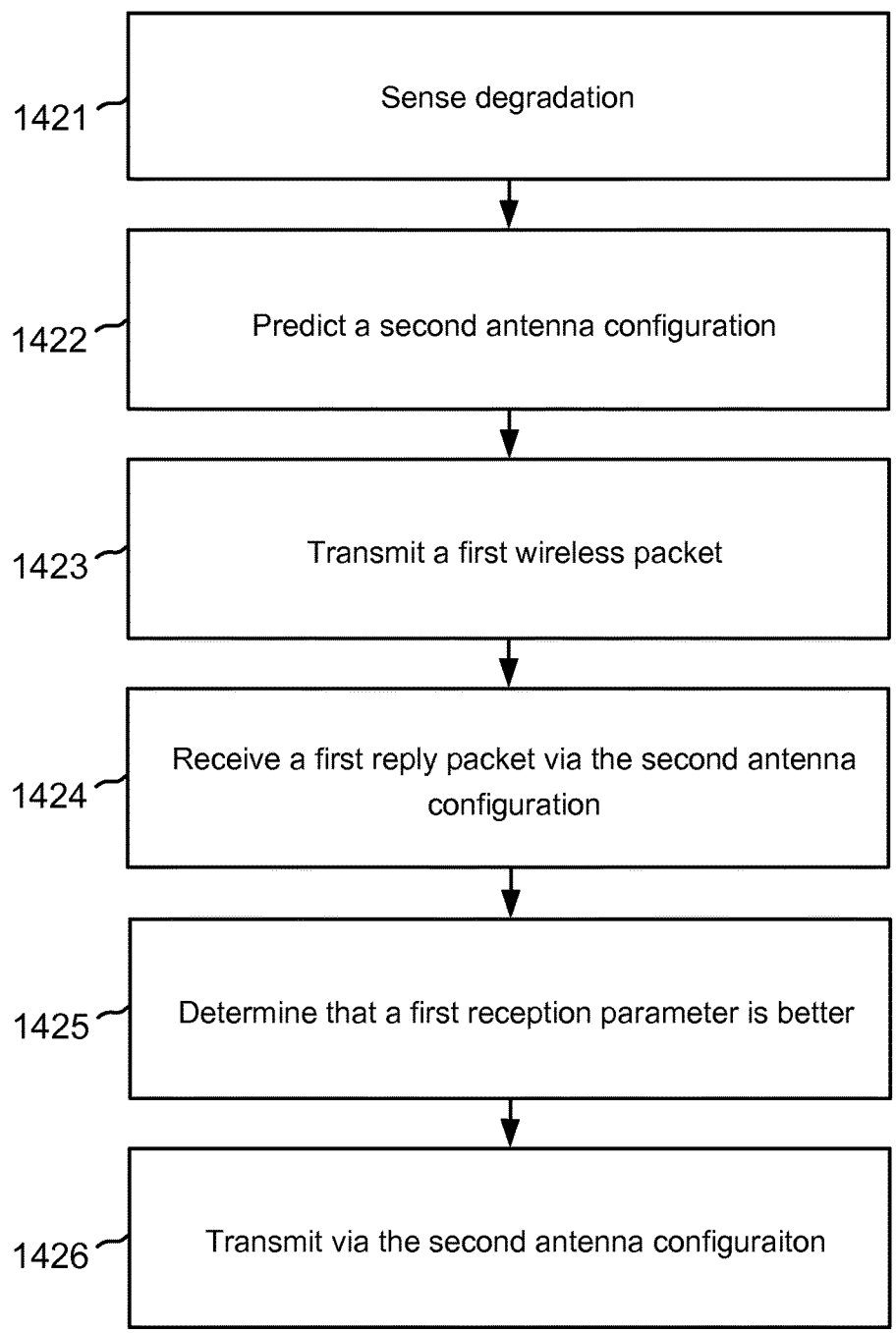
FIG. 37 illustrates one embodiment of a method for antenna configuration selection and beamforming.

FIG. 37 illustrates one embodiment of a method for antenna configuration selection and beamforming. In step 1421: sensing, by a wireless communication system 8SYS while servicing wirelessly a first wireless node, degradation in a first reception parameter associated with said first wireless node and detected using a first antenna configuration associated by way of example with antennas 9AN1+9AN2+9AN3 and radiation pattern 9RP123 belonging to said wireless communication system. In step 1422: predicting, by said wireless communication system, a second antenna configuration associated by way of example with antennas 9AN2+9AN3+9AN4 and radiation pattern 9RP234' expected to enhance said first reception parameter in conjunction with said wireless node. In step 1423: transmitting wirelessly, by said wireless communication system 8SYS, at least a first wireless packets to said first wireless node. In step 1424: receiving, by said wireless communication system 8SYS, from said first wireless node a first replay packet via said second antenna configuration associated with antennas 9AN2+9AN3+9AN4 and radiation pattern 9RP234'. In step 1425: determining, by said wireless communication system, that said first reception parameter associated with the first reply packet is better than said first reception parameter associated with said sensing, thereby concluding that the second antenna configuration associated with antennas 9AN2+9AN3+9AN4 and radiation pattern 9RP234' is better than the first antenna configuration for the purpose of communicating with the first wireless node, thereby confirming said prediction. In step 1426: transmitting wirelessly, by said wireless communication system 8SYS, to said first wireless node, a second wireless packet, via the second antenna configuration associated with antennas 9AN2+9AN3+9AN4 and radiation pattern 9RP234'.

In one embodiment, said first reception parameter is signal strength indication. One embodiment further comprises repeating said predicting, transmitting, receiving, and determining using additional antenna configurations, prior to said transmitting. In one embodiment, said replay packets are standard WiFi acknowledgment packets.

Figure 38:
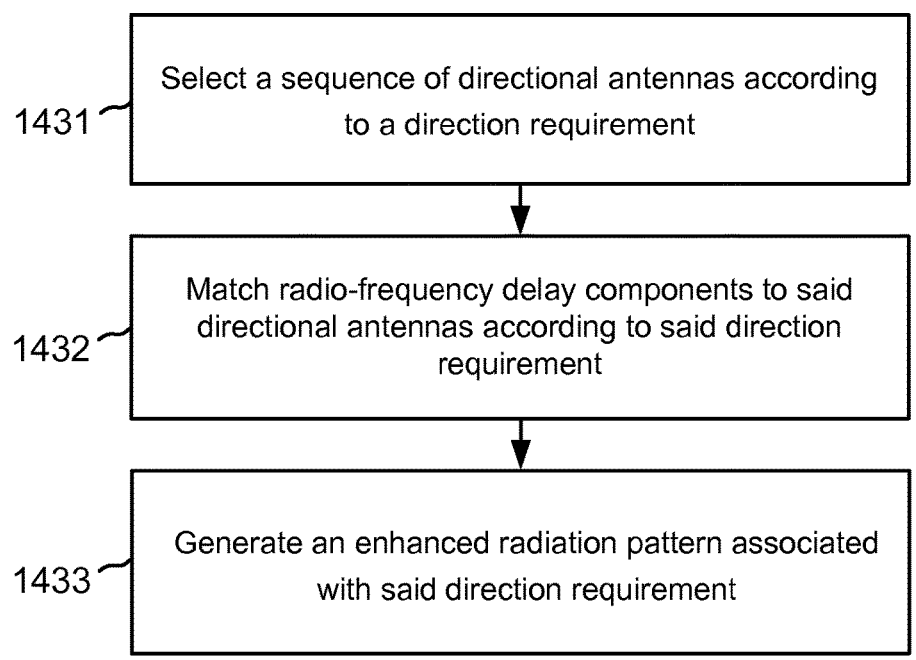
FIG. 38 illustrates one embodiment of a method for dynamically synthesizing antenna radiation patterns.

FIG. 38 illustrates one embodiment of a method for dynamically synthesizing antenna radiation patterns. In step 1431: selecting, by a wireless communication system 8SYS, out of a plurality of directional antennas 9AN1-9AN8 each having an associated radiation pattern 9RP1-9RP8 respectively that points to a unique direction and that partially overlaps with at least one of the other radiation patterns, a sequence of at least two successive ones 9AN1, 9AN2, 9AN3 of the directional antennas, according to a direction requirement, such that radiation patterns 9RP1, 9RP2, 9RP3 respectively associated with the at least two directional antennas selected have substantial components 9EN-12, 9EN-22, 9EN-32 respectively, which are aligned with a direction 9DR-REQ associated with the direction requirement. In step 1432: matching, by the wireless communication system, for at least one of the directional antennas selected, a radio-frequency delay component 6D1, 6D2, 6D3 according to the direction requirement. In step 1433: generating, by the wireless communication system, an enhanced radiation pattern 9RP123 having an enhanced gain relative to the radiation patterns 9RP1, 9RP2, 9RP3, and substantially aligned 9DR123 with the direction 9DR-REQ associated with the direction requirement, by combining the at least two of the directional antennas 9AN1, 9AN2, 9AN3 via the radio-frequency delay components 6D1, 6D2, 6D3, thereby achieving phase coherency among the at least two of the directional antennas in association with the direction requirement.

In one embodiment, the wireless communication system 8SYS transmits a first transmission using the enhanced radiation pattern 9RP123. In one embodiment, the wireless communication system 8SYS receives a first transmission using the enhanced radiation pattern 9RP123. In one embodiment, the wireless communication system 8SYS concludes that the sequence of at least two of the directional antennas includes only two 9AN1, 9AN2 of the directional antennas 9AN1-9AN8, as a result of the two of the directional antennas best approximating the direction requirement when combined. In one embodiment, the wireless communication system 8SYS concludes that the sequence of at least two of the directional antennas includes three 9AN1, 9AN2, 9AN3 of the directional antennas 9AN1-9AN8, as a result of the three of the directional antennas best approximating the direction requirement when combined. In one embodiment, the wireless communication system 8SYS obtains said direction requirement, by detecting a bearing of a wireless node communicating wirelessly with the wireless communication system.

In one embodiment: (i) each of the associated radiation patterns 9RP1-9RP8 has an angular span of between 90 degrees and 140 degrees, (ii) the plurality of directional antennas 9AN1-9AN8 collectively cover 360 degrees, and the selecting further comprises: obtaining, by the wireless communication system 8SYS, the direction 9DR-REQ associated with the direction requirement, which ranges from 0 to 360 degrees, toward which the wireless communication system 8SYS is to transmit wirelessly; identifying, by the wireless communication system 8SYS, a sequence of at least two successive ones 9AN1, 9AN2, 9AN3 of said directional antennas that when combined together produces the enhanced radiation pattern 9RP123 toward the direction 9DR123 approximating the direction 9DR-REQ associated with the direction requirement; and transmitting, by the wireless communication system 8SYS, a first transmission using the enhanced radiation pattern 9RP123 substantially toward the direction 9DR-REQ associated with the direction requirement.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in an embodiment/case, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A wireless communication system operative to cover a large angular span using combinations of directional antennas, comprising:
    a plurality of directional antennas each having an associated radiation pattern, placed side-by-side forming a series of directional antennas covering a large angular span, such that each of said associated radiation patterns points to a direction that is unique and offset relative to the other associated radiation patterns, and such that each of said associated radiation patterns partially overlaps with at least one other of said radiation patterns, wherein said wireless communication system is configured to select, out of said plurality of directional antennas, any sequence of at least two successive ones of said directional antennas;
    a first radio-frequency transmitter operative to output a first radio-frequency signal; and
    a configurable radio-frequency switching fabric operative to split and direct said first radio-frequency signal into combinations of said directional antennas, configured to split and direct said first radio-frequency signal into said at least two directional antennas selected, and consequently configured to generate an enhanced transmission radiation pattern having an enhanced gain and directed in a direction covered mutually by said at least two directional antennas selected and radiation patterns thereof.

2. The system of claim 1, wherein said sequence includes a first, second, and third successive directional antennas of said plurality of directional antennas, and wherein the radiation patterns associated with said first, second, and third directional antennas all have an energy component directed toward said direction of said enhanced transmission radiation pattern as a result of said radiation patterns partially overlap, thereby contributing to said enhanced gain.

3. The system of claim 2, further comprising: a first radio-frequency delay component operative to compensate for path differences between the first directional antenna selected and the second directional antenna selected along the direction of said enhanced transmission radiation pattern; and a second radio-frequency delay component operative to compensate for path differences between the third directional antenna selected and the second directional antenna selected along the direction of said enhanced transmission radiation pattern; thereby facilitating said generation of said enhanced transmission radiation pattern coherently.

4. The system of claim 2, wherein said plurality of directional antennas comprising eight (8) directional antennas, arranged in a substantially symmetrical and generally circular configuration, together covering an angular span of substantially 360 degrees, such that each radiation pattern associated with each of said 8 directional antennas points to a direction that is offset by substantially 45 degrees relative from a radiation pattern of an adjacent directional antenna in said configuration.

5. The system of claim 4, wherein each of said 8 directional antennas has a radiation pattern having an angular span of between 90 degrees and 140 degrees, thereby facilitating said partial overlap, thereby allowing the radiation patterns associated with said first, second, and third directional antennas to contribute to said enhanced gain.

6. The system of claim 1, wherein said sequence of at least two of said directional antennas selected is a sequence of a first and a second successive directional antennas out of said plurality of directional antennas, wherein radiation patterns associated with said first and second directional antennas have an energy component directed toward said direction of said enhanced transmission radiation pattern as a result of said radiation patterns partially overlap, thereby allowing the radiation patterns associated with said first and second directional antennas to contribute to said enhanced gain.

7. The system of claim 1, wherein: (i) said plurality of directional antennas are crossed-polarized and each having a first-polarity input and a second-polarity input, thereby capable of generating second-polarity radiation patterns toward directions similar to said directions of said radiation patterns, and (ii) said first radio-frequency signal is split and directed toward combinations of first-polarity inputs of directional antennas, thereby (iii) causing the radiation patterns and combinations thereof, such as said enhanced transmission radiation pattern, to have a first polarity, and further comprising:
    a second radio-frequency transmitter operative to output a second radio-frequency signal; and
    a second configurable radio-frequency switching fabric operative to split and direct said second radio-frequency signal into combinations of second-polarity inputs of said directional antennas;
    the wireless communication system is configured to second select, out of the plurality of directional antennas, any second sequence of at least two successive ones of said directional antennas;
    and the second radio-frequency switching fabric is configured to split and direct said second radio-frequency signal into said at least two directional antennas of the second sequence via associated second-polarity inputs, and consequently configured to generate a second enhanced transmission radiation pattern having an enhanced gain and a second polarity and directed in a direction that is covered mutually by said at least two directional antennas of the second sequence and second-polarity radiation patterns thereof, wherein said second enhanced transmission radiation pattern has a second polarity which is orthogonal to a first polarity of the enhanced transmission radiation pattern.

8. The system of claim 7, wherein said second radio-frequency signal is an IEEE 802.11 radio-frequency signal operative to generate a wireless packet.

9. The system of claim 1, wherein said first radio-frequency signal is an IEEE 802.11 radio-frequency signal operative to generate a wireless packet.

10. A wireless communication system operative to dynamically synthesize antenna radiation patterns, comprising:
    a plurality of directional antennas each placed in a unique spatial position and each having an associated radiation pattern that at least partially overlaps with at least one of the other radiation patterns, wherein said wireless communication system is configured to select, out of the plurality of directional antennas, any sequence of between two and four successive ones of said directional antennas;

a first radio-frequency transmitter operative to output a first radio-frequency signal;

a bank of radio-frequency delay components, each operative to delay the first radio-frequency signal by a predetermined phase; and a configurable radio-frequency switching fabric coupled to said bank of radio-frequency delay components and operative to split and direct said first radio-frequency signal into combinations of said directional antennas via combinations of said plurality of radio-frequency delay components;

wherein said wireless communication system is further configured to match, for each said directional antennas selected, a specific one of said plurality of radio-frequency delay components such as to achieve phase coherency; and said configurable radio-frequency switching fabric is configured to split and direct said first radio-frequency signal into said directional antennas selected, respectively via said radio-frequency delay components matched, and consequently configured to generate an enhanced transmission radiation pattern having an enhanced gain and directed in a resulting direction, while maintaining, toward said resulting direction, phase coherency among said directional antenna selected, as a result of said matching.

11. A method for dynamically synthesizing antenna radiation patterns, comprising:

selecting, by a wireless communication system, out of a plurality of directional antennas each having an associated radiation pattern that points to a unique direction and that partially overlaps with at least one of the other radiation patterns, a sequence of at least two successive ones of said directional antennas, according to a direction requirement, such that each radiation pattern associated with said at least two selected directional antennas has a component aligned with a direction associated with said direction requirement;

matching, by said wireless communication system, at least one of said selected directional antennas with a radio-frequency delay component, according to said direction requirement; and generating, by said wireless communication system, an enhanced radiation pattern having an enhanced gain relative to said radiation patterns, and substantially aligned with said direction associated with said direction requirement, by combining said radiation patterns of said at least two directional antennas using said radio-frequency delay component, thereby achieving phase coherency among said at least two directional antennas in association with said direction requirement.

12. The method of claim 11, further comprising: transmitting, by said wireless communication system, a first transmission using said enhanced radiation pattern.

13. The method of claim 11, further comprising: receiving, by said wireless communication system, a first transmission using said enhanced radiation pattern.

14. The method of claim 11, further comprising: concluding, by said wireless communication system, that said sequence of at least two of said directional antennas includes only two of said directional antennas, as a result of said two of said directional antennas best approximating said directional requirement when combined.

15. The method of claim 11, further comprising: concluding, by said wireless communication system, that said sequence of at least two of said directional antennas includes three of said directional antennas, as a result of said three of said directional antennas best approximating said directional requirement when combined.

16. The method of claim 11, further comprising: obtaining, by said wireless communication system, said direction requirement, by detecting a bearing of a wireless node communicating wirelessly with said wireless communication system.

17. The method of claim 11, wherein: (i) each of said associated radiation patterns has an angular span of between 90 degrees and 140 degrees, (ii) said plurality of directional antennas collectively cover 360 degrees, and said selecting further comprises:

obtaining, by said wireless communication system, said direction associated with said direction requirement, which ranges from 0 to 360 degrees, toward which said wireless communication system is to transmit wirelessly;

identifying, by said wireless communication system, said sequence of at least two successive ones of said directional antennas that when said respective radiation patterns are combined together produces said enhanced radiation pattern toward said direction associated with said direction requirement; and transmitting, by said wireless communication system, a first transmission using said enhanced radiation pattern substantially toward said direction associated with said direction requirement.

* * * * *